United States Patent
Patil et al.

(10) Patent No.: US 11,363,518 B2
(45) Date of Patent: Jun. 14, 2022

(54) HIGH EFFICIENCY SIGNALING

(71) Applicant: QUALCOMM Incorporated, San Diego, CA (US)

(72) Inventors: Abhishek Pramod Patil, San Diego, CA (US); George Cherian, San Diego, CA (US); Alfred Asterjadhi, San Diego, CA (US); Sandip Homchaudhuri, San Jose, CA (US); Maarten Menzo Wentink, Nijmegen (NL); Alireza Raissinia, Monte Sereno, CA (US); Lochan Verma, San Diego, CA (US); Padmanabhan Venkataraman Karthic, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/707,825

(22) Filed: Dec. 9, 2019

(65) Prior Publication Data
US 2020/0213933 A1 Jul. 2, 2020

(30) Foreign Application Priority Data
Dec. 11, 2018 (IN) ............................. 201841046852

(51) Int. Cl.
*H04W 40/24* (2009.01)
*H04W 8/00* (2009.01)
(Continued)

(52) U.S. Cl.
CPC ......... *H04W 40/244* (2013.01); *H04W 8/005* (2013.01); *H04W 8/245* (2013.01);
(Continued)

(58) Field of Classification Search
CPC ... H04W 40/24; H04W 40/244; H04W 8/005; H04W 8/22; H04W 8/24; H04W 8/245;
(Continued)

(56) References Cited

U.S. PATENT DOCUMENTS 8,315,271 B2 * 11/2012 Nanda ..................... H04L 47/70
370/450
10,904,834 B1 * 1/2021 Noh .................. H04W 72/1205
(Continued)

*Primary Examiner* — Kevin D Mew
(74) *Attorney, Agent, or Firm* — Holland & Hart LLP/Qualcomm

(57) ABSTRACT

This disclosure provides systems, devices, apparatus and methods, including computer programs encoded on storage media, for high efficiency (HE) beacons. HE supported access points (APs) and stations (STAs) may operate on resource deployments used for Wi-Fi technology and without support for legacy devices, also referred to as a greenfield deployment. An AP may identify updated capability information and transmit a HE physical layer convergence protocol (PLCP) protocol data unit (PPDU) including a beacon frame. A STA may receive, from the AP, the HE or EHT PPDU and identify an indication of change to a content or format of the beacon frame relative to a reference beacon frame. Based on the identified indication, the STA may then determine an updated content or format for the beacon frame and process the beacon frame or skip processing for one or more portions of the beacon frame.

30 Claims, 33 Drawing Sheets

(51) Int. Cl.
*H04W 80/02* (2009.01)
*H04W 80/08* (2009.01)
*H04W 28/02* (2009.01)
*H04W 8/24* (2009.01)

(52) U.S. Cl.
CPC ....... *H04W 28/0263* (2013.01); *H04W 80/02* (2013.01); *H04W 80/08* (2013.01)

(58) Field of Classification Search
CPC ......... H04W 28/0252; H04W 28/0263; H04W 80/02; H04W 80/08
See application file for complete search history.

(56) References Cited

U.S. PATENT DOCUMENTS

| | | | | |
|---|---|---|---|---|
| 10,911,349 | B2 * | 2/2021 | Patil | H04W 76/15 |
| 2013/0230035 | A1 * | 9/2013 | Grandhi | H04W 48/20 370/338 |
| 2015/0172025 | A1 * | 6/2015 | Kwon | H04W 52/0216 370/329 |
| 2016/0050659 | A1 * | 2/2016 | Seok | H04L 1/1671 370/338 |
| 2016/0323820 | A1 * | 11/2016 | Wong | H04W 40/005 |
| 2017/0135131 | A1 * | 5/2017 | Hart | H04W 74/08 |
| 2017/0255659 | A1 * | 9/2017 | Cariou | G06F 16/2237 |
| 2017/0290050 | A1 * | 10/2017 | Yun | H04W 74/002 |
| 2017/0367129 | A1 * | 12/2017 | Yang | H04W 24/02 |
| 2018/0020410 | A1 * | 1/2018 | Park | H04W 52/0235 |
| 2018/0027485 | A1 * | 1/2018 | Kneckt | H04W 8/005 370/338 |
| 2018/0279209 | A1 * | 9/2018 | Fang | H04W 48/12 |
| 2019/0053134 | A1 * | 2/2019 | Kim | H04W 74/0891 |
| 2019/0069176 | A1 * | 2/2019 | Huang | H04L 9/3228 |
| 2019/0141749 | A1 * | 5/2019 | Seok | H04W 72/0446 |
| 2019/0238259 | A1 * | 8/2019 | Huang | H04W 40/244 |
| 2019/0253972 | A1 * | 8/2019 | Park | H04W 84/12 |
| 2020/0137770 | A1 * | 4/2020 | Chitrakar | H04W 72/12 |
| 2020/0196243 | A1 * | 6/2020 | Kim | H04W 56/00 |
| 2021/0144696 | A1 * | 5/2021 | Cariou | H04W 72/1268 |

* cited by examiner

HIGH EFFICIENCY SIGNALING

CROSS REFERENCE

The present Application for Patent claims the benefit of India Provisional Patent Application No. 201841046852 by PATIL, et al., entitled "HIGH EFFICIENCY BEACONS," filed Dec. 11, 2018, assigned to the assignee hereof, and expressly incorporated herein.

TECHNICAL FIELD

The following relates generally to wireless communications, and more specifically, to high efficiency signaling.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a service set identifier (SSID) that is advertised by the AP. An AP periodically broadcasts beacon frames to enable any STAs within wireless range of the AP to establish or maintain a communication link with the WLAN.

For some resource deployments (such as 2.4 GHz or 5 GHz radio frequency spectrum band deployments used for some Wi-Fi technology), the AP may periodically broadcast beacon frames to convey capability information for one or more BSSs managed by the AP. Each beacon frame may be transmitted using a non-high throughput (non-HT) physical layer convergence protocol (PLCP) protocol data unit (PPDU) format to maintain backwards compatibility with legacy stations. For example, an AP serving high throughput (HT), very high throughput (VHT), or high efficiency (HE) STAs (for example, STAs supporting 802.11n, 802.11ac, or 802.11ax according to the IEEE 802.11 family of standards) may transmit a non-HT PPDU beacon frame to support backward compatibility with one or more non-HT legacy STAs (for example, STAs supporting only 802.11a, 802.11b, or 802.11g according to the IEEE 802.11 family of standards). Additionally, an AP may be an EHT AP that serves STAs, including extremely high throughput (EHT) STAs (for example, 802.11 be supported STAs according to the IEEE 802.11 family of standards). Backward compatibility may avoid transmission collisions within shared channels between STAs operating according to more recent standards and legacy STAs. STAs, whether legacy or non-legacy, within wireless range of the AP may receive and decode the beacon frames periodically broadcast by the AP. STAs may consume significant power to process and decode the fields and information elements contained within each beacon frame.

SUMMARY

The systems, methods, and devices of this disclosure each have several innovative aspects, no single one of which is solely responsible for the attributes disclosed herein.

One innovative aspect of the subject matter described in this disclosure can be implemented in a method for wireless communication at a wireless communication device, such as a station (STA). In some implementations, the method includes receiving a high efficiency (HE) physical layer convergence protocol (PLCP) protocol data unit (PPDU) including a beacon frame. The beacon frame may be carried on a media access control (MAC) protocol data unit (MPDU) of the HE PPDU. In some examples, the HE PPDU may include one or more additional MPDUs carrying non-beacon frames for the STA, as part of an aggregate MPDU (A-MPDU) or a multi-user PPDU (MU PPDU). The STA may identify a change to a content or format of the beacon frame based on an indication included in the beacon frame or in the one or more non-beacon frames for the STA. The STA may then determine an updated content or format for the beacon frame based on the identifying.

Another innovative aspect of the subject matter described in this disclosure can be implemented in a method for wireless communication at a wireless communication device, such as an access point (AP). In some implementations, the method includes identifying updated capability information for the AP, including changes to a basic service set (BSS) managed by the AP. The AP may then transmit a HE PPDU including a beacon frame. The beacon frame may be carried on an MPDU of the HE PPDU. In some examples, the AP may format additional MPDUs carrying non-beacon frames on the HE PPDU. The transmitted HE PPDU may include an indication of a change to a content or format of the beacon frame relative to a reference beacon frame.

A method of wireless communication at a station is described. The method may include receiving, from an AP, a PPDU, the PPDU including a first beacon frame, identifying, in the PPDU, an indication of a change to a content or a format, or both, of the first beacon frame relative to a reference beacon frame, and determining the content or the format, or both, of the first beacon frame according to the indicated change.

An apparatus for wireless communication at a station is described. The apparatus may include a processor, memory in electronic communication with the processor, and instructions stored in the memory. The instructions may be executable by the processor to cause the apparatus to receive, from an AP, a PPDU, the PPDU including a first beacon frame, identify, in the PPDU, an indication of a change to a content or a format, or both, of the first beacon frame relative to a reference beacon frame, and determine the content or the format, or both, of the first beacon frame according to the indicated change.

Another apparatus for wireless communication at a station is described. The apparatus may include means for receiving, from an AP, a PPDU, the PPDU including a first beacon frame, identifying, in the PPDU, an indication of a change to a content or a format, or both, of the first beacon frame relative to a reference beacon frame, and determining the content or the format, or both, of the first beacon frame according to the indicated change.

A non-transitory computer-readable medium storing code for wireless communication at a station is described. The code may include instructions executable by a processor to receive, from an AP, a PPDU, the PPDU including a first beacon frame, identify, in the PPDU, an indication of a change to a content or a format, or both, of the first beacon frame relative to a reference beacon frame, and determine the content or the format, or both, of the first beacon frame according to the indicated change.

In some examples of the method, apparatuses, and non-transitory computer-readable medium described herein, determining the content or the format, or both, of the first beacon frame may include operations, features, means, or instructions for identifying, based on the indication of the change, an order for a set of fields of the first beacon frame. In some examples of the method, apparatuses, and non-transitory computer-readable medium described herein, a first set of the set of fields may be associated with a content change of the first beacon frame relative to the reference beacon frame, and the first set of the set of fields precedes a second set of the set of fields based at least in part on the format of the first beacon frame.

Some examples of the method, apparatuses, and non-transitory computer-readable medium described herein may further include operations, features, means, or instructions for processing the first set of the set of fields, and refraining from processing one or more of the second set of the set of fields.

In some examples of the method, apparatuses, and non-transitory computer-readable medium described herein, identifying the indication may include operations, features, means, or instructions for identifying, in a field of the first beacon frame, the indication of the change to the content of the first beacon frame, the content of the first beacon frame including content of one or more information elements of the first beacon frame.

In some examples of the method, apparatuses, and non-transitory computer-readable medium described herein, the indication of the change in the field includes at least one of an increment to a sequence number value associated with the one or more information elements or a hash of a value carried by at least one of the one or more information elements.

In some examples of the method, apparatuses, and non-transitory computer-readable medium described herein, the field includes an aggregated control field of a HE or extremely high throughput (EHT) variant of a high throughput (HT) control field of the first beacon frame.

In some examples of the method, apparatuses, and non-transitory computer-readable medium described herein, identifying the indication of the change to the content or the format, or both, further may include operations, features, means, or instructions for identifying the indication in one or more of a first field of the first beacon frame that directly follows a timing synchronization function field or a second field of the first beacon frame that directly follows the first field, and processing one or more additional fields of the first beacon frame based at least in part the identified indication in the first field.

Some examples of the method, apparatuses, and non-transitory computer-readable medium described herein may further include operations, features, means, or instructions for identifying the one or more additional fields as critical elements, the indication of the change indicating a change to at least one of the critical elements.

In some examples of the method, apparatuses, and non-transitory computer-readable medium described herein, the first field includes an indication of a number of the critical elements.

In some examples of the method, apparatuses, and non-transitory computer-readable medium described herein, the first field and the second field may be elements of the first beacon frame.

In some examples of the method, apparatuses, and non-transitory computer-readable medium described herein, the indication may be in the first field and includes a sequence number value associated with the one or more additional fields.

In some examples of the method, apparatuses, and non-transitory computer-readable medium described herein, the indication may be in the second field and includes a version number value associated with the one or more additional fields.

In some examples of the method, apparatuses, and non-transitory computer-readable medium described herein, the indication may be in one or both of the first field or the second field, and the indication includes a hash of a value carried by at least one of the one or more additional fields.

In some examples of the method, apparatuses, and non-transitory computer-readable medium described herein, the first beacon frame includes a set of frame check sequence fields within the first beacon frame.

Some examples of the method, apparatuses, and non-transitory computer-readable medium described herein may further include operations, features, means, or instructions for identifying a first portion of the first beacon frame, a first frame check sequence field of the set of frame check sequence fields, and a second portion of the first beacon frame, the first frame check sequence field following the first portion of the first beacon frame and preceding the second portion of the first beacon frame, determining the content of the first portion of the first beacon frame, and determining whether to process the second portion of the first beacon frame based on the determined content.

In some examples of the method, apparatuses, and non-transitory computer-readable medium described herein, the first portion of the first beacon frame includes one or more critical elements of the first beacon frame, and the second portion of the first beacon frame includes one or more non-critical elements of the first beacon frame.

In some examples of the method, apparatuses, and non-transitory computer-readable medium described herein, the PPDU includes a set of beacon frames that include the first beacon frame, and the PPDU further includes a set of frame check sequence fields, each of the set of beacon frames associated with a respective one of the set of frame check sequence fields.

Some examples of the method, apparatuses, and non-transitory computer-readable medium described herein may further include operations, features, means, or instructions for identifying critical content for the station in a first set of beacon frames including at least the first beacon frame, and refraining from processing a second set of beacon frames of the set of beacon frames that follow the first beacon frame based on identifying that a third set of beacon frames including at least the first beacon frame includes the critical content for the station.

Some examples of the method, apparatuses, and non-transitory computer-readable medium described herein may further include operations, features, means, or instructions for identifying the indication in a first field of the PPDU that directly follows a preamble of the PPDU, and processing one or more fields of the first beacon frame based at least in part the identified indication in the first field of the PPDU.

In some examples of the method, apparatuses, and non-transitory computer-readable medium described herein, the first field includes a service field for a data portion of the PPDU, and the indication includes a sequence number value within the service field.

In some examples of the method, apparatuses, and non-transitory computer-readable medium described herein, the first beacon frame may be a beacon frame formatted for a first radio frequency spectrum band, and the reference beacon frame may be a beacon frame formatted for a second radio frequency spectrum band.

In some examples of the method, apparatuses, and non-transitory computer-readable medium described herein, the first radio frequency spectrum band includes a 6 GHz radio frequency spectrum band, and the second radio frequency spectrum band includes one or more of a 2.4 GHz radio frequency spectrum band or a 5 GHz radio frequency spectrum band.

In some examples of the method, apparatuses, and non-transitory computer-readable medium described herein, the received PPDU includes an A-MPDU including the first beacon frame.

In some examples of the method, apparatuses, and non-transitory computer-readable medium described herein, the received PPDU further may include operations, features, means, or instructions for identifying, in the at least one delimiter field, the indication of the change to the content or the format, or both, of the first beacon frame, and processing one or more fields of the first beacon frame based on the indication of the change.

A method of wireless communication at a station is described. The method may include receiving, from an AP, a PPDU that includes a set of MPDUs, identifying one or more first MPDUs of the set of MPDUs as non-beacon frames for the station, and a second MPDU of the set of MPDUs as a beacon frame for the station, or a discovery frame, or both, and determining updated capability information for the AP based on the beacon frame, or the discovery frame, or both.

An apparatus for wireless communication at a station is described. The apparatus may include a processor, memory in electronic communication with the processor, and instructions stored in the memory. The instructions may be executable by the processor to cause the apparatus to receive, from an AP, a PPDU that includes a set of MPDUs, identify one or more first MPDUs of the set of MPDUs as non-beacon frames for the station, and a second MPDU of the set of MPDUs as a beacon frame for the station, or a discovery frame, or both, and determine updated capability information for the AP based on the beacon frame, or the discovery frame, or both.

Another apparatus for wireless communication at a station is described. The apparatus may include means for receiving, from an AP, a PPDU that includes a set of MPDUs, identifying one or more first MPDUs of the set of MPDUs as non-beacon frames for the station, and a second MPDU of the set of MPDUs as a beacon frame for the station, or a discovery frame, or both, and determining updated capability information for the AP based on the beacon frame, or the discovery frame, or both.

A non-transitory computer-readable medium storing code for wireless communication at a station is described. The code may include instructions executable by a processor to receive, from an AP, a PPDU that includes a set of MPDUs, identify one or more first MPDUs of the set of MPDUs as non-beacon frames for the station, and a second MPDU of the set of MPDUs as a beacon frame for the station, or a discovery frame, or both, and determine updated capability information for the AP based on the beacon frame, or the discovery frame, or both.

In some examples of the method, apparatuses, and non-transitory computer-readable medium described herein, receiving the PPDU that may include operations, features, means, or instructions for receiving an A-MPDU in the PPDU, the A-MPDU including the beacon frame, or the discovery frame, or both, and the A-MPDU further includes the one or more non-beacon frames.

Some examples of the method, apparatuses, and non-transitory computer-readable medium described herein may further include operations, features, means, or instructions for identifying, in the one or more non-beacon frames, an indication of a change to a content or a format, or both, of the beacon frame, and processing one or more fields of the beacon frame based on the identified indication.

In some examples of the method, apparatuses, and non-transitory computer-readable medium described herein, the one or more non-beacon frames include a traffic indication map (TIM) frame.

Some examples of the method, apparatuses, and non-transitory computer-readable medium described herein may further include operations, features, means, or instructions for identifying, based on the one or more non-beacons frame being aggregated with the discovery frame, a change to a content or a format, or both, of an upcoming beacon frame.

In some examples of the method, apparatuses, and non-transitory computer-readable medium described herein, the one or more non-beacon frames include a TIM frame for one or more stations associated with a BSS of the AP, and the discovery frame includes fast initial link setup (FILS) discovery frame that may be for one or more stations unassociated with the BSS.

In some examples of the method, apparatuses, and non-transitory computer-readable medium described herein, receiving the PPDU may include operations, features, means, or instructions for receiving a MU PPDU including a FILS discovery frame on a first resource unit of the MU PPDU and the beacon frame on a second resource unit of the MU PPDU.

Some examples of the method, apparatuses, and non-transitory computer-readable medium described herein may further include operations, features, means, or instructions for identifying, in a first field of the beacon frame, an indication of a change to a content or a format, or both, of one or more additional fields of the beacon frame, and processing the one or more additional fields of the beacon frame based on the identified indication.

In some examples of the method, apparatuses, and non-transitory computer-readable medium described herein, the beacon frame may be for one or more stations associated with a BSS of the AP, and the FILS discovery frame may be for one or more stations unassociated with the BSS.

Some examples of the method, apparatuses, and non-transitory computer-readable medium described herein may further include operations, features, means, or instructions for receiving, before the received PPDU, a MU PPDU including a FILS discovery frame on a first resource unit of the MU PPDU and a TIM frame on a second resource unit of the MU PPDU.

Some examples of the method, apparatuses, and non-transitory computer-readable medium described herein may further include operations, features, means, or instructions for identifying, in the TIM frame, an indication of a change to a content or a format, or both, of an upcoming beacon frame, and processing the beacon frame of the received PPDU based on the identified indication in the TIM frame of the MU PPDU.

In some examples of the method, apparatuses, and non-transitory computer-readable medium described herein, the beacon frame may be for one or more stations associated with a BSS of the AP, and the FILS discovery frame may be for one or more stations unassociated with the BSS.

In some examples of the method, apparatuses, and non-transitory computer-readable medium described herein, receiving the PPDU may include operations, features, means, or instructions for receiving a MU PPDU including a first beacon frame and a second beacon frame. In some examples of the method, apparatuses, and non-transitory computer-readable medium described herein, the first beacon frame may be for one or more stations associated with a BSS of the AP, the second beacon frame may be for one or more stations unassociated with the BSS, and the beacon frame may be one of the first beacon frame or the second beacon frame.

In some examples of the method, apparatuses, and non-transitory computer-readable medium described herein, the first beacon frame of a second resource unit of the MU PPDU includes at least a TIM element.

A method of wireless communication at an AP is described. The method may include identifying updated capability information of the AP and transmitting, in a PPDU, a first beacon frame carrying the updated capability information, the transmitted PPDU including an indication of a change to a content or a format, or both, of the first beacon frame relative to a reference beacon frame.

An apparatus for wireless communication at an AP is described. The apparatus may include a processor, memory in electronic communication with the processor, and instructions stored in the memory. The instructions may be executable by the processor to cause the apparatus to identify updated capability information of the AP and transmit, in a PPDU, a first beacon frame carrying the updated capability information, the transmitted PPDU including an indication of a change to a content or a format, or both, of the first beacon frame relative to a reference beacon frame.

Another apparatus for wireless communication at an AP is described. The apparatus may include means for identifying updated capability information of the AP and transmitting, in a PPDU, a first beacon frame carrying the updated capability information, the transmitted PPDU including an indication of a change to a content or a format, or both, of the first beacon frame relative to a reference beacon frame.

A non-transitory computer-readable medium storing code for wireless communication at an AP is described. The code may include instructions executable by a processor to identify updated capability information of the AP and transmit, in a PPDU, a first beacon frame carrying the updated capability information, the transmitted PPDU including an indication of a change to a content or a format, or both, of the first beacon frame relative to a reference beacon frame.

Some examples of the method, apparatuses, and non-transitory computer-readable medium described herein may further include operations, features, means, or instructions for determining an order for a set of fields of the first beacon frame. In some examples of the method, apparatuses, and non-transitory computer-readable medium described herein, a first set of the set of fields may be associated with the change of the content of the first beacon frame relative to the reference beacon frame, and the first set of the set of fields precedes a second set of the set of fields based at least in part on the format of the first beacon frame.

Some examples of the method, apparatuses, and non-transitory computer-readable medium described herein may further include operations, features, means, or instructions for transmitting, in a field of the first beacon frame, the indication of the change to the content of the first beacon frame.

Some examples of the method, apparatuses, and non-transitory computer-readable medium described herein may further include operations, features, means, or instructions for transmitting the indication in one or more of a first field of the first beacon frame that directly follows a timing synchronization function field or a second field of the first beacon frame that directly follows the first field, or in a combination thereof.

In some examples of the method, apparatuses, and non-transitory computer-readable medium described herein, the first beacon frame includes a set of frame check sequence fields within the first beacon frame.

In some examples of the method, apparatuses, and non-transitory computer-readable medium described herein, the PPDU includes a set of beacon frames that include the first beacon frame, and the PPDU further includes a set of frame check sequence fields, each of the set of beacon frames associated with a respective one of the set of frame check sequence fields.

In some examples of the method, apparatuses, and non-transitory computer-readable medium described herein, the transmitted PPDU includes an A-MPDU including the first beacon frame.

Some examples of the method, apparatuses, and non-transitory computer-readable medium described herein may further include operations, features, means, or instructions for transmitting the indication in a field of the PPDU that directly follows a preamble of the PPDU.

A method of wireless communication at an AP is described. The method may include identifying updated capability information for the AP and transmitting, in a PPDU, a set of MPDUs that include a beacon frame, or a discovery frame, or both, indicating the updated capability information, and one or more second MPDUs that are non-beacon frames.

An apparatus for wireless communication at an AP is described. The apparatus may include a processor, memory in electronic communication with the processor, and instructions stored in the memory. The instructions may be executable by the processor to cause the apparatus to identify updated capability information for the AP and transmit, in a PPDU, a set of MPDUs that include a beacon frame, or a discovery frame, or both, indicating the updated capability information, and one or more second MPDUs that are non-beacon frames.

Another apparatus for wireless communication at an AP is described. The apparatus may include means for identifying updated capability information for the AP and transmitting, in a PPDU, a set of MPDUs that include a beacon frame, or a discovery frame, or both, indicating the updated capability information, and one or more second MPDUs that are non-beacon frames.

A non-transitory computer-readable medium storing code for wireless communication at an AP is described. The code may include instructions executable by a processor to identify updated capability information for the AP and transmit, in a PPDU, a set of MPDUs that include a beacon frame, or a discovery frame, or both, indicating the updated capability information, and one or more second MPDUs that are non-beacon frames.

In some examples of the method, apparatuses, and non-transitory computer-readable medium described herein, transmitting the set of MPDUs in the PPDU may include operations, features, means, or instructions for transmitting an A-MPDU in the PPDU. In some examples of the method, apparatuses, and non-transitory computer-readable medium described herein, the A-MPDU includes the beacon frame, or the discovery frame, or both, and the A-MPDU further includes the one or more non-beacon frames.

In some examples of the method, apparatuses, and non-transitory computer-readable medium described herein, transmitting the set of MPDUs in the PPDU may include operations, features, means, or instructions for transmitting a MU PPDU including a FILS discovery frame on a first resource unit of the MU PPDU and the beacon frame on a second resource unit of the MU PPDU.

Some examples of the method, apparatuses, and non-transitory computer-readable medium described herein may further include operations, features, means, or instructions for transmitting, before transmitting the PPDU, a MU PPDU including a FILS discovery frame on a first resource unit of the MU PPDU and a TIM frame on a second resource unit of the MU PPDU.

In some examples of the method, apparatuses, and non-transitory computer-readable medium described herein, transmitting the set of MPDUs in the PPDU may include operations, features, means, or instructions for transmitting an MU PPDU including a first beacon frame and a second beacon frame. In some examples of the method, apparatuses, and non-transitory computer-readable medium described herein, the first beacon frame may be for one or more stations associated with a BSS of the AP, the second beacon frame may be for one or more stations unassociated with the BSS, and the beacon frame may be one of the first beacon frame or the second beacon frame.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
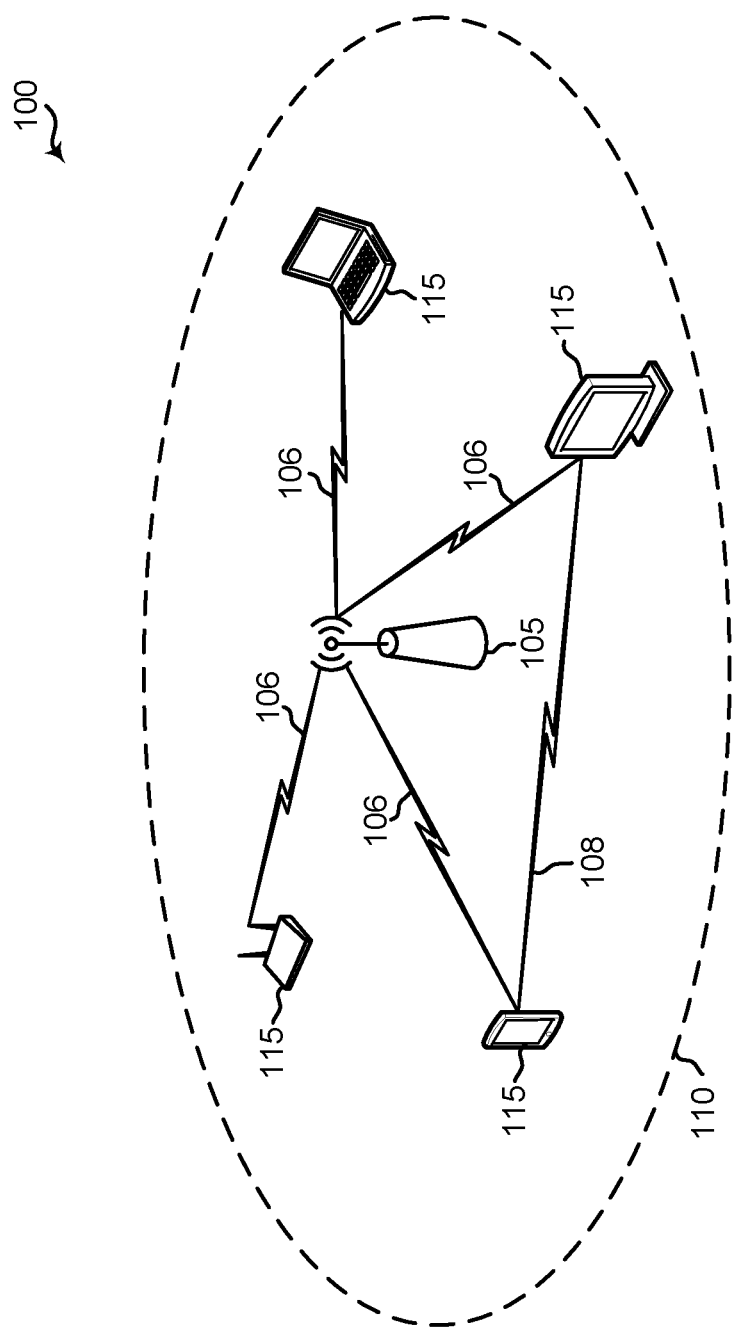
FIG. 1 shows an example of a wireless communication network that supports high efficiency (HE) or extremely high throughput (EHT) signaling in accordance with aspects of the present disclosure.

The following description is directed to some implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G standards, among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal frequency division multiple access (OFDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to high efficiency (HE) and extremely high throughput (EHT) signaling design, including beacon design. A wireless communications system (such as a WLAN system) may support HE or EHT operations, or both. The system may include a resource deployment used for Wi-Fi technology but without support for legacy devices, also referred to as a greenfield deployment. For example, HE and EHT supported devices (access points (APs) and stations (STAs) configured for 802.11ax or 802.11 be may be specific to the deployment. A greenfield deployment may include one or more available channel bandwidths, including RF spectrum bands outside the typical 2.4 GHz or 5 GHz bands, such as, for example, in the 6 GHz band.

HE and EHT supported APs and STAs may communicate on channel resources of the greenfield deployment. For example, an AP may periodically broadcast beacon frames. The AP may transmit the periodic beacon frames as part of an HE or EHT physical layer convergence protocol (PLCP) protocol data unit (PPDU). The STAs within wireless range of the AP may receive the PPDU from the AP and process the beacon frame to establish or maintain a communication link with the WLAN. Some contents or indications within a beacon frame may be more significant to STA operation than others. For example, some elements within the beacon frame may be processed by the STAs to determine changes to a basic service set (BSS) supported by the AP. These "critical" elements of the beacon may be interleaved throughout the beacon frame and present implementation challenges in processing at the STAs. In particular, the STAs may process the complete HE or EHT PPDU to identify potential changes, resulting in significant power consumption and timing delays. Additionally or alternatively, the contents included in periodic beacon frames may include identical information elements and fields despite an updated time stamp value associated with timing synchronization.

In some examples, STAs may support procedures for early beacon termination (EBT) to save power. As described, operations within greenfield deployments may allow an AP to update the format or content of a beacon. In some examples, the update may include modifying a formatting order of information elements or fields to include "critical" elements at the beginning of a beacon frame. In other cases, the update may include modifying a format of one or more indications included in an information element or field associated with the HE or EHT PPDU. In some other examples, the update to the content may include a sequence number within a control field that may be incremented to indicate a change to one or more "critical" elements. In other cases, the update to the content may include an updated hash of values carried by the "critical" elements of a beacon frame that may indicate a change to one or more "critical" elements of the beacon frame. The updated format or content of the beacon may support faster content processing and decoding by the STA for EBT operation.

The beacon frame may be aggregated with one or more additional frames to improve data transmission. In some examples, the STA may receive, from the AP, an HE or EHT PPDU carrying the beacon frame and one or more additional frames within an aggregate medium access control (MAC) protocol data unit (A-MPDU). In some examples, the one or more additional frames may have a shorter duration or an increased transmission frequency relative to the beacon frame. The additional frames may include an indication value denoting an update to the one or more "critical" elements of the upcoming beacon frame. In other examples, the STA may tune to a subchannel of the resource deployment to receive the beacon frame on a resource unit (RU) directed to the STA. The STA may receive, from the AP, the beacon frame as part of an HE or EHT MU PPDU directed to one or more sets of STAs. The HE or EHT MU PPDU may carry the beacon frame and one or more additional frames according to an RU allocation.

Particular implementations of the subject matter described in this disclosure can be implemented to realize one or more potential advantages. In some implementations, the described techniques may improve processing throughput and reduce power consumption at client devices receiving periodic beacon frame transmissions. In some implementations, the described techniques can be used to improve beacon formatting and indication within a PPDU. In some implementations, the described techniques can be used within greenfield deployment scenarios, including deployments specific to HE or EHT operations associated with the 802.11ax or 802.11 be amendments to the IEEE 802.11 family of standards.

FIG. 1 shows an example wireless communication network 100 that supports HE or EHT signaling in accordance with aspects of the present disclosure. According to some aspects, the wireless communication network 100 may be an example of a WLAN such as a Wi-Fi network (and will hereinafter be referred to as WLAN 100). For example, the WLAN 100 can be a network implementing at least one of the IEEE 802.11 family of standards (such as that defined by the IEEE 802.11-2016 specification or amendments thereof). The WLAN 100 may include numerous wireless communication devices such as an AP 105 and multiple STAs 115. Each of the STAs 115 also may be referred to as a mobile station (MS), a mobile device, a mobile handset, a wireless handset, an access terminal (AT), a user equipment (UE), a subscriber station (SS), or a subscriber unit, among other possibilities. The STAs 115 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 105 and an associated set of STAs 115 may be referred to as a BSS, which is managed by the respective AP 105. The BSS is identified by a service set identifier (SSID) that is advertised by the AP 105. The AP 105 periodically broadcasts beacon frames ("beacons") to enable any STAs 115 within wireless range of the AP 105 to establish or maintain a respective communication link 106 (hereinafter also referred to as a "Wi-Fi link") with the AP 105. For example, the beacons can include an identification of a primary channel used by the respective AP 105 as well as a timing synchronization function for establishing or maintaining timing synchronization with the AP 105. The various STAs 115 in the WLAN are able to communicate with external networks as well as with one another via the AP 105 and respective communication links 106. To establish a Wi-Fi link 106 with an AP 105, each of the STAs 115 is configured to perform passive or active scanning operations ("scans") on frequency channels in one or more frequency bands (for example, the 2.4 GHz, 5 GHz, 6 GHz or 60 GHz bands). To perform passive scanning, a STA 115 listens for beacons, which are transmitted by respective APs 105 at a periodic time interval referred to as the target beacon transmission time (TBTT) (measured in time units (TUs)). In some examples, one TU is equal to 1054 microseconds (s). To perform active scanning, a STA 115 generates and sequentially transmits probe requests on each channel to be scanned and listens for probe responses from APs 105. Each STA 115 may be configured to identify or select an AP 105 with which to associate based on the scanning information obtained through the passive or active scans, and to perform authentication and association operations to establish a Wi-Fi link 106 with the selected AP 105.

FIG. 1 additionally shows an example coverage area 110 of the AP 105, which may represent a basic service area (BSA) of the WLAN 100. While only one AP 105 is shown, the WLAN 100 can include multiple APs 105. As a result of the increasing ubiquity of wireless networks, a STA 115 may have the opportunity to select one of many BSSs within range of the STA or select among multiple APs 105 that together form an extended service set (ESS) including multiple connected BSSs. An extended network station associated with the WLAN 100 may be connected to a wired or wireless distribution system that may allow multiple APs 105 to be connected in such an ESS. As such, a STA 115 can be covered by more than one AP 105 and can associate with different APs 105 at different times for different transmissions. Additionally, after association with an AP 105, a STA 115 also may be configured to periodically scan its surroundings to find a more suitable AP 105 with which to associate. For example, a STA 115 that is moving relative to its associated AP 105 may perform a "roaming" scan to find another AP 105 having more desirable network characteristics such as a greater received signal strength indicator (RSSI) or a reduced traffic load.

In some examples, STAs 115 may form networks without APs 105 or other equipment other than the STAs 115 themselves. One example of such a network is an ad hoc network (or wireless ad hoc network). Ad hoc networks may alternatively be referred to as mesh networks or peer-to-peer (P2P) connections. In some examples, ad hoc networks may be implemented within a larger wireless network such as the WLAN 100. In such implementations, while the STAs 115 may be capable of communicating with each other through the AP 105 using communication links 106, STAs 115 also can communicate directly with each other via direct wireless links 108. Additionally, two STAs 115 may communicate via a direct communication link 108 regardless of whether both STAs 115 are associated with and served by the same AP 105. In such an ad hoc system, one or more of the STAs 115 may assume the role filled by the AP 105 in a BSS. Such a STA 115 may be referred to as a group owner (GO) and may coordinate transmissions within the ad hoc network. Examples of direct wireless links 108 include Wi-Fi Direct connections, connections established by using a Wi-Fi Tunneled Direct Link Setup (TDLS) link, and other P2P group connections.

Some APs and STAs support beamforming. Beamforming refers to the focusing of the energy of a transmission in the direction of a target receiver. Beamforming may be used both in a single user context, for example, to improve a signal-to-noise ratio (SNR), as well as in a MU context, for example, to enable MU MIMO transmissions. To perform beamforming, a transmitter, referred to as the beamformer, transmits a signal from multiple antenna elements of an antenna array. The beamformer configures the phase shifts between the signals transmitted from the different antenna elements such that the signals add constructively along particular directions towards the intended receivers, which are referred to as beamformees. The manner in which the beamformer configures the phase shifts depends on channel state information (CSI) associated with the wireless channels over which the beamformer intends to communicate with the beamformees. To obtain the CSI, the beamformer may perform a channel sounding procedure with the beamformees. For example, the beamformer may transmit one or more sounding packets to the beamformees. The beamformees may then perform measurements of the channel based on the sounding packets and subsequently provide feedback to the beamformer based on the measurements, for example, in the form of a feedback matrix. The beamformer may then generate a steering matrix for each of the beamformees based on the feedback and use the steering matrix to configure the phase shifts for subsequent transmissions to the beamformees.

The APs 105 and STAs 115 may function and communicate (via the respective Wi-Fi links 106) according to the IEEE 802.11 family of standards (such as that defined by the IEEE 802.11-2016 specification or amendments thereof including, but not limited to, 802.11ah, 802.11ay, 802.11ax, 802.11az, 802.11ba and EHT). These standards define the WLAN radio and baseband protocols for the physical layers (PHY) and MAC layers. The APs 105 and STAs 115 transmit and receive wireless communications (hereinafter also referred to as "Wi-Fi communications") to and from one another in the form of PPDUs. The APs 105 and STAs 115 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 105 and STAs 115 described herein also may communicate in other frequency bands, such as the 6 GHz band, which may support both licensed and unlicensed communications. The APs 105 and STAs 115 also can be configured to communicate over other frequency bands such as shared licensed frequency bands. In some examples, multiple operators may have a license to operate in the same or overlapping frequency band or bands.

Access to the shared wireless medium is governed by a Distributed Coordination Function (DCF). With a DCF, there is no centralized master device allocating time and frequency resources of the shared wireless medium. On the contrary, before a wireless communication device, such as an AP 105 or a STA 115, is permitted to transmit data, it may wait for a particular time and then contend for access to the wireless medium. In some implementations, the wireless communication device may be configured to implement the DCF through the use of Carrier Sense Multiple Access (CSMA) with Collision Avoidance (CA) (CSMA/CA) and timing intervals. Before transmitting data, the wireless communication device may perform a Clear Channel Assessment (CCA) and determine that the appropriate wireless channel is idle. The CCA includes both physical (PHY-level) carrier sensing and virtual (MAC-level) carrier sensing. Physical carrier sensing is accomplished via a measurement of the received signal strength of a valid frame, which is then compared to a threshold to determine whether the channel is busy. Physical carrier sensing also includes energy detection. Energy detection involves measuring the total energy the wireless communication device receives regardless of whether the received signal represents a valid frame. If the total energy detected is above a threshold, the medium is considered busy. Virtual carrier sensing is accomplished via the use of a Network Allocation Vector (NAV), an indicator of a time when the medium may next become idle. The NAV is reset each time a valid frame is received that is not addressed to the wireless communication device. The NAV effectively serves as a time duration that may elapse before the wireless communication device may contend for access even in the absence of a detected symbol or a detected energy below the relevant threshold.

As described above, the DCF is implemented through the use of time intervals. These time intervals include the slot time (or "slot interval") and the Inter-Frame Space (IFS). The slot time is the basic unit of timing and may be determined based on one or more of a transmit-receive turnaround time, a channel sensing time, a propagation delay and a MAC processing time. Measurements for channel sensing are performed for each slot. All transmissions may begin at slot boundaries. Different varieties of IFS exist including the short IFS (SIFS), the distributed IFS (DIFS), the extended IFS (EIFS), and the arbitration IFS (AIFS). For example, the DIFS may be defined as the sum of the SIFS and two times the slot time. The values for the slot time and IFS may be provided by a suitable standard specification, such as the IEEE 802.11 family of standards (such as that defined by the IEEE 802.11-2016 specification or amendments thereof).

When the NAV reaches 0, the wireless communication device performs the physical carrier sensing. If the channel remains idle for the appropriate IFS (for example, the DIFS), the wireless communication device initiates a backoff timer, which represents a duration of time that the device may sense the medium to be idle before it is permitted to transmit. The backoff timer is decremented by one slot each time the medium is sensed to be idle during a corresponding slot interval. If the channel remains idle until the backoff timer expires, the wireless communication device becomes the holder of a Transmit Opportunity (TXOP) and may begin transmitting. The TXOP is the duration of time the wireless communication device can transmit frames over the channel after it has won contention for the wireless medium. If, on the other hand, one or more of the carrier sense mechanisms indicate that the channel is busy, the MAC of the wireless communication device will not permit transmission.

Each time the wireless communication devices generates a new PPDU for transmission in a new TXOP, it randomly selects a new backoff timer duration. The available distribution of the numbers that may be randomly selected for the backoff timer is referred to as the Contention Window (CW). If, when the backoff timer expires, the wireless communication device transmits the PPDU and the medium is still busy, there may be a collision. Additionally, if there is otherwise too much energy on the wireless channel resulting in a poor SNR, the communication may be corrupted or otherwise not successfully received. In such instances, the wireless communication device may not receive a communication acknowledging the transmitted PPDU within a timeout interval. The MAC may then increase the CW exponentially, for example, doubling it, and randomly select a new backoff timer duration from the CW before each attempted retransmission of the PPDU. There are different CW and TXOP durations for each of the four Access Categories (ACs): voice (AC_VO), video (AC_VI), background (AC_BK), and best effort (AC_BE). This enables particular types of traffic to be prioritized in the network.

Each of the frequency bands may include multiple sub-bands or frequency channels. For example, PPDUs conforming to the IEEE 802.11n, 802.11ac and 802.11ax standard amendments may be transmitted over the 2.4 and 5 GHz bands, each of which is divided into multiple 20 MHz channels. As such, these PPDUs are transmitted over a physical channel having a minimum bandwidth of 20 MHz. But larger channels can be formed through channel bonding. For example, PPDUs conforming to the IEEE 802.11n, 802.11ac and 802.11ax standard amendments may be transmitted over physical channels having bandwidths of 40 MHz, 80 MHz or 160 MHz by bonding together two or more 20 MHz channels.

Each PPDU is a composite structure that includes a PHY preamble and a PLCP service data unit (PSDU). The information provided in the preamble may be used by a receiving device to decode the subsequent data in the PSDU. A legacy portion of the preamble may include a legacy short training field (STF) (L-STF), a legacy long training field (LTF) (L-LTF), and a legacy signaling field (L-SIG). The legacy preamble may be used for packet detection, automatic gain control and channel estimation, among other uses. The legacy preamble also may be used to maintain compatibility with legacy devices. In instances in which PPDUs are transmitted over a bonded channel, the L-STF, L-LTF, and L-SIG fields may be duplicated and transmitted in each of the multiple component channels. For example, in IEEE 802.11n, 802.11ac or 802.11ax implementations, the L-STF, L-LTF, and L-SIG fields may be duplicated and transmitted in each of the component 20 MHz channels. The format of, coding of, and information provided in the non-legacy portion of the preamble is based on the particular IEEE 802.11 protocol.

APs 105 and STAs 115 can support MU transmissions; that is, concurrent transmissions from one device to each of multiple devices (for example, multiple simultaneous downlink (DL) communications from an AP 105 to corresponding STAs 115), or concurrent transmissions from multiple devices to a single device (for example, multiple simultaneous uplink (UL) transmissions from corresponding STAs 115 to an AP 105). To support the MU transmissions, the APs 105 and STAs 115 may utilize MU-OFDMA and MU-MIMO techniques.

In MU-OFDMA schemes, the available frequency spectrum of the wireless channel may be divided into a multiple RUs each including a number of different frequency sub-carriers ("tones"). Different RUs may be allocated or assigned by an AP 105 to different STAs 115 at particular times. The sizes and distributions of the RUs may be referred to as an RU allocation. RUs may be allocated in 2 MHz intervals, and as such, the smallest RU includes 26 tones consisting of 24 data tones and 2 pilot tones. As such, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Therefore, it may be possible to schedule as many as 74 STAs 115 for MU-OFDMA transmissions. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 105 can transmit a trigger frame to initiate and synchronize an UL MU-OFDMA or UL MU-MIMO transmission from multiple STAs 115 to the AP 105. Such trigger frames may enable multiple STAs 115 to send UL traffic to the AP 105 concurrently in time. A trigger frame may address one or more STAs 115 through respective association identifiers (AIDs), and may assign each AID one or more RUs that can be used to send UL traffic to the AP 105. The AP also may designate one or more random access (RA) RUs that unscheduled STAs 115 may contend for.

In some examples, some types of STAs 115 and APs 105 may operate on a resource deployment specific to HE operations (such as, 11ax Wi-Fi technology), known as a greenfield deployment. The STAs 115 or APs 105 may support functionality on a dynamic channel bandwidth spectrum. The dynamic channel bandwidth spectrum may be a portion of the frequency spectrum that includes frequency bands of the above RF spectrum, including the emerging 6 GHz band. The APs 105 may assume there are no legacy devices (such as, 802.11a, 802.11b, 802.11g supported STAs according to the IEEE 802.11 family of standards) operating on the channel and may transmit periodic beacon frames to one or more STAs 115 using a HE or EHT PPDU format.

The STAs 115 within wireless range of an AP 105 may receive the HE or EHT PPDU carrying a periodic beacon frame from the AP 105 and process the beacon frame to establish or maintain a communication link with the WLAN. For example, associated STAs (STAs associated with the BSS managed by the AP) may identify the time stamp of each beacon frame and determine an update to one or more information elements or fields of the beacon frame. In other examples, unassociated STAs may determine whether to associate with the BSS based on one or more operating parameters of the received beacon frames.

Figure 2A:
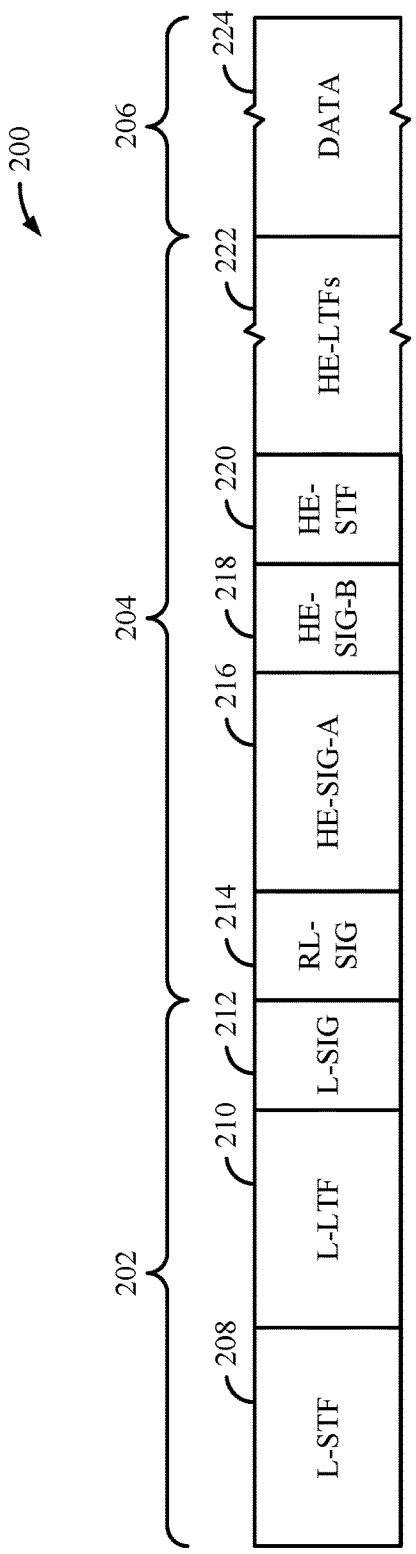
FIG. 2A shows an example protocol data unit (PDU) usable for communications between an access point (AP) and a number of stations (STAs) that supports HE or EHT signaling in accordance with aspects of the present disclosure.

FIG. 2A shows another example protocol data unit (PDU) 200 usable for wireless communication between an AP and a number of STAs. The PDU 200 may be used for MU-OFDMA or MU-MIMO transmissions. The PDU 200 includes a PHY preamble including a legacy portion 202 and a non-legacy portion 204. The PDU 200 may further include a PHY payload 206 after the preamble, for example, in the form of a PSDU including a DATA field 224. The legacy portion 202 of the preamble includes L-STF 208, L-LTF 210, and L-SIG 212. The non-legacy portion 204 of the preamble and the DATA field 274 may be formatted as a High Efficiency (HE) WLAN preamble and frame, respectively, in accordance with the IEEE 802.11ax amendment to the IEEE 802.11 wireless communication protocol standard. The non-legacy portion 204 includes a repeated legacy signal field (RL-SIG) 214, a first HE signal field (HE-SIG-A) 216, a second HE signal field (HE-SIG-B) 218 encoded separately from HE-SIG-A 216, an HE short training field (HE-STF) 220 and a number of HE long training fields (HE-LTFs) 222. Like the L-STF 208, L-LTF 210, and L-SIG 212, the information in RL-SIG 214 and HE-SIG-A 216 may be duplicated and transmitted in each of the component 20 MHz channels in instances involving the use of a bonded channel. In contrast, HE-SIG-B 218 may be unique to each 20 MHz channel and may target specific STAs 115.

RL-SIG 214 may indicate to HE-compatible STAs 115 that the PPDU is an HE PPDU. An AP 105 may use HE-SIG-A 216 to identify and inform multiple STAs 115 that the AP has scheduled UL or DL resources for them. HE-SIG-A 216 may be decoded by each HE-compatible STA 115 served by the AP 105. HE-SIG-A 216 includes information usable by each identified STA 115 to decode an associated HE-SIG-B 218. For example, HE-SIG-A 216 may indicate the frame format, including locations and lengths of HE-SIG-Bs 218, available channel bandwidths, modulation and coding schemes (MCSs), among other possibilities. HE-SIG-A 216 also may include HE WLAN signaling information usable by STAs 115 other than the number of identified STAs 115.

HE-SIG-B 218 may carry STA-specific scheduling information such as, for example, per-user MCS values and per-user RU allocation information. In the context of DL MU-OFDMA, such information enables the respective STAs 115 to identify and decode corresponding RUs in the associated data field. Each HE-SIG-B 218 includes a common field and at least one STA-specific ("user-specific") field. The common field can indicate RU distributions to multiple STAs 115, indicate the RU assignments in the frequency domain, indicate which RUs are allocated for MU-MIMO transmissions and which RUs correspond to MU-OFDMA transmissions, and the number of users in allocations, among other possibilities. The common field may be encoded with common bits, CRC bits, and tail bits. The user-specific fields are assigned to particular STAs 115 and may be used to schedule specific RUs and to indicate the scheduling to other WLAN devices. Each user-specific field may include multiple user block fields (which may be followed by padding). Each user block field may include two user fields that contain information for two respective STAs to decode their respective RU payloads in DATA field 224.

Figure 2B:
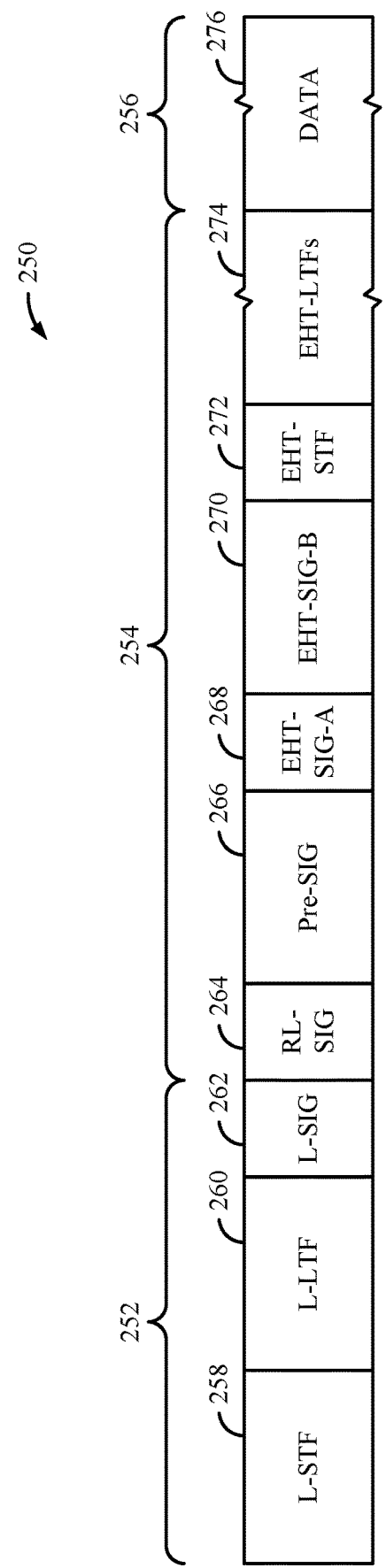
FIG. 2B shows another example PDU usable for communications between an AP and a number of STAs that supports HE or EHT signaling in accordance with aspects of the present disclosure.

FIG. 2B shows an example PPDU 250 usable for wireless communication between an AP and a number of STAs according to some implementations. The PPDU 250 may be used for SU, MU-OFDMA or MU-MIMO transmissions. The PPDU 250 includes a PHY preamble including a legacy portion 252 and a non-legacy portion 254. The PPDU 250 may further include a PHY payload 256 after the preamble, for example, in the form of a PSDU including a DATA field 276. The legacy portion 252 includes L-STF 258, L-LTF 260, and L-SIG 262. The non-legacy portion 254 of the preamble and the DATA field 276 may be formatted as an Extreme High Throughput (EHT) WLAN preamble and frame, respectively, in accordance with the IEEE 802.11 be amendment to the IEEE 802.11 wireless communication protocol standard, or may be formatted as a preamble and frame, respectively, conforming to any later (post-HE) version of a new wireless communication protocol conforming to a future IEEE 802.11 wireless communication protocol standard or other standard.

The non-legacy portion 254 of the preamble includes a second signal field (referred to herein as "Pre-SIG") 266, a third signal field (referred to herein as "EHT-SIG-A" although it may be structured as, and carry version-dependent information for, other wireless communication protocol versions beyond EHT) 268, and a fourth signal field (referred to herein as "EHT-SIG-B" although it may be structured as, and carry version-dependent information for, other wireless communication protocol versions beyond EHT) 270. The non-legacy portion 254 further includes an additional short training field (referred to herein as "EHT-STF" although it may be structured as, and carry version-dependent information for, other wireless communication protocol versions beyond EHT) 272 and a number of additional long training fields (referred to herein as "EHT-LTFs" although they may be structured as, and carry version-dependent information for, other wireless communication protocol versions beyond EHT) 274. Like L-STF 258, L-LTF 260, and L-SIG 262, the information in Pre-SIG 266 and EHT-SIG-A 268 may be duplicated and transmitted in each of the component 20 MHz channels in instances involving the use of a bonded channel. In some implementations, EHT-SIG-A 268 may additionally or alternatively carry information in one or more non-primary 20 MHz channels that is different than the information carried in the primary 20 MHz channel. EHT-SIG-B 270 may be unique to each 20 MHz channel and, as described above, may target specific STAs 115. The non-legacy portion 254 of the preamble may or may not include a repeated legacy signal field (RL-SIG) 264 after L-SIG 262 and before Pre-SIG 266.

EHT-SIG-A 268 may include one or more jointly encoded symbols and may be encoded in a different block from the block in which Pre-SIG 266 is encoded. EHT-SIG-A 268 may be used by an AP to identify and inform multiple STAs 115 that the AP has scheduled UL or DL resources. EHT-SIG-A 268 may be decoded by each compatible STA 115 served by the AP 105. EHT-SIG-A 268 includes information usable by the identified STAs 115 to decode an associated EHT-SIG-B 270. EHT-SIG-A 268 may generally be used by a receiving device to interpret bits in EHT-SIG-B 270 or DATA field 276. For example, EHT-SIG-A 268 may indicate the locations and lengths of EHT-SIG-Bs 270 in the various component channels, available channel bandwidths, and modulation and coding schemes (MCSs), among other possibilities. EHT-SIG-A 268 may further include a cyclic redundancy check (CRC) (for example, four bits) and a tail (for example, 6 bits) that may be used for binary convolutional code (BCC).

EHT-SIG-B 270 may include multiple symbols that may be encoded in a different block from the block in which EHT-SIG-A 268 is encoded. In some other implementations, EHT-SIG-A 268 may be jointly encoded with some or all of EHT-SIG-B 270. For example, EHT-SIG-A 268 may be jointly encoded with a first portion of EHT-SIG-B 270 that includes information common to all users served by the PPDU 250. EHT-SIG-B 270 may carry STA-specific scheduling information such as, for example, per-user MCS values and per-user RU allocation information. EHT-SIG-B 270 may generally be used by a receiving device to interpret bits in the DATA field 276. In the context of DL MU-OFDMA, such information enables the respective STAs 115 to identify and decode corresponding RUs in the associated DATA field 276. Each EHT-SIG-B 270 includes a common field and at least one STA-specific ("user-specific") field. The common field can indicate RU distributions to multiple STAs 115, indicate the RU assignments in the frequency domain, indicate which RUs are allocated for MU-MIMO transmissions and which RUs correspond to MU-OFDMA transmissions, and the number of users in allocations, among other possibilities. The common field may be encoded with common bits, CRC bits, and tail bits. The user-specific fields are assigned to particular STAs 115 and may be used to schedule specific RUs and to indicate the scheduling to other WLAN devices. Each user-specific field may include multiple user block fields (which may be followed by padding). Each user block field may include, for example, two user fields that contain information for two respective STAs to decode their respective RU payloads.

Pre-SIG 266, and RL-SIG 264 if present, may indicate to EHT- or later version-compliant STAs 115 that the PPDU 250 is an EHT PPDU or a PPDU conforming to another non-legacy wireless communication protocol version. For example, Pre-SIG 266 may be used by a receiving device to interpret bits in one or more of EHT-SIG-A 268, EHT-SIG-B 270 or the DATA field 276. In some implementations, Pre-SIG 266 may include a reserved bit that indicates whether the PPDU 250 is, for example, compliant with EHT or a later version (for example, after IEEE 802.11ax) of the IEEE 802.11 family of wireless communication protocol standards or other standards. In some implementations, Pre-SIG 266 includes a version field that includes at least one bit indicating the particular wireless communication protocol version to which the PPDU 250 conforms.

Figure 3:
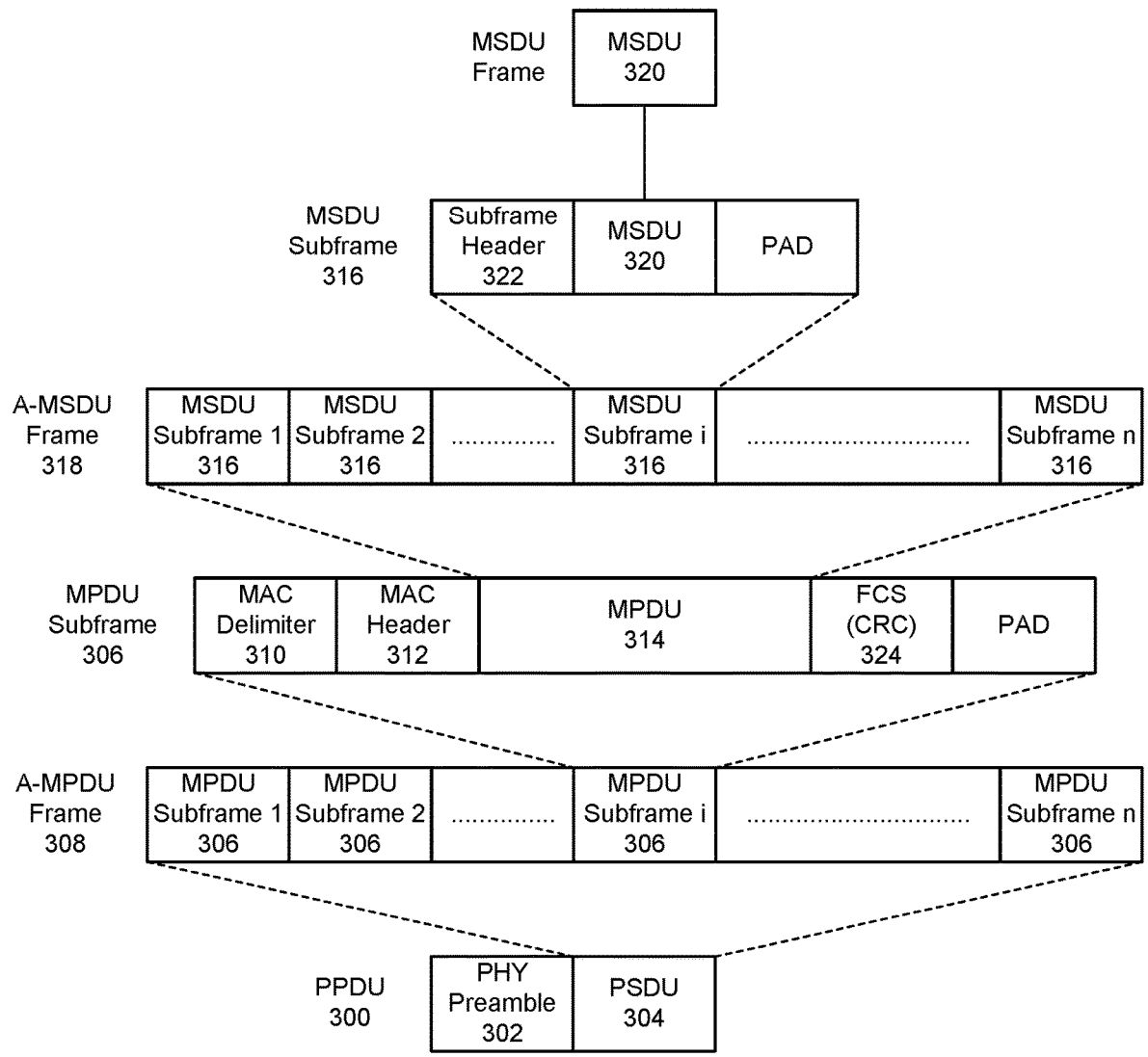
FIG. 3 shows an example of a physical layer convergence protocol (PLCP) protocol data unit (PPDU) that supports HE or EHT signaling in accordance with aspects of the present disclosure.

FIG. 3 shows an example PPDU 300 that supports HE or EHT signaling in accordance with aspects of the present disclosure. In some implementations, PPDU 300 may be usable for communications between an AP 105 and a number of STAs 115, as described with reference to FIG. 1. As described above, each PPDU 300 includes a PHY preamble 302 and a PSDU 304. Each PSDU 304 may carry one or more MAC protocol data units (MPDUs) 306. For example, each PSDU 304 may carry an A-MPDU 308 that includes an aggregation of multiple MPDU subframes 306. Each MPDU subframe 306 may include a MAC delimiter 310 and a MAC header 312 prior to the accompanying MPDU 314, which comprises the data portion ("payload" or "frame body") of the MPDU subframe 306. The MPDU 314 may carry one or more MAC service data unit (MSDU) subframes 316. For example, the MPDU 314 may carry an aggregate MSDU (A-MSDU) 318 including multiple MSDU subframes 316. Each MSDU subframe 316 contains a corresponding MSDU 320 preceded by a subframe header 322.

Referring back to the MPDU subframe 306, the MAC header 312 may include a number of fields containing information that defines or indicates characteristics or attributes of data encapsulated within the MPDU 314. The MAC header 312 also includes a number of fields indicating addresses for the data encapsulated within the MPDU 314. For example, the MAC header 312 may include one or more of a source address, a transmitter address, a receiver address or a destination address. The MAC header 312 may include a frame control field containing control information. The frame control field specifies the frame type, for example, a data frame, a control frame, or a management frame. The MAC header 312 may further including a duration field indicating a duration extending from the end of the PPDU until the end of an acknowledgment (ACK) of the last PPDU to be transmitted by the wireless communication device (for example, a block ACK (BA) in the case of an A-MPDU). The use of the duration field serves to reserve the wireless medium for the indicated duration, thus establishing the NAV. Each MPDU subframe 306 may also include a frame check sequence (FCS) field 324 for error detection. For example, the FCS field 324 may include a CRC.

Figure 4:
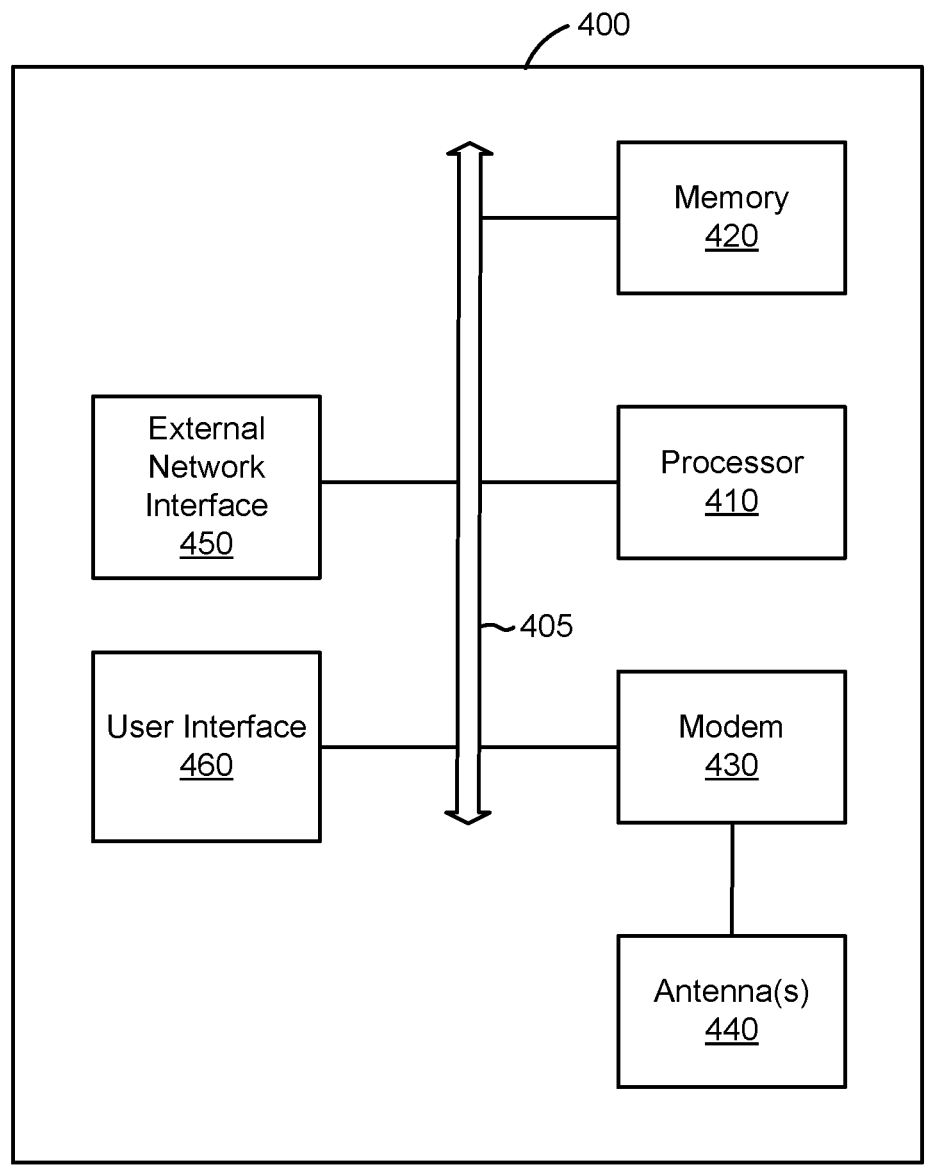
FIG. 4 shows a block diagram of an example AP that supports HE or EHT signaling in accordance with aspects of the present disclosure.

FIG. 4 shows a block diagram of an example AP 400 that supports HE or EHT signaling in accordance with aspects of the present disclosure. For example, the AP 400 may be an example of aspects of the AP 105 described with reference to FIG. 1. The AP 400 is capable of transmitting and receiving wireless communications (for example, in the form of wireless packets), as well as of encoding and decoding such communications. For example, the wireless communications can include Wi-Fi packets including frames conforming to an IEEE 802.11 standard (such as that defined by the IEEE 802.11-2016 specification or amendments thereof including, but not limited to, 802.11ah, 802.11 ay, 802.11ax, 802.11az, and 802.11ba). The AP 400 includes at least one processor 410 (collectively "the processor 410"), at least one memory 420 (collectively "the memory 420"), at least one modem 430 (collectively "the modem 430"), at least one antenna 440 (collectively "the antenna 440"), at least one external network interface 450 (collectively "the external network interface 450") and, in some instances, a user interface (UI) 460. Each of the components (or "modules") described with reference to FIG. 4 can communicate with other ones of the components, directly or indirectly, over at least one bus 405.

The processor 410 can include an intelligent hardware device such as, for example, a central processing unit (CPU), a microcontroller, an application-specific integrated circuit (ASIC), or a programmable logic device (PLD) such as a field programmable gate array (FPGA), among other possibilities. The processor 410 processes information received through the modem 430 and the external network interface 450. The processor 410 also can process information to be sent to the modem 430 for transmission through the antenna 440 and information to be sent to the external network interface 450. The processor 410 can generally be configured to perform various operations related to generating and transmitting a downlink frame and receiving an uplink frame.

The memory 420 can include random access memory (RAM) and read-only memory (ROM). The memory 420 also can store processor- or computer-executable software (SW) code containing instructions that, when executed by the processor 410, cause the processor to perform various functions described herein for wireless communication, including generation and transmission of a DL frame and reception of an UL frame.

The modem 430 is generally configured to modulate packets and to provide the modulated packets to the antenna 440 for transmission, as well as to demodulate packets received from the antenna 440 to provide demodulated packets. The modem 430 generally includes or is coupled with at least one RF transmitter and at least one RF receiver, which may be combined into one or more transceivers, and which are in turn coupled to one or more antennas 440. For example, in some AP implementations, the AP 400 can include multiple transmit antennas (each with a corresponding transmit chain) and multiple receive antennas (each with a corresponding receive chain). The modem 430 can communicate bi-directionally, via the antenna 440, with at least one STA (such as the STA 115 described with reference to FIG. 1).

The modem 430 may include digital processing circuitry, automatic gain control (AGC), a demodulator, a decoder and a demultiplexer. The digital signals received from the transceivers are provided to digital signal processing circuitry configured to acquire a received signal, for example, by detecting the presence of the signal and estimating the initial timing and frequency offsets. The digital signal processing circuitry is further configured to digitally condition the digital signals, for example, using channel (narrowband) filtering, analog impairment conditioning, such as correcting for in-phase and quadrature (I/Q) imbalance, and applying digital gain to ultimately obtain a narrowband signal. The output of the digital signal processing circuitry is fed to the AGC, which is configured to use information extracted from the digital signals, for example, in one or more received training fields, to determine an appropriate gain. The output of the digital signal processing circuitry also is coupled with the demodulator, which is configured to extract modulated symbols from the signal and to reverse map the symbols to points in a modulation constellation to provide demodulated bits. The demodulator is coupled with the decoder, which is configured to decode the demodulated bits to provide decoded bits, which are then fed to the demultiplexer for demultiplexing. The demultiplexed bits may then be provided to the processor 410 for processing, evaluation or interpretation, for example, by one or more host applications executing on the processor.

The AP 400 may communicate with a core or backhaul network through the external network interface 450 to gain access to external networks including the Internet. For example, the external network interface 450 may include one or both of a wired (for example, Ethernet) network interface or wireless (for example, LTE, 4G or 5G) network interface.

Figure 5:
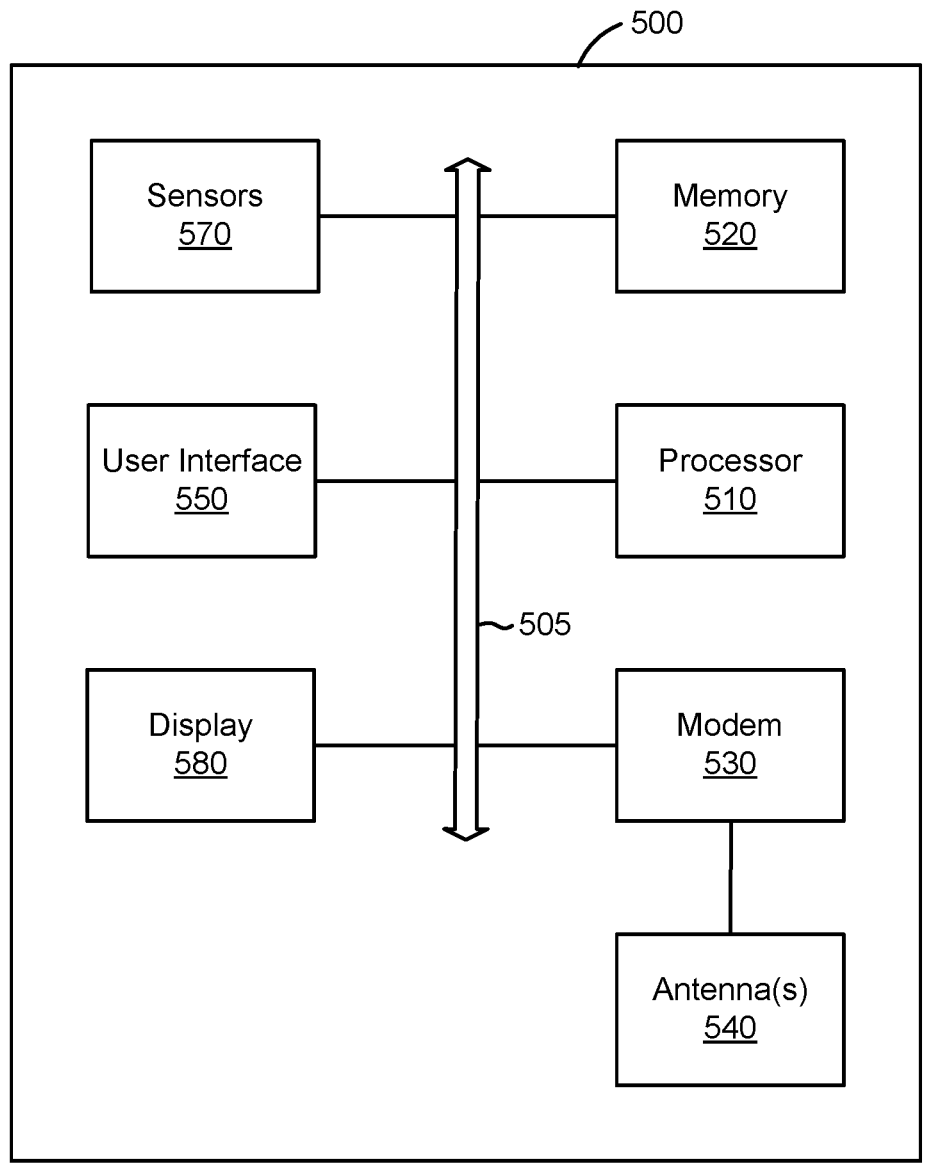
FIG. 5 shows a block diagram of an example STA that supports HE or EHT signaling in accordance with aspects of the present disclosure.

FIG. 5 shows a block diagram of an example station (STA) 500 that supports HE or EHT signaling in accordance with aspects of the present disclosure. For example, the STA 500 may be an example of aspects of the STA 115 described with reference to FIG. 1. The STA 500 is capable of transmitting and receiving wireless communications, as well as of encoding and decoding such communications. The wireless communications may conform to any of a number of different wireless communication protocols. For example, the STA 500 may be capable of transmitting and receiving Wi-Fi packets including frames conforming to an IEEE 802.11 standard, such as defined by the IEEE 802.11-2016 specification or amendments thereof including, but not limited to, 802.11ah, 802.11 ay, 802.11ax, 802.11az, and 802.11ba). Additionally or alternatively, the STA 500 may be capable of transmitting and receiving Bluetooth packets conforming to a Bluetooth standard, such as defined in IEEE 802.15 or by the Bluetooth SIG. Additionally or alternatively, the STA 500 may be capable of transmitting and receiving wireless packets associated with the LTE, International Mobile Telecommunications-Advanced (IMT-Advanced) 4G or 5G standards.

The STA 500 includes at least one processor 510 (collectively "the processor 510"), at least one memory 520 (collectively "the memory 520"), at least one modem 530 (collectively "the modem 530") and at least one antenna 540 (collectively "the antenna 540"). In some implementations, the STA 500 additionally includes some or all of the following: a UI 550 (such as a touchscreen or keypad), one or more sensors 570 (such as one or more inertial sensors, accelerometers, temperature sensors, pressure sensors, or altitude sensors), and a display 580. Each of the components (or "modules") described with reference to FIG. 5 can communicate with one another, directly or indirectly, over at least one bus 505.

The processor 510 includes an intelligent hardware device such as, for example, a CPU, a microcontroller, an ASIC or a PLD such as an FPGA, among other possibilities. The processor 510 processes information received through the modem 530 as well as information to be sent to the modem 530 for transmission through the antenna 540. The processor 510 can be configured to perform various operations related to receiving a downlink frame and generating and transmitting an uplink frame.

The memory 520 can include RAM and ROM. The memory 520 also can store processor- or computer-executable SW code containing instructions that, when executed, cause the processor 510 to perform various functions described herein for wireless communication, including reception of a downlink frame and generation and transmission of an uplink frame.

The modem 530 is generally configured to modulate packets and provide the modulated packets to the antenna 540 for transmission, as well as to demodulate packets received from the antenna 540 to provide demodulated packets. The modem 530 generally includes or is coupled with at least one RF transmitter and at least one RF receiver, which may be combined into one or more transceivers, and which are in turn coupled to one or more antennas 540. For example, in some implementations, the STA 500 can include multiple transmit antennas (each with a corresponding transmit chain) and multiple receive antennas (each with a corresponding receive chain). The modem 530 can communicate bi-directionally, via the antenna 540, with at least one AP (such as the AP 105 or AP 400 described with reference to FIGS. 1 and 4, respectively). As is described above, in some implementations, the modem also can communicate bi-directionally, via the antenna 540, with other STAs directly without the use of an intermediary AP.

The modem 530 may include digital signal processing circuitry, AGC, a demodulator, a decoder and a demultiplexer. The digital signals received from the transceivers are provided to digital signal processing circuitry configured to acquire a received signal, for example, by detecting the presence of the signal and estimating the initial timing and frequency offsets. The digital signal processing circuitry is further configured to digitally condition the digital signals, for example, using channel (narrowband) filtering, analog impairment conditioning, such as correcting for I/Q imbalance, and applying digital gain to ultimately obtain a narrowband signal. The output of the digital signal processing circuitry is fed to the AGC, which is configured to use information extracted from the digital signals, for example, in one or more received training fields, to determine an appropriate gain. The output of the digital signal processing circuitry also is coupled with the demodulator, which is configured to extract modulated symbols from the signal and to reverse map the symbols to points in a modulation constellation to provide demodulated bits. The demodulator is coupled with the decoder, which is configured to decode the demodulated bits to provide decoded bits, which are then fed to the demultiplexer for demultiplexing. The demultiplexed bits may then be provided to the processor 510 for processing, evaluation or interpretation, for example, by one or more host applications executing on the processor.

Figure 6:
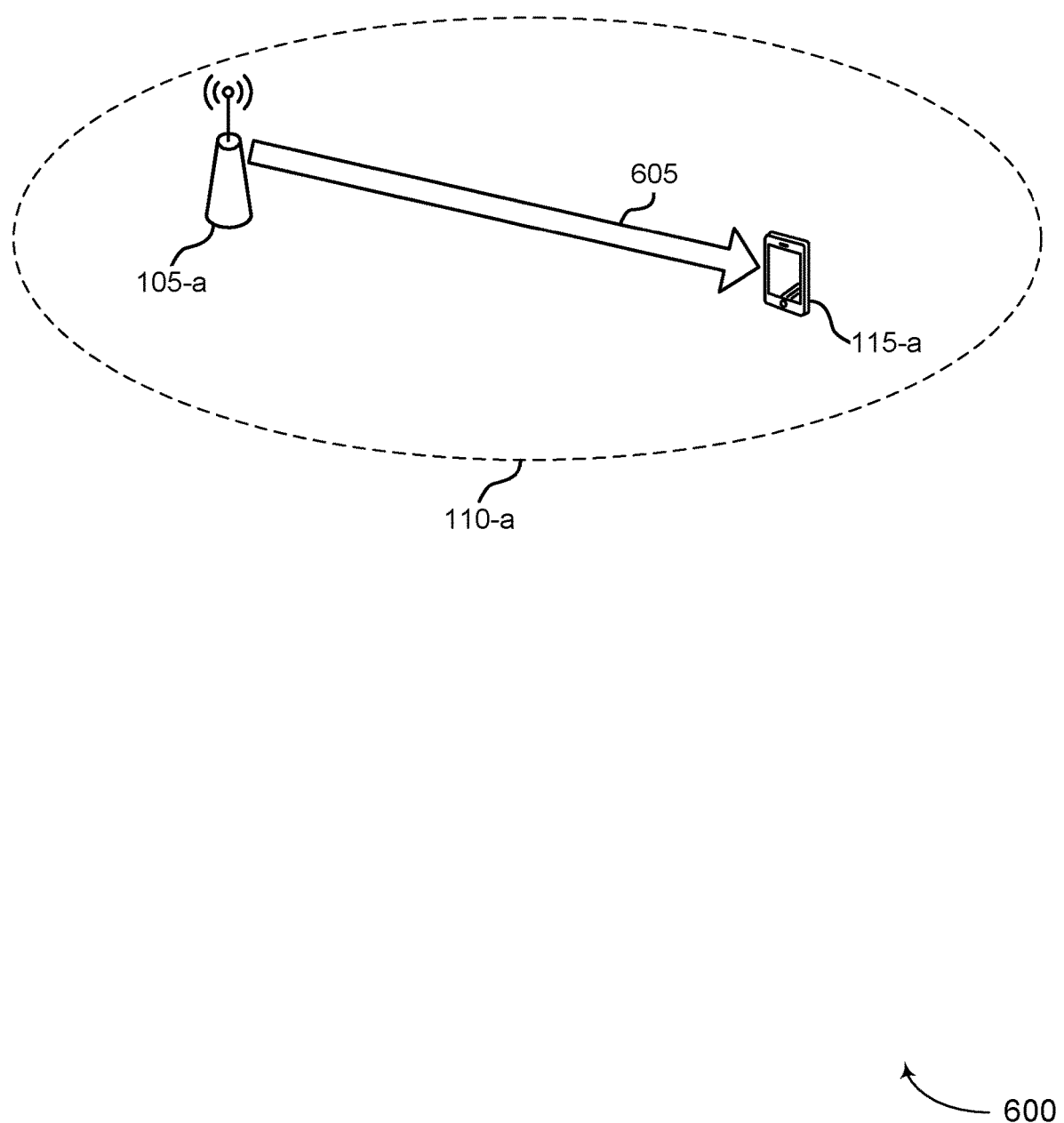
FIG. 6 shows an example of a wireless communications system that supports HE or EHT signaling in accordance with aspects of the present disclosure.

FIG. 6 shows an example of a wireless communications system 600 that supports HE or EHT signaling in accordance with aspects of the present disclosure. Wireless communications system may include an AP 105-a and STA 115-a which may be examples of the corresponding devices described with reference to FIGS. 1-5. The AP 105-a may manage a BSS that includes a set of associated STAs 115. In some examples, STA 115-a may be part of the associated set of STAs 115. In other cases, STA 115-a may be unassociated with the BSS, but be capable of receiving and decoding particular management or discovery transmissions broadcast by the AP 105-a, such as beacons. The BSS may be identified by a SSID that is advertised by the AP 105-a.

In some examples, the BSS may include HE operations on a resource deployment without support for legacy devices, also known as a greenfield deployment. For example, the AP 105-a and STA 115-a may be configured for 802.11ax or EHT operation specific to the resource deployment. The greenfield deployment may include one or more available channel bandwidths, including in RF spectrum (such as the 6 GHz band).

The AP 105-a may communicate with wireless devices, including the STA 115-a, inside a supported coverage area 110-a. For example, the AP 105-a may periodically broadcast one or more beacon frames (which may also be referred to as beacons herein) at a TBTT. The one or more beacon frames may enable STAs 115 within coverage area 110-a to establish or maintain a respective communication link 605 (also referred to as a Wi-Fi link). Based on the greenfield deployment, the AP 105-a may modify the format or contents of a beacon prior to transmission. The modified format or contents of the beacon may support faster content processing and decoding by associated STAs 115 and may improve EBT procedure.

In some examples, the AP 105-a may define a new indicator value within one or more information elements or frames of a HE or EHT PPDU carrying the beacon frame. In other cases, the AP 105-a may modify the beacon frame format to include content or indications significant to STA operation at the beginning of a beacon frame. The content or indications significant to STA operation may be referred to as "critical" elements and may include, for example, at least one of a timestamp field, a high throughput (HT) field, a VHT field, a HE operations element or field, a change sequence field, such as an AP configuration sequence number (AP-CSN) field, or one or more new fields formatted to be carried on the beacon frame. In some cases, the "critical" elements may be those elements that are indicated as changed by the indicator value. For example, the "critical" elements may exclude the remaining elements that are not indicated as changed by the indicator value. That is, the "critical" elements may be a set of elements of a beacon that are grouped together as a set to be indicated as changed by the indicator value, without being explicitly defined or otherwise characterized as "critical" elements.

In some examples, the AP 105-a may transmit a beacon frame with one or more additional frames, as part of an A-MPDU carried over the PPDU. The A-MPDU may aggregate the beacon frame with one or more additional frames. The additional frame may include an indication value denoting an update to one or more of the elements (for example, a set of "critical" elements) of the beacon frame. Additionally or alternatively, the AP 105-a may aggregate one or more additional frames as part of an A-MPDU with a higher transmission frequency (for example, 20 ms). The aggregated additional frames may indicate an update to one or more "critical" elements of an upcoming beacon frame (which may be transmitted every 100 ms, or according to a TBTT). The A-MPDU may be protected to support the EBT operation at associated STAs of the BSS. For example, the AP 105-a may protect the A-MPDU carried over the PPDU based on the one or more indication values denoting an update to one or more of the elements for example, a set of "critical" elements) of the beacon frame. By protecting the transmission, the AP 105-a may improve security against malicious attacks containing unsolicited frames, including indications that the contents of the beacon frame have not changed (in relation to a prior beacon frame). The protection may aid in preventing STA actions that may reduce power or functionality, such as skipping the beacon frame or processing the entire beacon frame.

In some examples, the AP 105-a may support MU transmissions using MU-OFDMA schemes. The available frequency spectrum of the wireless channel may be divided into a multiple RUs each including a number of different frequency subcarriers. The different RUs may be directed to STAs within the coverage area 110-a. For example, a first (primary) RU may be directed to one or more STAs 115 unassociated with the BSS and include a beacon frame or additional frames. A second RU may be directed to one or more associated STAs 115 of the BSS and include a beacon frame or additional frames.

The AP 105-a may transmit the one or more frames as part of a HE MU PPDU transmission protected to support the EBT operation at associated STAs of the BSS. For example, the AP 105-a may protect the HE MU PPDU transmission based on the one or more carried indication values denoting an update to one or more of the elements (for example, a set of "critical" elements) of the beacon frame. By protecting the transmission, the AP 105-a may improve security against malicious attacks containing unsolicited frames, including indications that the contents of the beacon frame have not changed (in relation to a prior beacon frame). The protection may aid in preventing STA actions that may reduce power or functionality, such as skipping the beacon frame or processing the entire beacon frame.

One or more STAs 115 (for example, STA 115-a) supporting HE operation and located within coverage area 110-a may receive the HE or EHT PPDU (or a variant such as an HE or EHT PPDU carrying an A-MPDU, or a HE or EHT MU PPDU) from an AP 105 (for example, AP 105-a). Based on the receiving, the STAs 115 may process the frames carried on the PPDU, including the one or more beacon frames. For example, unassociated STAs 115 may determine whether to associate with the BSS based on one or more operating parameters of the PPDU. Associated STAs 115 of the BSS may identify the time stamp of each beacon frame, and identify content or indications significant to STA operation. Based on the indications, the associated STAs 115 may determine an updated format of the beacon frames and process one or more "critical elements" of the beacon frame prior to performing EBT operation.

Figure 7:
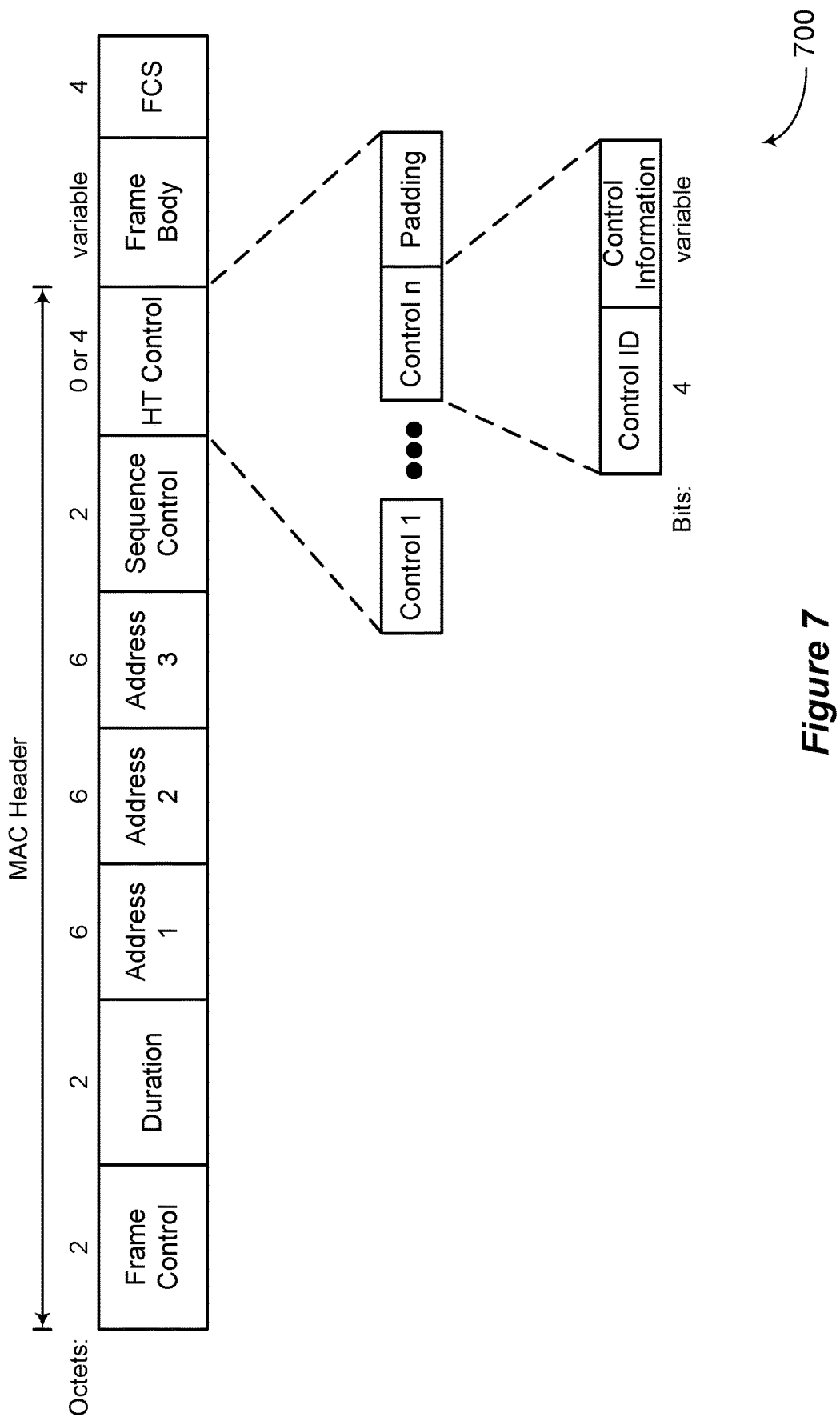
FIG. 7 shows an example of a medium access control (MAC) protocol data unit (MPDU) that supports HE or EHT signaling in accordance with aspects of the present disclosure.

As detailed above, in some examples, an AP (such as an AP 105 with reference to FIGS. 1-6) may define an indicator value within one or more information elements or fields of an HE or EHT PPDU. The PPDU may carry a beacon frame as part of a PSDU. For example, FIG. 7 shows an example of an MPDU 700 that supports HE or EHT signaling in accordance with aspects of the present disclosure. MPDU 700 may an example of an MPDU subframe 306 carried as a part of a PSDU 304 on a PPDU 300, as described with reference to FIG. 3. MPDU 700 may be formatted to include a frame body of variable duration (octets) and contain a beacon frame directed to STAs (such as a STA 115 with reference to FIGS. 1-6) over a beacon interval (according to a TBTT).

The HT control subfield of the MPDU 700 may be formatted as the HE variant of the HT control field and support an indication of HE beacons. For example, a first bit (a VHT bit) of the HT control subfield may be set to 1 and a second bit (an HE bit) of the HT control subfield may be set to 1 to indicate the HE variant of the HT control field. The remaining bits (for example, 30 bits) of the HE variant of the HT control field may contain an aggregated control (A-Control) subfield that spans a sequence of one or more control subfields and a padding field. The format of each control subfield may include a Control ID subfield and a control information subfield.

In some examples, a new control value may be defined for one or more control subfields contained within a control field. For example, a new control ID subfield value may be defined for one or more control subfields contained within the A-Control subfield. The new control ID subfield value may correspond to a new indication within a control information subfield. The new indication may correspond to changes or updates to values within "critical" elements included in the beacon frame. For example, the control information subfield may indicate a change to a VHT field, a HE operation field, a change sequence field, an AP-CSN field, or one or more addition indication elements or fields significant to STA operation (such as a change in BSS operation managed by the AP). A change to the one or more "critical" elements may include at least a change to content or a format. In some examples, the control information subfield indication may be a sequence number. The AP may increment the sequence number within the A-Control field each time there is a change to one or more "critical" elements of the carried beacon frame. In other cases, the control information subfield indication may be a hash of the values carried by the "critical" elements of the beacon frame. The AP may update the hash values within the A-Control field each time there is a change to one or more "critical" elements included in the beacon frame.

A STA associated with the BSS may receive the HE or EHT PPDU carrying the beacon frame from the AP. The STA may process and decode the PHY preamble of the PPDU and the MAC header of the carried PSDU. Based on the processing, a type/subtype field in the frame control field of the MAC header may indicate to the STA that the received PPDU is a beacon frame. The STA may then parse the A-Control subfield of the HE variant HT control field and identify the included indication provided by the one or more Control Information subfields. Based on the identified indication, the STA may determine to process the beacon frame or skip the rest of the beacon frame. For example, the STA may identify if a sequence number within the A-Control field has incremented or if a hash of values has updated, and determine to process the beacon frame based on the identifying. Parsing the indication within the A-Control subfield of the HE variant HT Control field may support faster content processing and decoding by the STA for EBT operation.

Additionally or alternatively, in some examples, an AP (such as an AP 105 with reference to FIGS. 1-7) may modify the beacon frame format and re-order one or more elements (such as fields or information elements carrying a field). As described above, the order in which fields and information elements appear in a beacon frame for traditional Wi-Fi operations (such as over 2.4 GHz or 5 GHz in a non-HT formatted PPDU) may be suboptimal for power considerations. For example, "critical" elements corresponding to BSS operations may be formatted within latter portions of a beacon frame. As a result, the AP may re-order the "critical" elements associated with the beacon frame. For example, in some examples, the AP may move particular elements that include an indication to the beginning of the beacon frame. In other cases, the AP may re-order the set of elements to include all "critical" elements at the beginning of the beacon frame.

Figure 8:
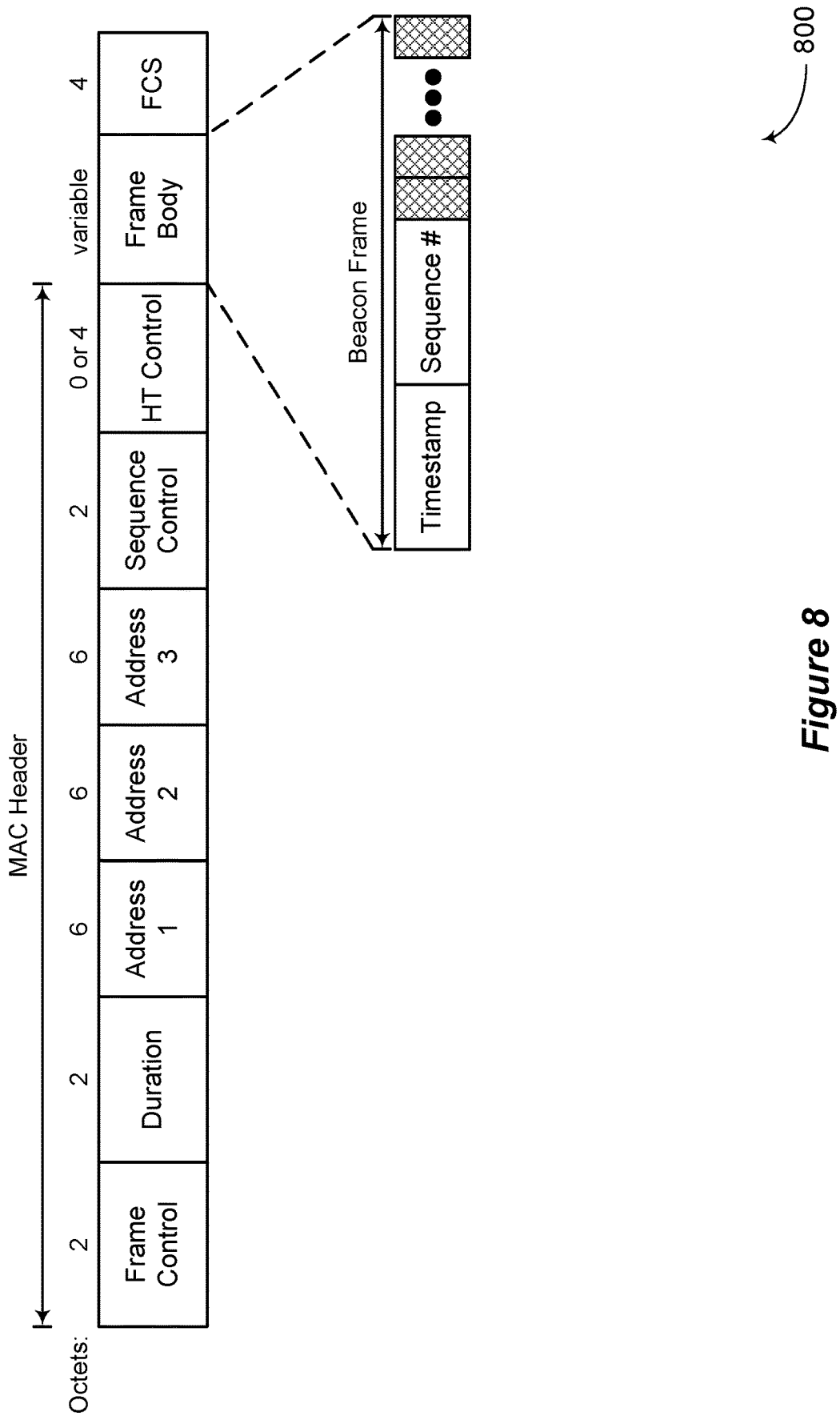
FIG. 8 shows an example of an MPDU that supports HE or EHT signaling in accordance with aspects of the present disclosure.
Figure 9:
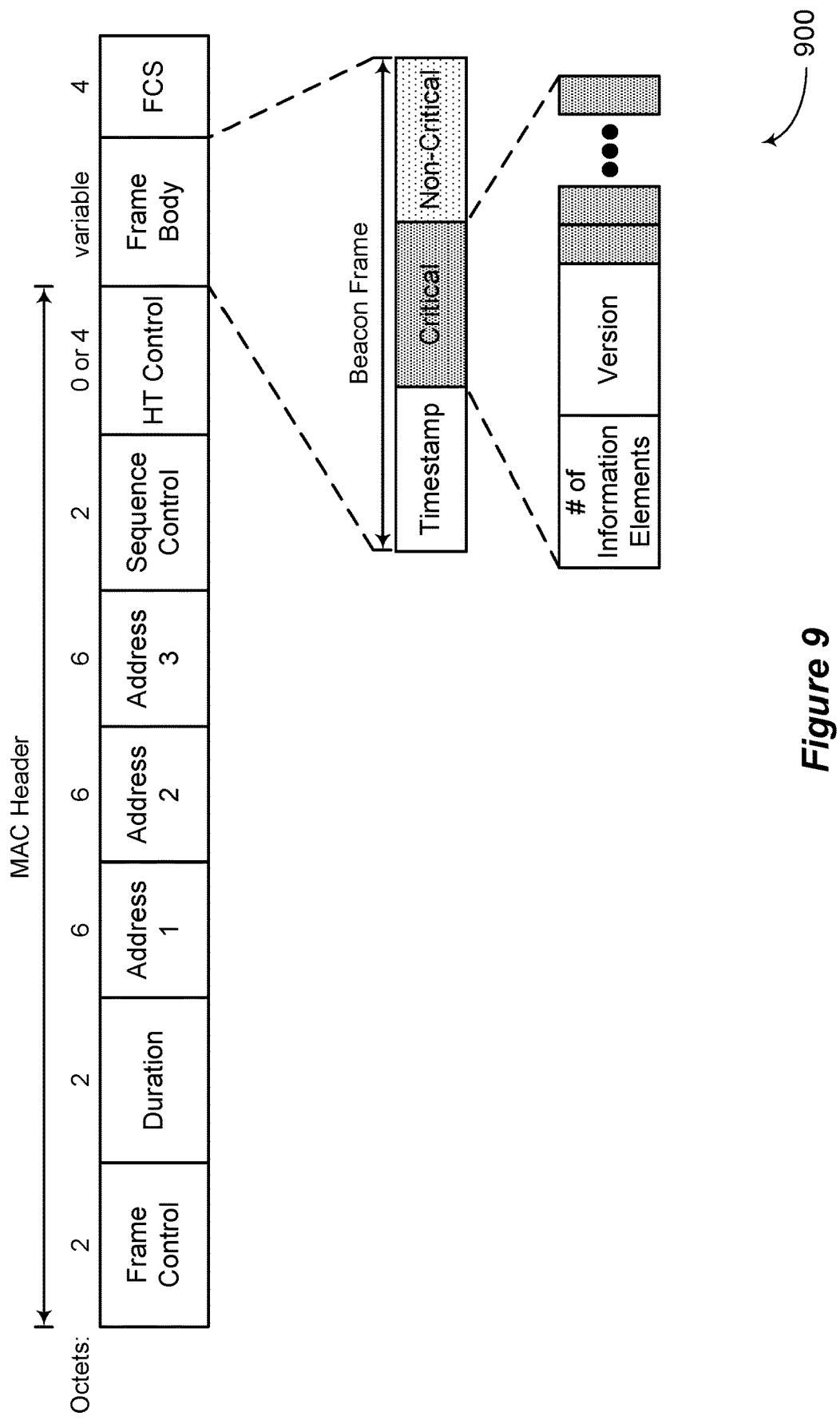
FIG. 9 shows an example of an MPDU that supports HE or EHT signaling in accordance with aspects of the present disclosure.

A HE or EHT PPDU may carry the beacon frame as part of a PSDU. For example, FIGS. 8 and 9 show examples of MPDUs 800 and 900 that support HE beacons in accordance with aspects of the present disclosure. MPDUs 800 and 900 may each be examples of an MPDU subframe 306 carried as a part of a PSDU 304 on a PPDU 300, as described with reference to FIG. 3. MPDUs 800 and 900 may be formatted to include a frame body of variable duration (octets) and contain a beacon frame directed to STAs (such as a STA 115 with reference to FIGS. 1-7) over a beacon interval (according to a TBTT).

As shown with reference to FIG. 8, the AP may modify the beacon frame to carry a new sequence number field or element carrying a sequence number field. The sequence number field or the element carrying the sequence number field may directly follow a timestamp field at the beginning of the beacon frame. The sequence number field or the element containing the sequence number field may include a sequence number value. The AP may increment the sequence number value each time there is a change to one or more "critical" elements of the carried beacon frame. For example, the AP may increment the sequence number value based on a change to the AP-CSN information element (for example, an increment to the contained 1-octet integer value of the AP-CSN information element) of the beacon frame. The change to the AP-CSN information element may be based on an update to one or more non-dynamic information elements contained within the beacon frame. In other examples, the AP may increment the sequence number value based on a change to the change sequence information element of the beacon frame. In other examples, the AP may increment the sequence number value based on an indication within a check beacon field of a traffic indication map (TIM) element contained within the beacon frame. For each of the described examples, the incrementation to the sequence number value may indicate a change to one or more "critical" elements of the beacon frame and indicate changes to the parameter set of the BSS managed by the AP.

Additionally or alternatively, the AP may format sequence number field or an element containing the sequence number field to include a hash of the values carried by the "critical" elements of the beacon frame. The AP may update the hash values each time there is a change to one or more "critical" elements included in the beacon frame (such as a change to the AP-CSN information element or a change to the change sequence information element).

As shown with reference to FIG. 9, the AP may categorize the "critical" elements of the beacon frame as a first set of elements and categorize one or more additional elements (such as a BSS load field or element carrying the BSS load field) of the beacon frame as a second set of elements. The AP may modify the beacon frame to carry a length field or an element carrying the length field for both the categorized first set of elements and the categorized second set of elements. Additionally, the AP may modify the beacon frame to carry a version number field or an element carrying the version number field for both the first set of elements and the second set of elements. The AP may then modify the format of the beacon frame to include the first set of elements directly after a timestamp field at the beginning of the beacon frame. The AP may format the second set of elements to follow the first set of elements.

For each set of elements (such as the first set of elements or the second set of elements), the length field or an element carrying the length field may identify how many elements belong to the categorized set of elements. Additionally, a version number field or an element carrying the version number field may indicate an update to one or more elements contained within the respective set of elements. For example, the version number field or an element carrying the version number field may include an integer value. The AP may increment the integer value included in the version number field or the element carrying the version number field based on an update to one or more elements.

For each of the described options, a STA associated with the BSS may receive the HE or EHT PPDU carrying the beacon frame from the AP. The STA may process and decode the PHY preamble of the PPDU and the MAC header of the carried PSDU. The STA may then process the beacon frame carried on frame body. In some examples, the STA may parse a sequence number field, or an element carrying a sequence number field, at the beginning of the beacon frame and identify an included indication. Based on the identified indication, the STA may determine to process the beacon frame or skip the rest of the beacon frame. In other cases, the STA may parse a length field, or an element carrying a length field, and identify a modified format of the beacon frame, including an aggregation of the "critical" elements as a first set of elements. The STA may then parse a version number field, or an element carrying a version number field, and identify an included indication. Based on the identified indication, the STA may then determine to process the aggregated "critical" elements of the first set of elements or skip the rest of the beacon frame.

In some examples, an AP (such as an AP 105 with reference to FIGS. 1-9) may maintain a beacon format (for example, with reference to a non-HT beacon format) for HE beacons. The AP may format the PPDU to carry an A-MPDU that aggregates a beacon frame and one or more additional frames. The one or more additional frames may include an indication for updates to at least the "critical" elements of the upcoming beacon frame.

Figure 10:
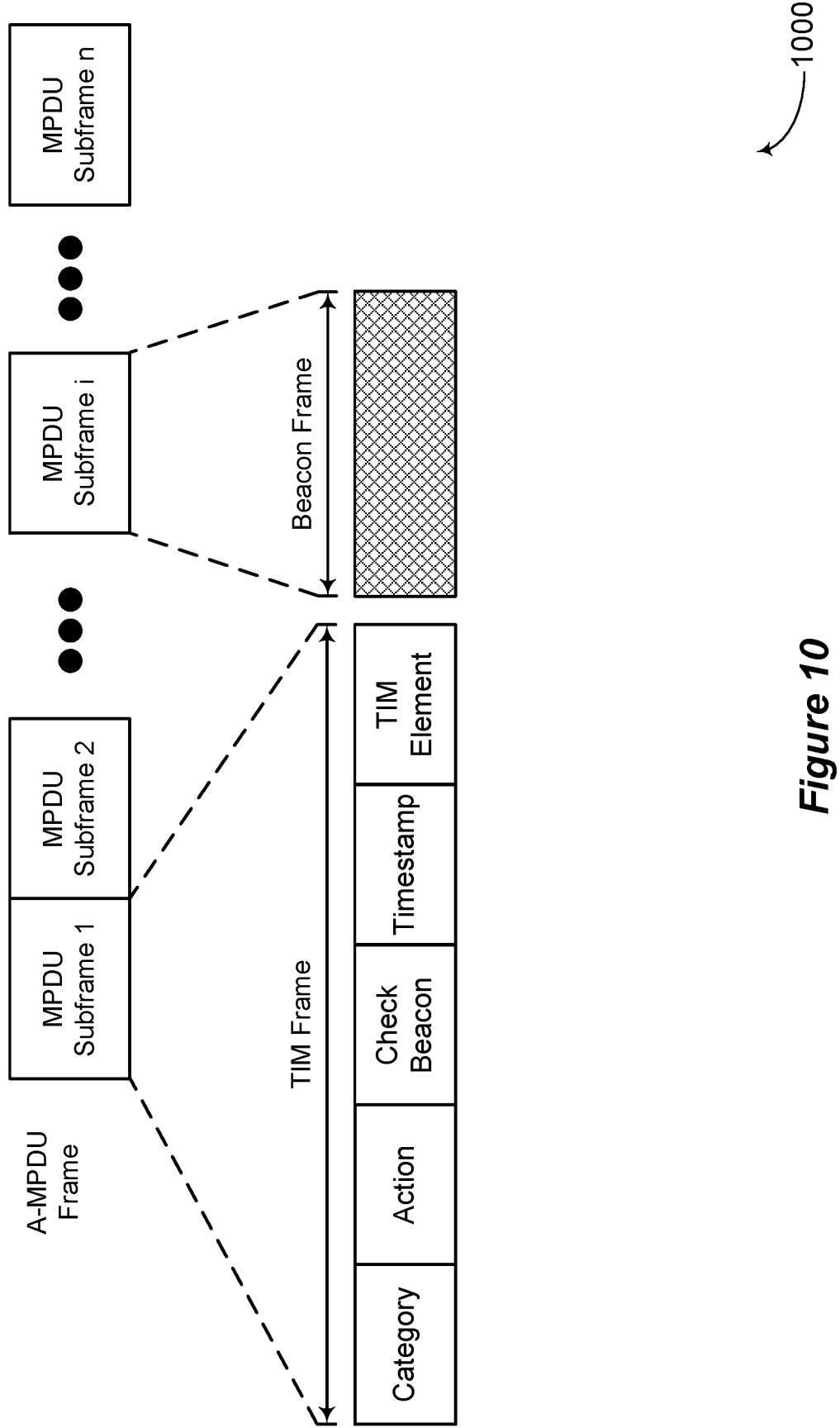
FIG. 10 shows an example of an aggregate MPDU (A-MPDU) that supports HE or EHT signaling in accordance with aspects of the present disclosure.

FIG. 10 shows an example of an A-MPDU 1000 that supports HE or EHT signaling in accordance with aspects of the present disclosure. A-MPDU 1000 contains a multiple MPDU subframes. A-MPDU 1000 may be an example of an A-MPDU frame 308 that contains a set of MPDU subframes 306, as described with reference to FIG. 3. A-MPDU 1000 may be carried as a part of a PSDU 304 on a PPDU 300, as described with reference to FIG. 3. The AP may aggregate a beacon frame and a TIM frame or an element carrying a TIM frame within the A-MPDU 1000. The TIM frame or an element carrying a TIM frame may be included in an MPDU subframe of the A-MPDU 1000. The TIM frame or element carrying the TIM frame may contain a set of fields spanning multiple octets.

The TIM frame may include a value to indicate one or more updates to "critical" elements of the beacon frame. For example, the check beacon field or an element carrying a check beacon field within the TIM frame may include an indication value. The AP may increment the indication value to indicate a change in content or format to "critical" elements of an upcoming beacon frame within the A-MPDU 1000. The change in content or format to the "critical" elements may correspond to change to the BSS operating parameters or other STA critical information. The TIM frame or the element carrying the TIM frame may also include a timestamp element and a TIM element which may carry information for the STA.

Additionally or alternatively, an AP-CSN field or change sequence field of the A-MPDU 1000 may include an integer value. The AP may increment the integer value each time there are updates to beacon content within the beacon frame. In some examples, the AP may format an action frame that carries a field which provides an indication of any changes to "critical" elements of the beacon. The indication may include a sequence number value or a hash of the values carried by the "critical" elements of the beacon frame.

A STA associated with the BSS may receive the HE or EHT PPDU carrying the A-MPDU 1000 from the AP. The STA may process and decode the PHY preamble of the PPDU and begin processing the one or more MPDU subframes of A-MPDU 1000. The A-MPDU may be protected to support the EBT operation at associated STAs of the BSS. By protecting the transmission, the AP 105-a may improve security against malicious attacks containing unsolicited frames, including indications that the contents of the beacon frame have not changed (in relation to a prior beacon frame). The protection may aid in preventing STA actions that may reduce power or functionality, such as skipping the beacon frame or processing the entire beacon frame. The STA may then parse the TIM frame, or the element carrying the TIM frame, and identify an included indication (for example, within the check beacon frame). Based on the identified indication, the STA may identify any updates to "critical"

elements of an upcoming beacon frame and determine to process the "critical" elements of the beacon frame or skip the processing.

In some examples, an AP (such as an AP 105 with reference to FIGS. 1-10) may maintain a beacon format (for example, with reference to a non-HT beacon format). In addition, the AP may format the PPDU to carry an A-MPDU that aggregates one or more frames of increased transmission frequency (for example, 20 ms) and shorter duration relative to the beacon frame. The one or more frames may provide increased indication to one or more associated or unassociated STAs of the deployment. For example, the one or more frames may indicate changes to "critical" elements of the upcoming beacon frame. Additionally or alternatively, the one or more frames may provide additional resources or indications to unassociated STAs and reduce probing procedure of the resource deployment.

Figure 11:
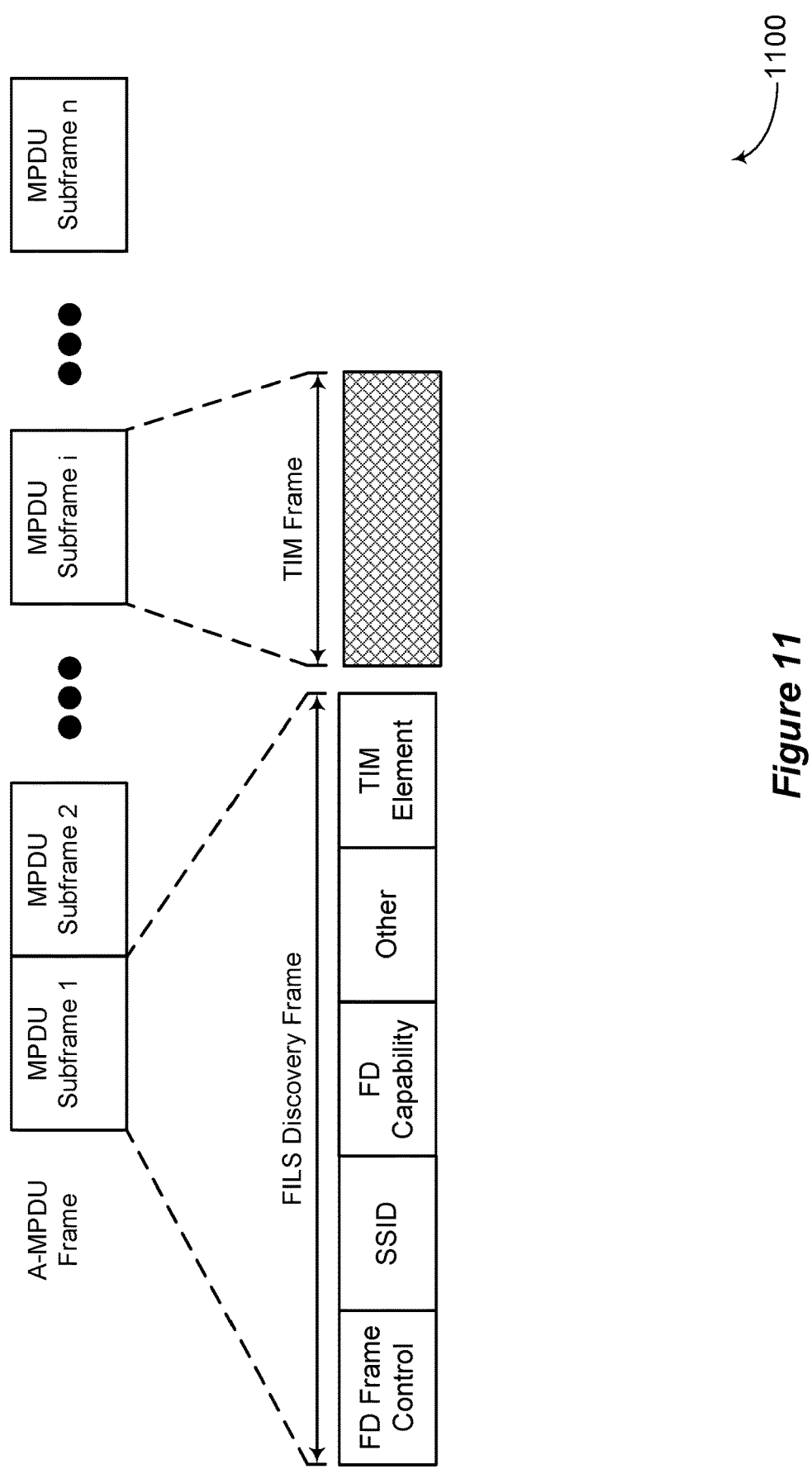
FIG. 11 shows an example of a A-MPDU that supports HE or EHT signaling in accordance with aspects of the present disclosure.

FIG. 11 shows an example of an A-MPDU 1100 that supports HE or EHT signaling in accordance with aspects of the present disclosure. A-MPDU 1100 contains a multiple MPDU subframes. A-MPDU 1100 may be an example of an A-MPDU frame 308 that contains a set of MPDU subframes 306, as described with reference to FIG. 3. A-MPDU 1100 may be carried as a part of a PSDU 304 on a PPDU 300, as described with reference to FIG. 3.

In order to reduce probes by unassociated STAs, the AP may format the A-MPDU 1100 to include periodic (every 20 ms) FILS Discovery frames. The FILS discovery frames may be directed to unassociated STAs of the deployment. The AP may aggregate the FILS discovery frames with a TIM frame (such as a TIM frame as described with reference to FIG. 10). The TIM frame may carry an indication for "critical" elements of an upcoming beacon frame directed to associated STAs. For example, the AP may increment the indication value in the TIM frame or the element carrying the TIM frame to indicate a change in content or format to "critical" elements of an upcoming beacon frame. In some examples, the AP may aggregate the FILS discovery frames with a TIM frame when there is a change in BSS operating parameters indicated within the upcoming beacon frame.

An unassociated STA may receive the HE or EHT PPDU carrying A-MPDU 1100 from the AP. The STA may parse the FILS discovery frames of the A-MPDU 1100 and determine information regarding the beacon frame. An associated STA may receive the PPDU carrying A-MPDU 1100 from the AP. In some examples, the associated STA may parse the TIM frame, or the element carrying the TIM frame, and identify an included indication (for example, within the check beacon frame). Based on the identified indication, the STA may determine any updates to "critical" elements of an upcoming beacon frame of the A-MPDU 1100 and determine to process the "critical" elements of the beacon frame or skip the processing.

In some examples, the wireless communications system may support MU transmissions; that is, concurrent transmissions from one device to each of multiple devices (for example, multiple simultaneous DL communications from an AP to corresponding STAs). The available frequency spectrum of a wireless channel may be divided into a multiple RUs each including a number of different frequency subcarriers ("tones"). Different RUs may be allocated or assigned by an AP to associated STAs and unassociated STAs during a beacon interval (according to a TBTT). The sizes and distributions of the RUs may be referred to as an RU allocation and support channel bandwidths. For example, the AP may transmit a HE MU PPDU that carries one or more PSDU contents directed to unassociated STAs on a first (primary) subchannel, and PSDU contents directed to associated STAs on a second (secondary) subchannel. In some examples, the primary and secondary subchannels may span 20 MHz, 40 MHz, 80 MHz, 160 MHz, or other channel frequency bandwidths.

Figure 12:
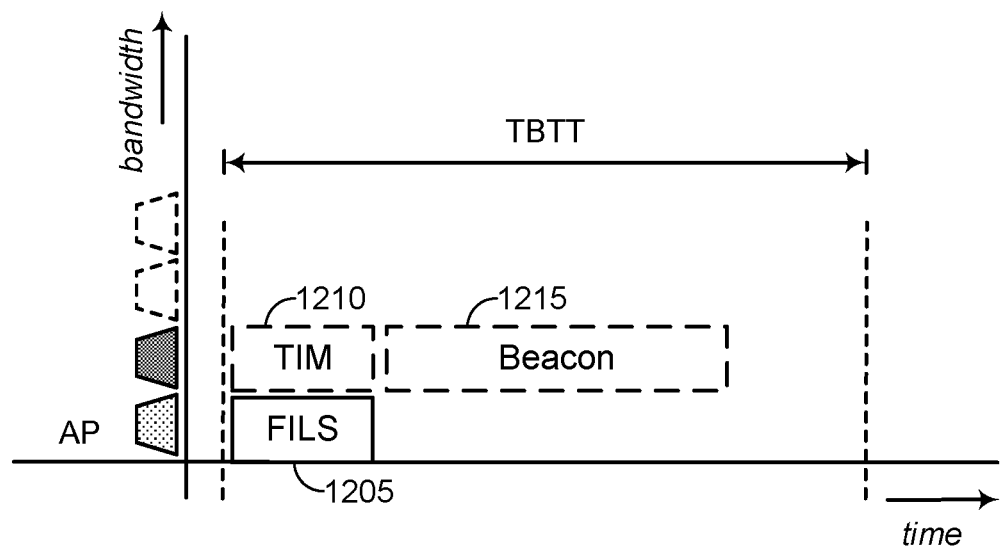
FIG. 12 shows an example of a transmission scheme that supports HE or EHT signaling in accordance with aspects of the present disclosure.

FIG. 12 shows an example of a transmission scheme 1200 that supports HE or EHT signaling in accordance with aspects of the present disclosure. An AP (such as an AP 105 as described with reference to FIGS. 1-11) may implement transmission scheme 1200 for downlink signaling. The AP may support MU-OFDMA transmission schemes over RUs of the available frequency spectrum. During a beacon interval (for example, 100 ms), the AP may transmit a HE MU PPDU. The HE MU PPDU may be an example of a PPDU 300, as described with reference to FIG. 3.

The AP may format the HE MU PPDU to carry periodic (for example, every 20 ms) FILS discovery frames 1205 directed to unassociated STAs. The AP may transmit the FILs discovery frames 1205 on the primary subchannel associated with a first RU. In some examples, the AP may format the HE MU PPDU to carry a beacon frame 1215 directed to associated STAs of the BSS. The AP may transmit the beacon frame 1215 on the secondary subchannel associated with a second RU. In other cases, the AP may format the HE MU PPDU so that a beacon may not be present within a beacon interval. The AP may format a HE MU PPDU to carry a TIM frame 1210 when a beacon is not present. The AP may transmit the TIM frame 1210 on the secondary subchannel. The TIM frame may be carried to provide traffic indication or version indication for "critical" elements of an upcoming beacon frame (for example, in an upcoming beacon interval).

An unassociated STA may receive the HE MU PPDU carrying FILS discovery frames 1205 over the primary subchannel from the AP. The unassociated STA may parse the FILS discovery frames 1205 and determine information regarding the beacon frame, including basic information of the BSS and when to expect a beacon frame.

In some examples, an associated STA may receive the HE MU PPDU carrying the beacon frame 1215 on the secondary subchannel from the AP. The associated STA may parse the included "critical" elements of the beacon frame and identify one or more included indications. Based on the identified indications, the associated STA may determine to process the beacon frame or skip the rest of the beacon frame. In other cases, an associated STA may receive the HE MU PPDU absent a beacon frame and carrying a TIM frame 1210 from the AP. For example, the secondary subchannel may be unassigned if there is no change to the BSS parameters and the AP does not have buffered frames for transmitting. The associated STA may parse the TIM frame, or the element carrying the TIM frame, and identify an included indication (for example, within the check beacon frame). Based on the identified indication, the STA may determine any updates to "critical" elements of an upcoming beacon frame. In addition, due to the secondary subchannel being absent a beacon frame, unassociated STAs may use directed probing to gather additional information of the upcoming beacon frame.

Figure 13:
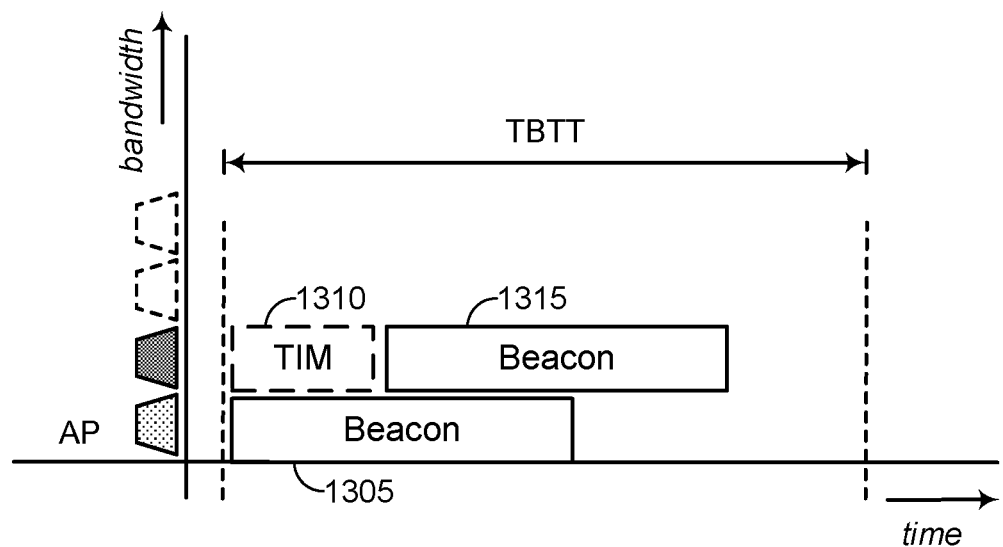
FIG. 13 shows an example of a transmission scheme that supports HE or EHT signaling in accordance with aspects of the present disclosure.

FIG. 13 shows an example of a transmission scheme 1300 that supports HE or EHT signaling in accordance with aspects of the present disclosure. An AP (such as an AP 105 as described with reference to FIGS. 1-13) may implement transmission scheme 1300 for downlink signaling. The AP may support MU-OFDMA transmission schemes over RUs of the available frequency spectrum. At a TBTT, the AP may transmit a HE MU PPDU. The HE MU PPDU may be an example of a PPDU 300, as described with reference to FIG. 3.

The AP may format the HE MU PPDU to carry a beacon frame 1305 directed to unassociated STAs. The beacon frame 1305 may carry elements relevant to unassociated STAs. The AP may transmit the beacon frame 1305 on the primary subchannel associated with the first RU.

In some examples, the AP may format the HE MU PPDU to carry a beacon frame 1315 directed to associated STAs of the BSS. The beacon frame 1315 may include a TIM element or other elements relevant to associated STAs of the BSS. The AP may transmit the beacon frame 1315 on the secondary subchannel associated with the second RU. In some examples, the information elements of beacon frames 1305 and 1315 may overlap, however each of beacon frames 1305 and 1315 may be formatted to include an aggregate beacon size smaller than a single beacon frame carrying all available elements. In other cases, the AP may determine the content of the beacon frame does not include changes to "critical" elements relevant to associated STA operation. The AP may format a HE MU PPDU to carry a TIM frame 1310 when a beacon is not present. The AP may transmit the TIM frame 1310 on the secondary subchannel.

An unassociated STA may receive the HE MU PPDU carrying the beacon frame 1305 over the primary subchannel from the AP. The unassociated STA may parse the beacon frame and determine information of the BSS.

In some examples, an associated STA may receive the HE MU PPDU carrying a beacon frame on the secondary subchannel from the AP. The associated STA may parse the included "critical" elements of the beacon frame and identify one or more included indications. Based on the identified indications, the associated STA may determine to process the remaining contents of the beacon frame or skip the rest of the beacon frame. In other cases, an associated STA may receive the HE MU PPDU absent a beacon frame and carrying a TIM frame 1210 from the AP. For example, the secondary subchannel may be unassigned if there is no change to the BSS parameters and the AP does not have buffered frames for transmitting. The associated STA may parse the TIM frame, or the element carrying the TIM frame, and identify an included indication (for example, within the check beacon frame). Based on the identified indication, the STA may determine any updates to "critical" elements of an upcoming beacon frame.

Figure 14:
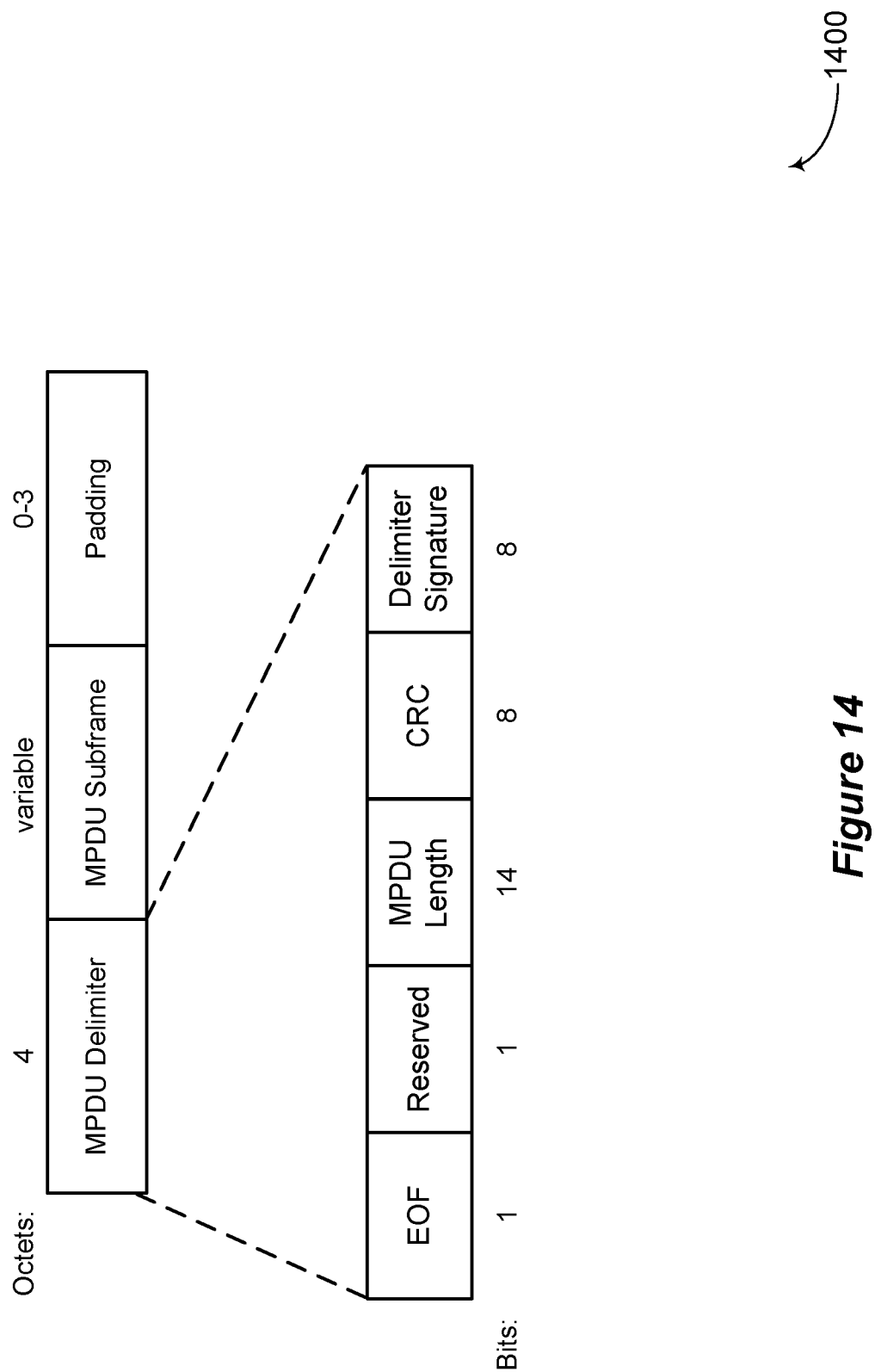
FIG. 14 shows an example of an MPDU format that supports HE or EHT signaling in accordance with aspects of the present disclosure.

FIG. 14 shows an example of an MPDU format 1400 that supports HE or EHT signaling in accordance with aspects of the present disclosure. The MPDU format 1400 may be part of a new sub-format of an HE or EHT PPDU format. The MPDU format 1400 may include an MPDU of variable length and carrying a beacon frame. The MPDU may be an example of an MPDU subframe 306, as described with reference to FIG. 3. In some examples, an MPDU delimiter subfield may be aggregated with a single MPDU carried over the PPDU. In other cases, the AP may support an A-MPDU format and separate one or more MPDU subframes with MPDU delimiter subfields (for example, prior to and following each MPDU frame of the A-MPDU).

The AP may define the MPDU format 1400 and repurpose one or more bits included in an MPDU delimiter subfield to indicate the MPDU carries a beacon frame. For example, the AP may indicate in the reserved bit (B1) of the MPDU delimiter subfield that the delimiter signature subfield has been repurposed to carry an indication. In some examples, the indication may include a sequence number value or a hash of values associated with "critical" elements of the beacon frame. The AP may increment the sequence number value or update the hash of values based on a change to one or more "critical" elements carried by the beacon frame.

Additionally or alternatively, the AP may include an indication in one or more additional fields of the PPDU as part of the new sub-format. For example, the AP may use a reserved bit (B14) of a HE-SIG-A field within the PHY preamble. In other cases, the AP may indicate a beacon frame through a bit indication within a specific field of the PPDU (such as a TXOP duration field value set to 0).

An associated STA may receive the PPDU from the AP and process and decode the carried MPDU or A-MPDU, including the one or more MPDU delimiters. In accordance with MPDU format 1400, the STA may parse the MPDU delimiter subfield and identify an included indication (such a sequence number value or hash of values). Based on identifying the indication, the STA may determine any updates to "critical" elements of an upcoming beacon frame of the MPDU and determine to process the "critical" elements of the beacon frame or skip the processing.

As described above, an FCS field may be processed by a client device (such as a STA 115, as described with reference to FIGS. 1-14) to determine correct reception of the beacon frame. The order in which fields and information elements appear in a beacon frame in traditional Wi-Fi operations (such as over 2.4 GHz or 5 GHz in a non-HT formatted PPDU) may include the FCS field at the end of the PSDU. As a result, the client device may parse the entire beacon frame to receive the FCS field. Operations within greenfield deployments may allow an AP to update the format or content of a beacon frame carried on an HE or EHT PPDU.

Figure 15:
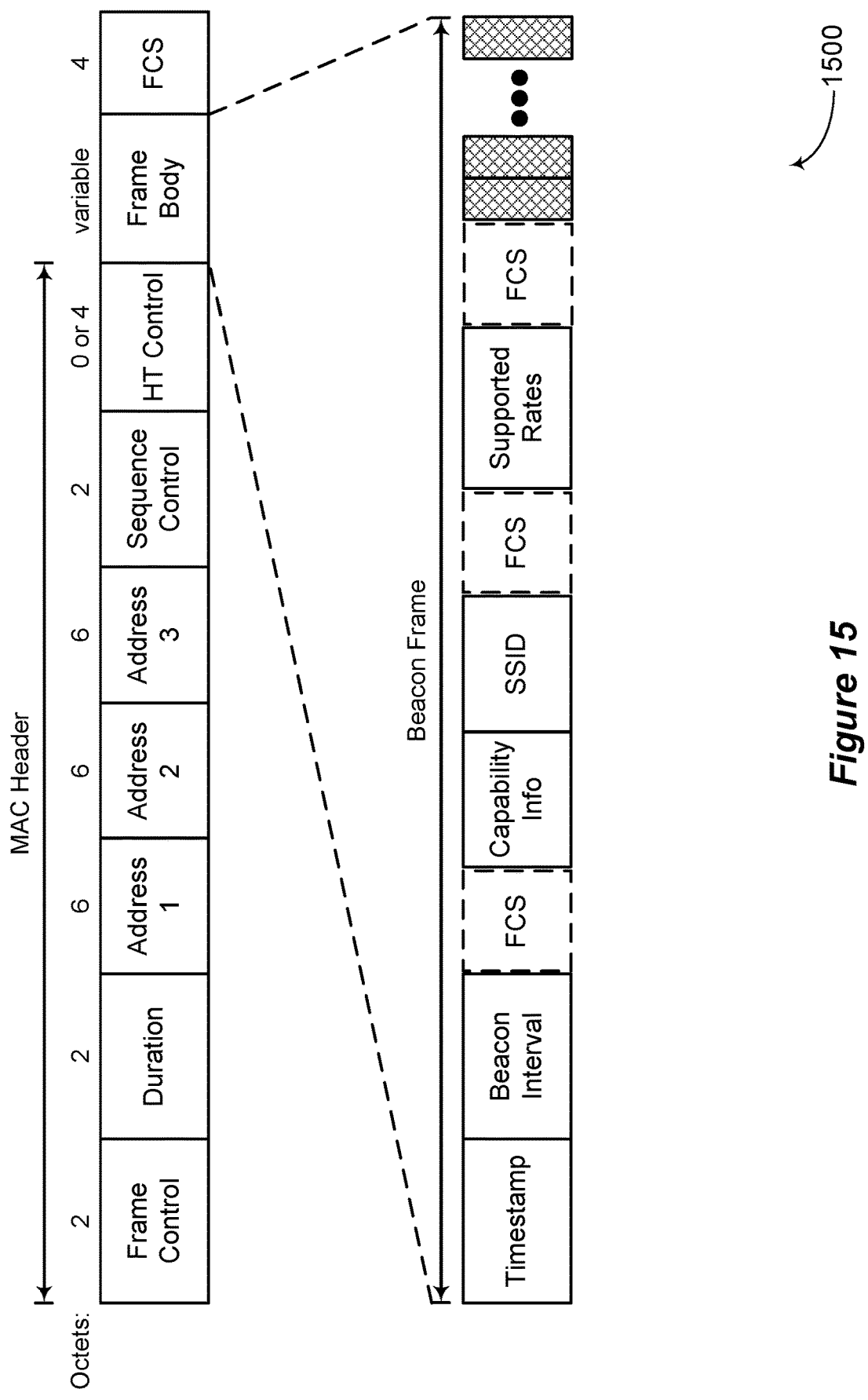
FIG. 15 shows an example of an MPDU that supports HE or EHT signaling in accordance with aspects of the present disclosure.

FIG. 15 shows an example of an MPDU 1500 that supports HE or EHT signaling in accordance with aspects of the present disclosure. MPDU 1500 may be an example of an MPDU subframe 306 carried as a part of a PSDU 304 on a PPDU 300, as described with reference to FIG. 3. MPDU 1500 may be formatted to include a frame body of variable duration (octets). The frame body field may carry a beacon frame directed to STAs (such as a STA 115 with reference to FIGS. 1-14) over a beacon interval (according to a TBTT).

In some examples, the AP may modify a formatting order of information elements or fields to include multiple FCS fields at regular intervals within a beacon frame. In addition, the beacon content may be ordered so that the "critical" elements of the beacon frame appear prior to the additional fields of the beacon frame, as described with reference to FIG. 9. In some implementations, the FCS fields may be interleaved within the organized fields of the beacon frame. The FCS fields interleaved within the beacon frame may be referred to as mid-FCS fields and may contain one or more additional elements.

An associated STA may receive the PPDU from the AP and process and decode the beacon frame. The STA may parse one or more elements of the beacon frame prior to a mid-FCS field. The STA may then read the mid-FCS field and determine if it received the elements correctly. Based on the reading, the STA may continue parsing the beacon frame or skip subsequent processing.

Figure 16:
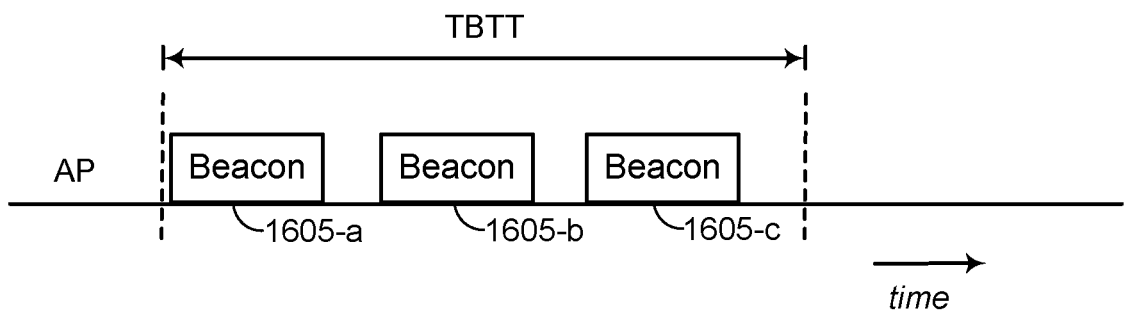
FIG. 16 shows an example of a transmission scheme that supports HE or EHT signaling in accordance with aspects of the present disclosure.

FIG. 16 shows an example of a transmission scheme 1600 that supports HE or EHT signaling in accordance with aspects of the present disclosure. An AP (such as an AP 105 as described with reference to FIGS. 1-15) may implement transmission scheme 1600 for downlink signaling directed to associated STAs.

At a TBTT, the AP may transmit a sequence ("burst") of beacon frames 1605 during a beacon interval. Each of the plurality of beacon frames 1605 may include different elements. For example, the AP may transmit a first beacon frame 1605-*a* including one or more "critical" elements. The AP may then subsequently transmit a second beacon frame 1605-*b* and a third beacon frame 1605-*c* each containing additional elements of the beacon. By transmitting multiple beacon frames 1605, the AP may reduce the payload size of a single beacon frame and improve signaling throughput and reduce erroneous reception at STAs, including when carrying multiple BSSID elements with profile for several non-transmission (nonTX) BSSIDs (nonTXBSSIDs).

An associated STA may receive the beacon frame 1605-*a* from the AP and parse one or more carried elements, including "critical" elements. The STA may then identify one or more included indications. Based on the indication, the STA may process the subsequent beacon frames 1605-*b* or 1605-*c* or may skip the later beacons. In some examples, the STA receives the "critical" elements and thus determines that the STA does not need to further parse the beacon.

Figure 17:
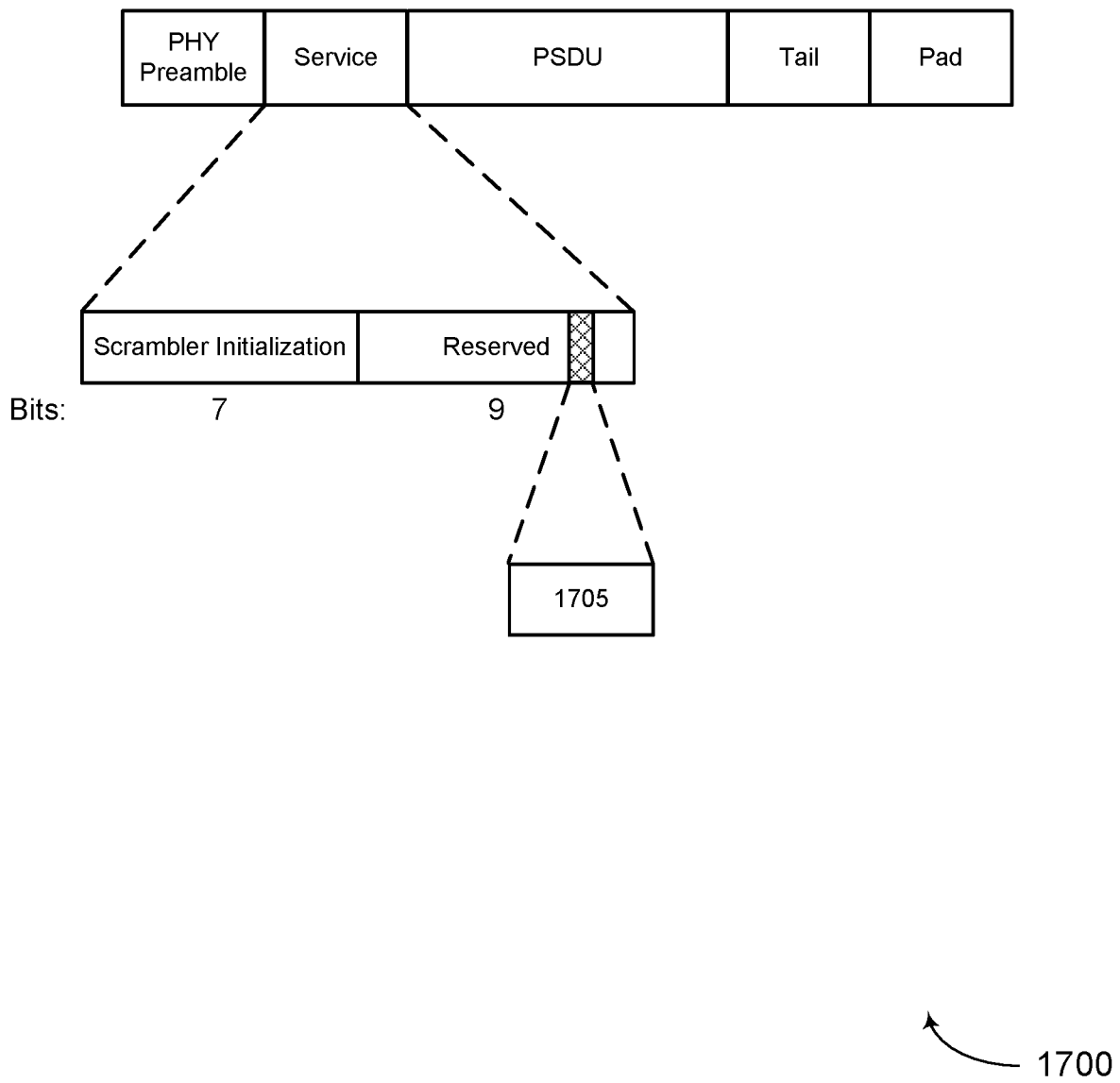
FIG. 17 shows an example of a PPDU that supports HE or EHT signaling in accordance with aspects of the present disclosure.

FIG. 17 shows an example of a PPDU 1700 that supports HE or EHT signaling in accordance with aspects of the present disclosure. PPDU 1700 may be an example of a PPDU 300, as described with reference to FIG. 3. PPDU 1700 may include a PHY preamble and a data field, including a PSDU and a set of tail bits and pad bits. The PSDU may be an example of PSDU 304 on PPDU 300, as described with reference to FIG. 3. The data field may further include a service field for the HE or EHT PPDU.

The AP may modify the format or contents the service field. The modified format or contents of the beacon may aid EBT procedure at the associated STAs. In some examples, the AP may repurpose one or more reserved bits 1705 (for example, one or more of bits B7-B15) within the service field, as shown below in Table 1.

TABLE 1

| Bits | Field | Description |
|---|---|---|
| B0-B6 | Scrambler Initialization | Set to 0 |
| B7-B15 | Reserved | Set to 0 |

The AP may repurpose the reserved bits to carry a sequence number value or a hash of values corresponding to "critical" elements of a beacon frame. For example, the AP may repurpose a first reserved bit to indicate that the PPDU carries a beacon frame, and one or more additional bits to increment the sequence number value or update the hash of values based on a change to one or more "critical" elements. Additionally or alternatively, the AP may include an indication within the type/subtype field of the MAC header of the PSDU. The indication may notify a client device that the PPDU carries a beacon frame and to process the one or more reserve bits of the service field.

An associated STA may receive the PPDU 1700 from the AP and parse the one or more repurposed reserved bits of the service field. The STA may then identify an indication based on the sequence number value or hash of values included in the sequence field. Based on the indication, the STA may process the beacon frame or skip the processing.

Figure 18:
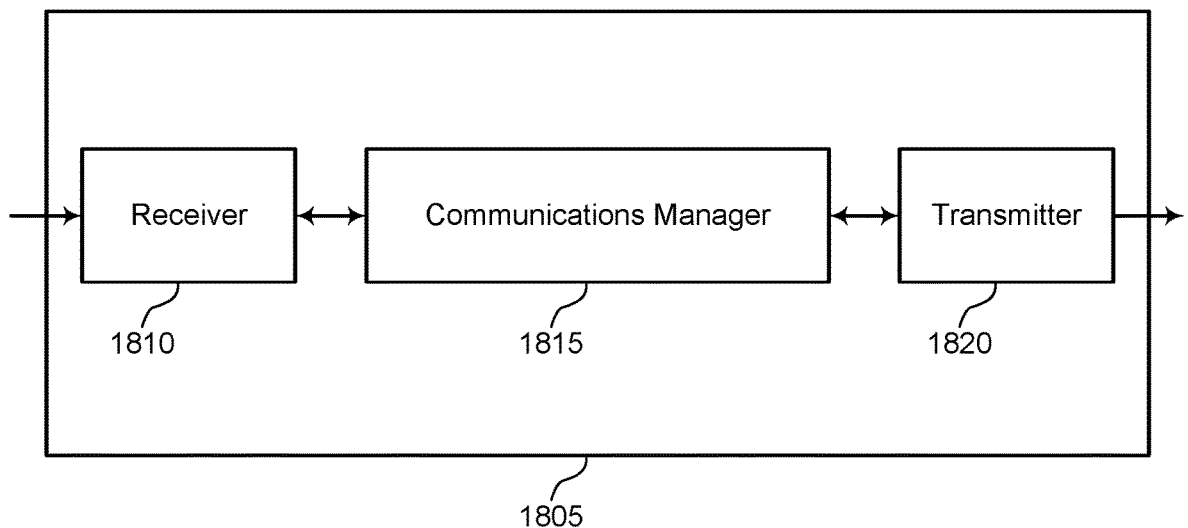
FIGS. 18 and 19 show block diagrams of devices that support HE or EHT signaling in accordance with aspects of the present disclosure.

FIG. 18 shows a block diagram of a device 1805 that supports HE or EHT signaling in accordance with aspects of the present disclosure. The device 1805 may be an example of aspects of an AP as described herein. The device 1805 may include a receiver 1810, a communications manager 1815, and a transmitter 1820. The communications manager 1815 can be implemented, at least in part, by one or both of a modem and a processor. Each of these components may be in communication with one another (for example, via one or more buses).

The receiver 1810 may receive information such as packets, user data, or control information associated with various information channels from the transmitter 1820 (for example, control channels, data channels, and information related to high efficiency beacons). Information may be passed on to other components of the device. The receiver 1810 may be an example of aspects of the transceiver 2120 described with reference to FIG. 21. The receiver 1810 may utilize a single antenna or a set of antennas.

The communications manager 1815 may identify updated capability information of the AP and transmit, in a PPDU, a beacon frame carrying the updated capability information. In some examples, the transmitted PPDU includes an indication of a change to a content or a format, or both, of the first beacon frame relative to a reference beacon frame. The communications manager 1815 may also identify updated capability information for the AP and transmit, in a PPDU, a set of MPDUs that include a beacon frame, or a discovery frame, or both, indicating the updated capability information, and one or more second MPDUs that are non-beacon frames. The communications manager 1815 may be an example of aspects of the communications manager 2110 described herein.

The communications manager 1815, or its sub-components, may be implemented in hardware, code (for example, software or firmware) executed by a processor, or any combination thereof. Additionally or alternatively, the communications manager 1815, or its sub-components, may be physically located at different locations, including being distributed such that portions of functions are implemented at different physical locations by one or more physical components. The actions performed by the communications manager 1815 as described herein may be implemented to realize one or more potential advantages. One implementation may enable an AP to support more efficient beacon transmissions to one or more STAs by indicating a change in content or format, or both, to support EBT operation at the one or more STAs.

The transmitter 1820 may transmit signals generated by other components of the device. In some examples, the transmitter 1820 may be collocated with a receiver 1810 in a transceiver module. For example, the transmitter 1820 may be an example of aspects of the transceiver 2120 described with reference to FIG. 21. The transmitter 1820 may utilize a single antenna or a set of antennas.

Figure 19:
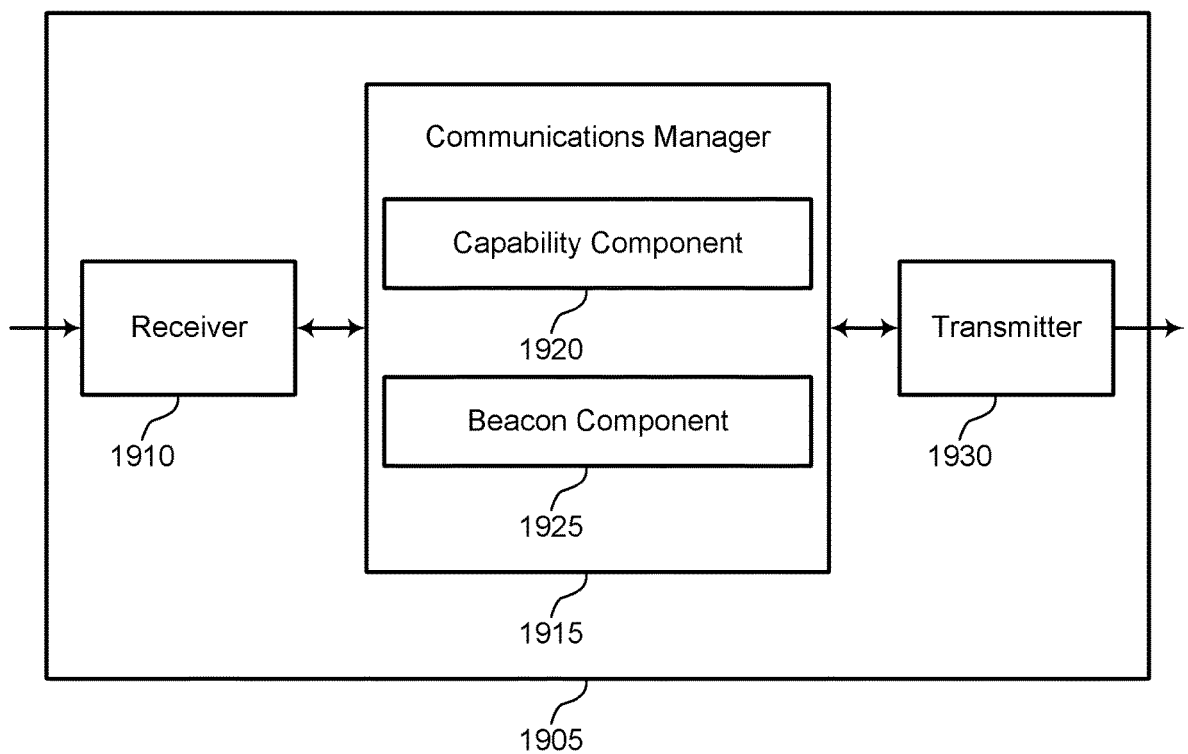

FIG. 19 shows a block diagram of a device 1905 that supports HE or EHT signaling in accordance with aspects of the present disclosure. The device 1905 may be an example of aspects of a device 1805 or an AP 105 as described herein. The device 1905 may include a receiver 1910, a communications manager 1915, and a transmitter 1930. The communications manager 1915 can be implemented, at least in part, by one or both of a modem and a processor. Each of these components may be in communication with one another (for example, via one or more buses).

The receiver 1910 may receive information such as packets, user data, or control information associated with various information channels from the transmitter 1930 (for example, control channels, data channels, and information related to high efficiency beacons). Information may be passed on to other components of the device. The receiver 1910 may be an example of aspects of the transceiver 2120 described with reference to FIG. 21. The receiver 1910 may utilize a single antenna or a set of antennas.

The communications manager 1915 may be an example of aspects of the communications manager 1815 as described herein. The communications manager 1915 may include a capability component 1920 and a beacon component 1925. The communications manager 1915 may be an example of aspects of the communications manager 2110 described herein.

The capability component 1920 may identify updated capability information of the AP.

In some examples, the beacon component 1925 may transmit, in a PPDU, a beacon frame carrying the updated capability information. In some examples, the transmitted PPDU includes an indication of a change to a content or a format, or both, of the first beacon frame relative to a reference beacon frame. In other examples, the beacon component 1925 may transmit, in a PPDU, a set of MPDUs that include a beacon frame, or a discovery frame, or both, indicating the updated capability information, and one or more second MPDUs that are non-beacon frames.

The transmitter 1930 may transmit signals generated by other components of the device. In some examples, the transmitter 1930 may be collocated with a receiver 1910 in a transceiver module. For example, the transmitter 1930 may be an example of aspects of the transceiver 2120 described with reference to FIG. 21. The transmitter 1930 may utilize a single antenna or a set of antennas.

Figure 20:
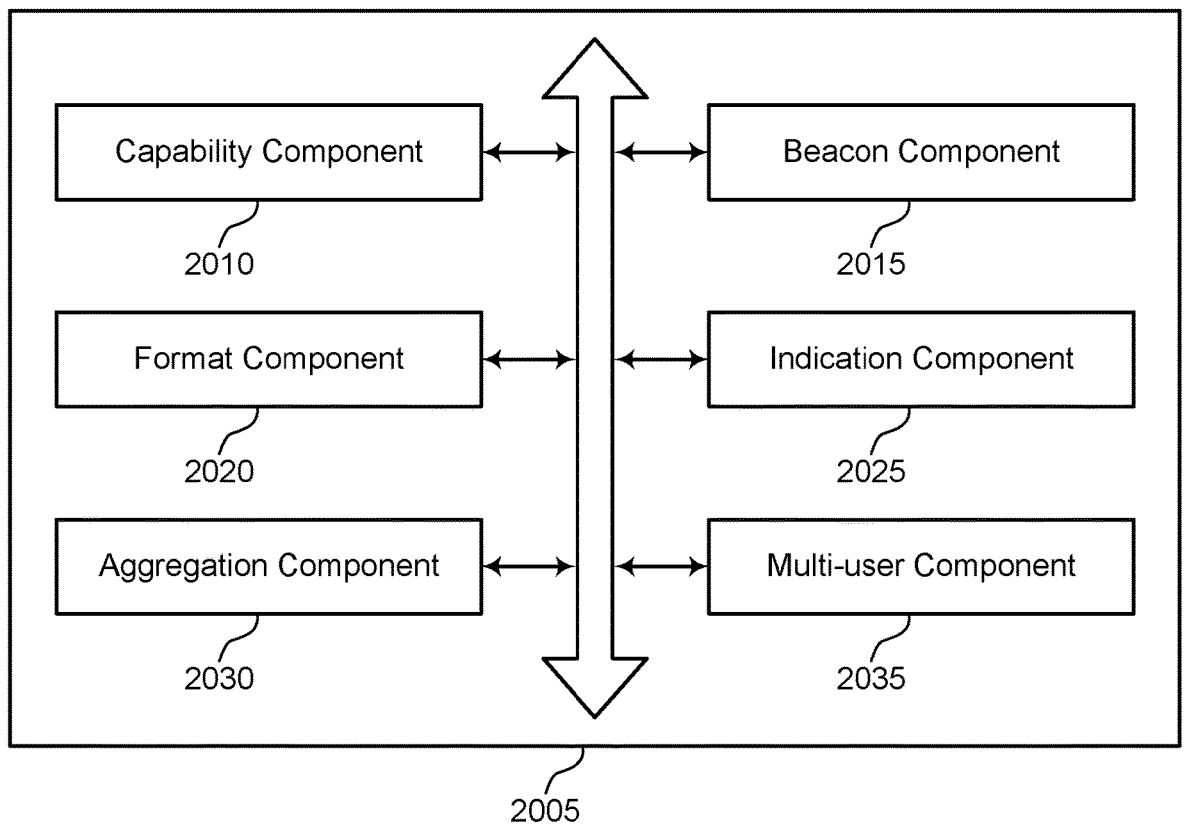
FIG. 20 shows a block diagram of a communications manager that supports HE or EHT signaling in accordance with aspects of the present disclosure.

FIG. 20 shows a block diagram of a communications manager 2005 that supports HE or EHT signaling in accordance with aspects of the present disclosure. The communications manager 2005 may be an example of aspects of a communications manager 1815, a communications manager 1915, or a communications manager 2110 described herein. The communications manager 2005 may include a capability component 2010, a beacon component 2015, a format component 2020, an indication component 2025, an aggregation component 2030, and a multi-user component 2035. Each of these modules may communicate, directly or indirectly, with one another (for example, via one or more buses).

The capability component 2010 may identify updated capability information of the AP. The beacon component 2015 may transmit, in a PPDU, a beacon frame carrying the updated capability information. In some examples, the transmitted PPDU includes an indication of a change to a content or a format, or both, of the first beacon frame relative to a reference beacon frame.

In some examples, the beacon component 2015 may transmit, in a PPDU, a set of MPDUs that include a beacon frame, or a discovery frame, or both, indicating the updated capability information, and one or more second MPDUs that are non-beacon frames.

The format component 2020 may determine an order for a set of fields of the beacon frame. In some examples, a first set of the set of fields is associated with the change of the content of the beacon frame relative to the reference beacon frame, and the first set of the set of fields precedes a second set of the set of fields based at least in part on the format of the first beacon frame.

In some examples, the format component 2020 may transmit the indication in a field of the PPDU that directly follows a preamble of the PPDU. In some examples, the first beacon frame includes a set of frame check sequence fields within the first beacon frame. In some examples, the PPDU includes a set of beacon frames that include the first beacon frame, and the PPDU further includes a set of frame check sequence fields, each of the set of beacon frames associated with a respective one of the set of frame check sequence fields.

The indication component 2025 may transmit, in a field of the first beacon frame, the indication of the change to the content of the first beacon frame. In some examples, the indication component 2025 may transmit the indication in a first field of the first beacon frame that directly follows a timing synchronization function field, or a second field of the first beacon frame that directly follows the first field, or in a combination thereof.

The aggregation component 2030 may transmit an A-MPDU in the PPDU. In some examples, the A-MPDU includes the beacon frame, or the discovery frame, or both, and the A-MPDU further includes the one or more non-beacon frames. In some examples, the transmitted PPDU includes an A-MPDU including the beacon frame.

The multi-user component 2035 may transmit a MU PPDU including a FILS discovery frame on a first RU of the MU PPDU and the beacon frame on a second RU of the MU PPDU. In some examples, the multi-user component 2035 may transmit, before transmitting the PPDU, an MU PPDU including a FILS discovery frame on a first RU of the MU PPDU and a TIM frame on a second RU of the MU PPDU.

In some examples, the multi-user component 2035 may transmit an MU PPDU including a first beacon frame and a second beacon frame. In some examples, the first beacon frame is for one or more stations associated with a BSS of the AP, the second beacon frame is for one or more stations unassociated with the BSS, and the beacon frame is one of the first beacon frame or the second beacon frame.

Figure 21:
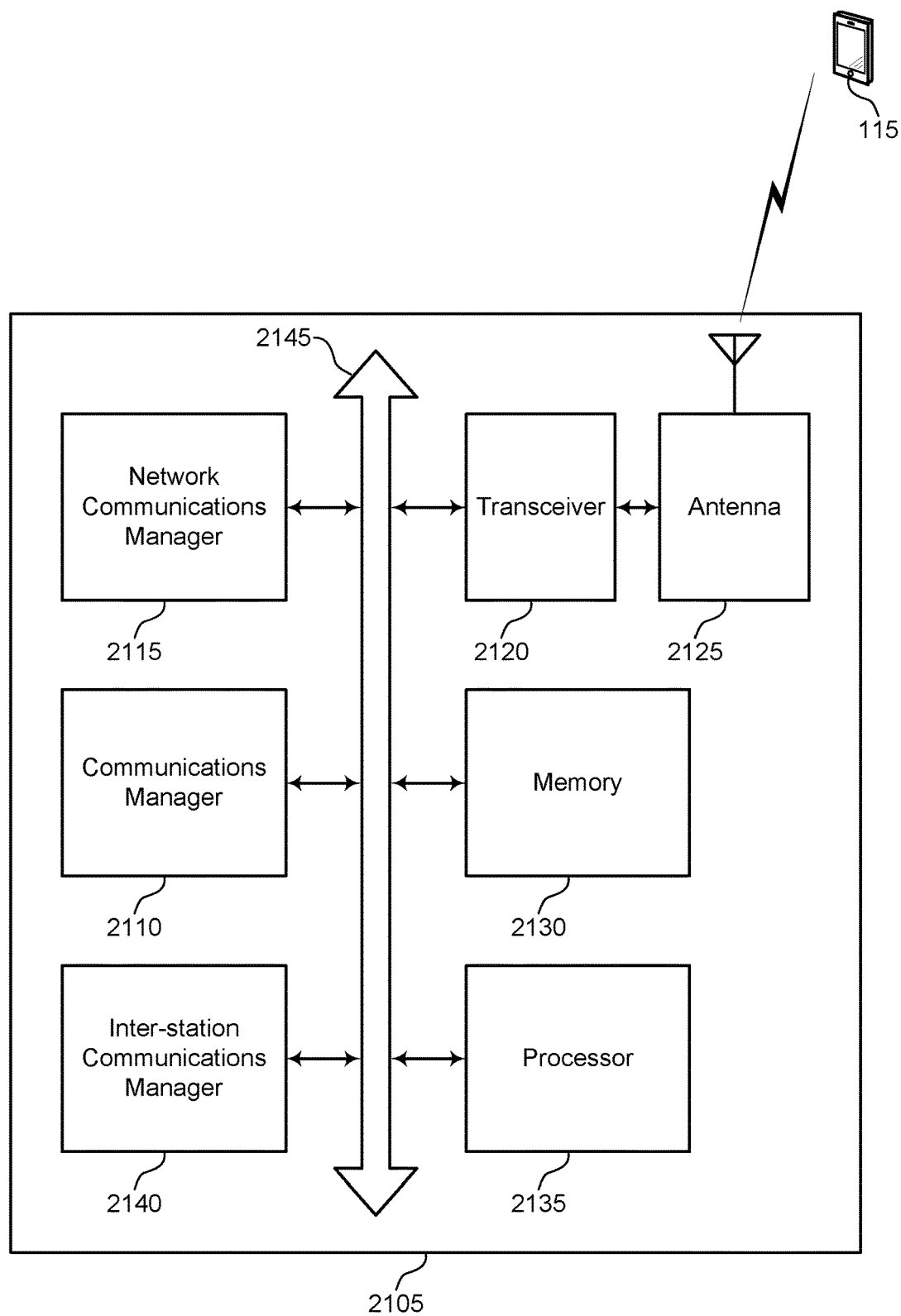
FIG. 21 shows a diagram of a system including a device that supports HE or EHT signaling in accordance with aspects of the present disclosure.

FIG. 21 shows a diagram of a system including a device 2105 that supports HE or EHT signaling in accordance with aspects of the present disclosure. The device 2105 may be an example of or include the components of device 1805, device 1905, or an AP as described herein. The device 2105 may include components for bi-directional voice and data communications including components for transmitting and receiving communications, including a communications manager 2110, a network communications manager 2115, a transceiver 2120, an antenna 2125, memory 2130, a processor 2135, and an inter-station communications manager 2140. These components may be in electronic communication via one or more buses (for example, bus 2145).

The communications manager 2110 may identify updated capability information of the AP and transmit, in a PPDU, a beacon frame carrying the updated capability information. In some examples, the transmitted PPDU includes an indication of a change to a content or a format, or both, of the first beacon frame relative to a reference beacon frame. The communications manager 2110 may also identify updated capability information for the AP and transmit, in a PPDU, a set of MPDUs that include a beacon frame, or a discovery frame, or both, indicating the updated capability information, and one or more second MPDUs that are non-beacon frames.

The network communications manager 2115 may manage communications with the core network (for example, via one or more wired backhaul links). For example, the network communications manager 2115 may manage the transfer of data communications for client devices, such as one or more STAs 115.

The transceiver 2120 may communicate bi-directionally, via one or more antennas, wired, or wireless links as described above. For example, the transceiver 2120 may represent a wireless transceiver and may communicate bi-directionally with another wireless transceiver. The transceiver 2120 may also include a modem to modulate the packets and provide the modulated packets to the antennas for transmission, and to demodulate packets received from the antennas.

In some examples, the wireless device may include a single antenna 2125. However, in some examples the device may have more than one antenna 2125, which may be capable of concurrently transmitting or receiving multiple wireless transmissions.

The memory 2130 may include RAM and ROM. The memory 2130 may store computer-readable, computer-executable code including instructions that, when executed, cause the processor to perform various functions described herein. In some examples, the memory 2130 may contain, among other things, a basic I/O system (BIOS) which may control basic hardware or software operation such as the interaction with peripheral components or devices.

The processor 2135 may include an intelligent hardware device, (for example, a general-purpose processor, a digital signal processor (DSP), a CPU, a microcontroller, an ASIC, an FPGA, a programmable logic device, a discrete gate or transistor logic component, a discrete hardware component, or any combination thereof). In some examples, the processor 2135 may be configured to operate a memory array using a memory controller. In other cases, a memory controller may be integrated into processor 2135. The processor 2135 may be configured to execute computer-readable instructions stored in a memory to perform various functions (for example, functions or tasks supporting high efficiency beacons).

The inter-station communications manager 2140 may manage communications with other APs 105, and may include a controller or scheduler for controlling communications with STAs 115 in cooperation with other APs 105. For example, the inter-station communications manager 2140 may coordinate scheduling for transmissions to STAs 115 for various interference mitigation techniques such as beamforming or joint transmission. In some examples, the inter-station communications manager 2140 may provide an X2 interface within an LTE/LTE-A wireless communication network technology to provide communication between APs 105.

Figure 22:
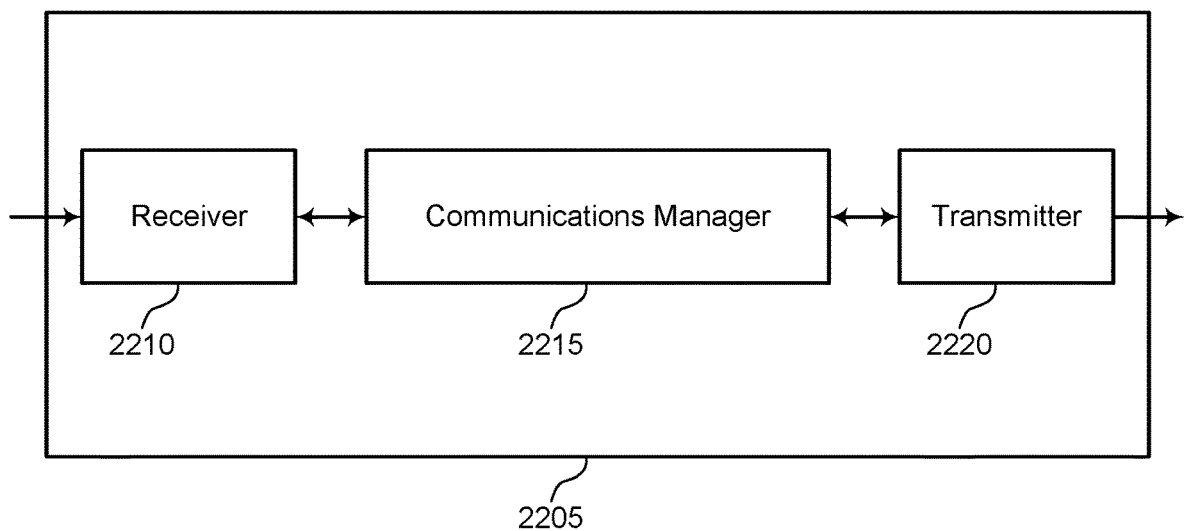
FIGS. 22 and 23 show block diagrams of devices that support HE or EHT signaling in accordance with aspects of the present disclosure.

FIG. 22 shows a block diagram of a device 2205 that supports HE or EHT signaling in accordance with aspects of the present disclosure. The device 2205 may be an example of aspects of a STA as described herein. The device 2205 may include a receiver 2210, a communications manager 2215, and a transmitter 2220. The communications manager 2215 can be implemented, at least in part, by one or both of a modem and a processor. Each of these components may be in communication with one another (for example, via one or more buses).

The receiver 2210 may receive information such as packets, user data, or control information associated with various information channels from the transmitter 2220 (for example, control channels, data channels, and information related to high efficiency beacons). Information may be passed on to other components of the device. The receiver 2210 may be an example of aspects of the transceiver 2520 described with reference to FIG. 25. The receiver 2210 may utilize a single antenna or a set of antennas.

The communications manager 2215 may receive, from an AP, a PPDU including a first beacon frame, identify, in the PPDU, an indication of a change to a content or a format, or both, of the first beacon frame relative to a reference beacon frame, and determine the content or the format, or both, of the first beacon frame according to the indicated change. The communications manager 2215 may also receive, from an AP, a PPDU that includes a set of MPDUs, and identify one or more first MPDUs of the set of MPDUs as non-beacon frames for the station, and a second MPDU of the set of MPDUs as a beacon frame for the station, or a discovery frame, or both, and determine updated capability information for the AP based on the beacon frame, or the discovery frame, or both. The communications manager 2215 may be an example of aspects of the communications manager 2510 described herein.

The communications manager 2215, or its sub-components, may be implemented in hardware, code (for example, software or firmware) executed by a processor, or any combination thereof. Additionally or alternatively, the communications manager 2215, or its sub-components, may be physically located at different locations, including being distributed such that portions of functions are implemented at different physical locations by one or more physical components. The actions performed by the communications manager 2215 as described herein may be implemented to realize one or more potential advantages. One implementation may allow a STA to save power and increase battery life by avoiding to have to perform lengthy processing operations to process an entire beacon if only a portion of the content in the beacon has changed since a previous beacon was processed. Additionally, another implementation may provide improved quality and reliability of service at the STA, as latency and the amount of resources used by the STA may be reduced when the STA performs an EBT operation.

Transmitter 2220 may transmit signals generated by other components of the device. In some examples, the transmitter 2220 may be collocated with a receiver 2210 in a transceiver module. For example, the transmitter 2220 may be an example of aspects of the transceiver 2520 described with reference to FIG. 25. The transmitter 2220 may utilize a single antenna or a set of antennas.

Figure 23:
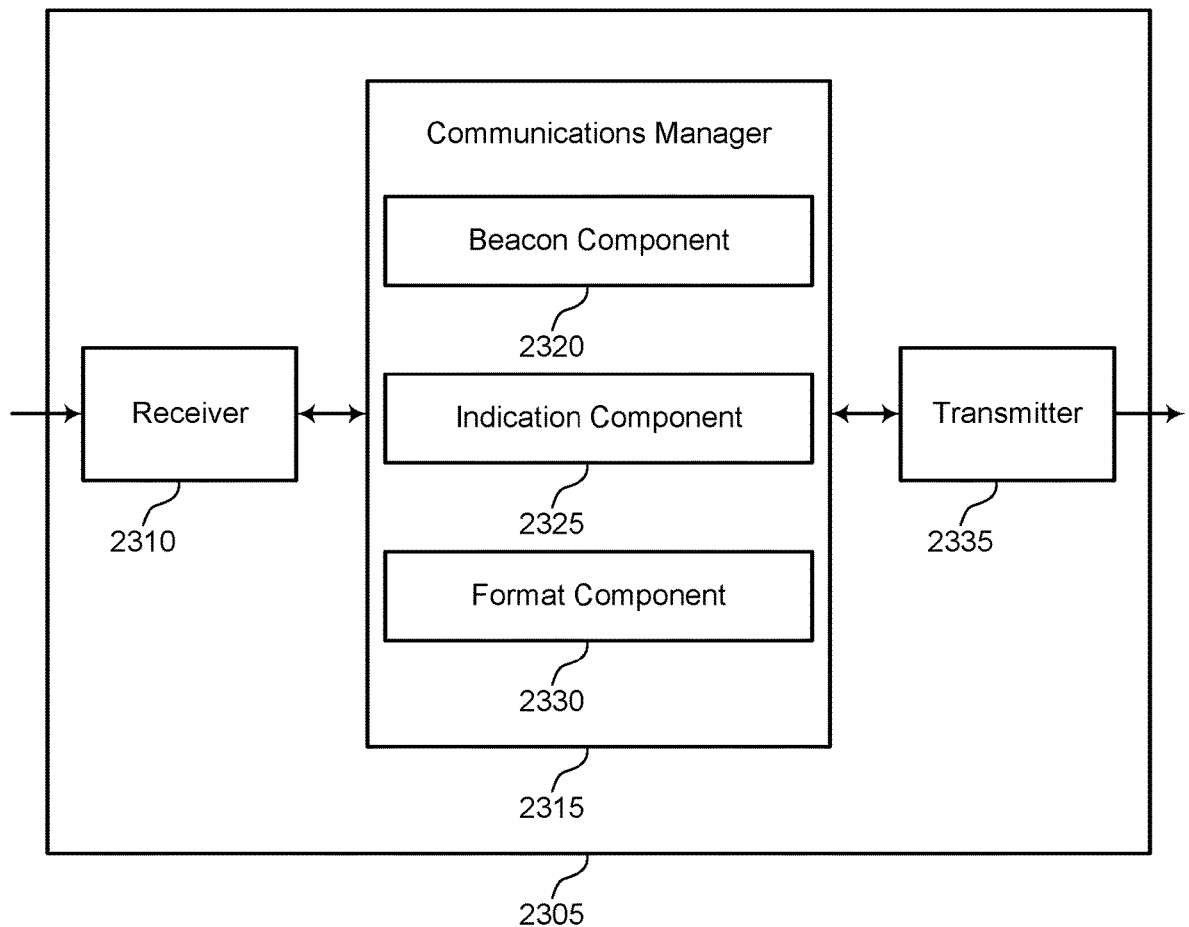

FIG. 23 shows a block diagram of a device 2305 that supports HE or EHT signaling in accordance with aspects of the present disclosure. The device 2305 may be an example of aspects of a device 2205 or a STA 115 as described herein. The device 2305 may include a receiver 2310, a communications manager 2315, and a transmitter 2335. The communications manager 2315 can be implemented, at least in part, by one or both of a modem and a processor. Each of these components may be in communication with one another (for example, via one or more buses).

The receiver 2310 may receive information such as packets, user data, or control information associated with various information channels from the transmitter 2335 (for example, control channels, data channels, and information related to high efficiency beacons). Information may be passed on to other components of the device. The receiver 2310 may be an example of aspects of the transceiver 2520 described with reference to FIG. 25. The receiver 2310 may utilize a single antenna or a set of antennas.

The communications manager 2315 may be an example of aspects of the communications manager 2215 as described herein. The communications manager 2315 may include a beacon component 2320, an indication component 2325, and a format component 2330. The communications manager 2315 may be an example of aspects of the communications manager 2510 described herein.

The beacon component 2320 may receive, from an AP, a PPDU, the PPDU including a first beacon frame.

The indication component 2325 may identify, in the PPDU, an indication of a change to a content or a format, or both, of the first beacon frame relative to a reference beacon frame. The indication component 2325 may identify one or more first MPDUs of the set of MPDUs as non-beacon frames for the station, and a second MPDU of the set of MPDUs as a beacon frame for the station, or a discovery frame, or both.

The format component 2330 may determine the content or the format, or both, of the first beacon frame according to the indicated change. The format component 2330 may also determine updated capability information for the AP based on the beacon frame, or the discovery frame, or both.

Transmitter 2335 may transmit signals generated by other components of the device. In some examples, the transmitter 2335 may be collocated with a receiver 2310 in a transceiver module. For example, the transmitter 2335 may be an example of aspects of the transceiver 2520 described with reference to FIG. 25. The transmitter 2335 may utilize a single antenna or a set of antennas.

Figure 24:
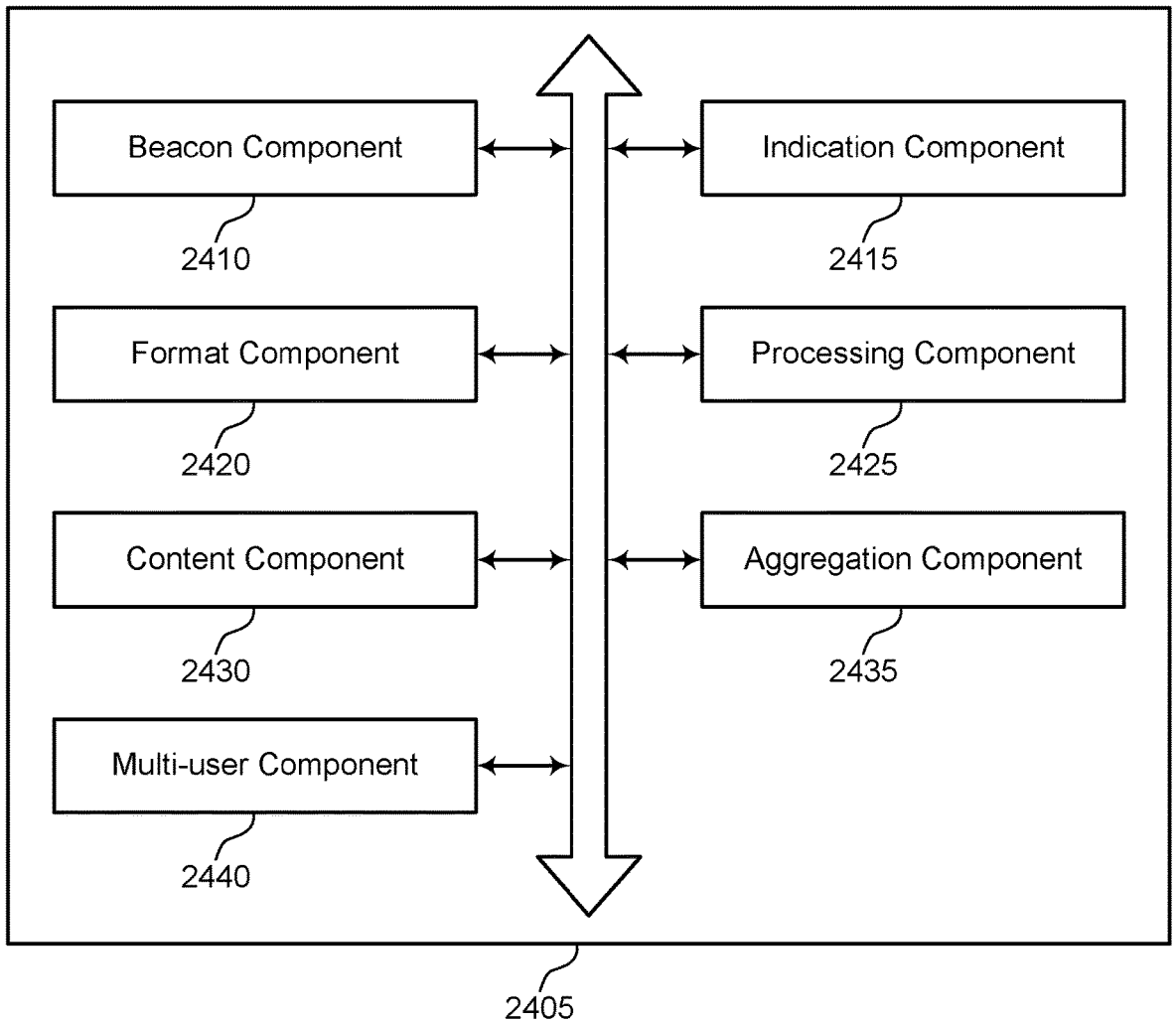
FIG. 24 shows a block diagram of a communications manager that supports HE or EHT signaling in accordance with aspects of the present disclosure.

FIG. 24 shows a block diagram of a communications manager 2405 that supports HE or EHT signaling in accordance with aspects of the present disclosure. The communications manager 2405 may be an example of aspects of a communications manager 2215, a communications manager 2315, or a communications manager 2510 described herein. The communications manager 2405 may include a beacon component 2410, an indication component 2415, a format component 2420, a processing component 2425, a content component 2430, an aggregation component 2435, and a multi-user component 2440. Each of these modules may communicate, directly or indirectly, with one another (for example, via one or more buses).

The beacon component 2410 may receive, from an AP, a PPDU, the PPDU including a first beacon frame. In some examples, receiving, from an AP, a PPDU that includes a set of MPDUs. In some examples, the PPDU includes a set of beacon frames that include the first beacon frame, and the PPDU further includes a set of frame check sequence fields, each of the set of beacon frames associated with a respective one of the set of frame check sequence fields.

The indication component 2415 may identify, in the PPDU, an indication of a change to a content or a format, or both, of the first beacon frame relative to a reference beacon frame. In some examples, the indication component 2415 may identify one or more first MPDUs of the set of MPDUs as non-beacon frames for the station, and a second MPDU of the set of MPDUs as a beacon frame for the station, or a discovery frame, or both. In some examples, the indication component 2415 may identify, in a field of the first beacon frame, the indication of the change to the content of the first beacon frame. In some examples, the content of the first beacon frame includes the content of one or more information elements of the first beacon frame.

In some examples, the indication component 2415 may identify the indication in a first field of the first beacon frame that directly follows a timing synchronization function field, or a second field of the first beacon frame that directly follows the first field, or in a combination thereof.

In some examples, the indication component 2415 may identify the one or more additional fields as critical elements. In some examples, the indication of the change indicates a change to at least one of the critical elements. In some examples, the indication component 2415 may identify critical content for the station in a first set of beacon frames including at least the first beacon frame. In some examples, the indication component 2415 may identify the indication in a field of the PPDU that directly follows a preamble of the PPDU.

In some examples, the indication component 2415 may identify, in the one or more non-beacon frames, an indication of a change to a content or a format, or both, of the beacon frame. In some examples, the indication component 2415 may process one or more fields of the beacon frame based on the identified indication. In some examples, the indication component 2415 may identify, in the TIM frame, an indication of a change to a content or a format, or both, of an upcoming beacon frame.

In some examples, the indication of the change in the field includes at least one of an increment to a sequence number value associated with the one or more information elements or a hash of a value carried by at least one of the one or more information elements. In some examples, the field includes an aggregated control field of a high efficiency variant of a high throughput control field of the first beacon frame. In some examples, the first field includes an indication of a number of the critical elements. In some examples, the first field and the second field are elements of the first beacon frame.

In some examples, the indication is in the first field and includes a sequence number value associated with the one or more additional fields. In some examples, the indication is in the second field and includes a version number value associated with the one or more additional fields. In some examples, the indication is in the first field, or the second field, or a combination thereof. In some examples, the indication includes a hash of a value carried by at least one of the one or more additional fields. In some examples, the one or more non-beacon frames include a TIM frame.

The format component 2420 may determine the content or the format, or both, of the first beacon frame according to the indicated change.

In some examples, the format component 2420 may determine updated capability information for the AP based on the beacon frame, or the discovery frame, or both. In some examples, the format component 2420 may identify, based on the indication of the change, an order for a set of fields of the first beacon frame. In some examples, a first set of the set of fields is associated with a content change of the beacon relative to the reference beacon, and the first set of the set of fields precedes a second set of the set of fields based at least in part on the format of the first beacon frame. In some examples, the format component 2420 may identify a first portion of the first beacon frame, a first frame check sequence field of the set of frame check sequence fields, and a second portion of the first beacon frame. In some examples, the first frame check sequence field follows the first portion of the first beacon frame and precedes the second portion of the first beacon frame.

In some examples, the first beacon frame includes a set of frame check sequence fields within the first beacon frame. In some examples, the first beacon frame is a beacon frame formatted for a first radio frequency spectrum band. In some examples, the reference beacon frame is a beacon frame formatted for a second radio frequency spectrum band. In some examples, the first radio frequency spectrum band includes a 6 GHz radio frequency spectrum band. In some examples, the second radio frequency spectrum band includes a 2.4 GHz radio frequency spectrum band, or a 5 GHz radio frequency spectrum band, or a combination thereof.

The processing component 2425 may process the first set of the set of fields. In some examples, the processing component 2425 may refrain from processing one or more of the second set of the set of fields. In some examples, the processing component 2425 may process one or more additional fields of the first beacon frame based at least in part the identified indication in the first field. In some examples, the processing component 2425 may determine whether to process a second portion of the first beacon frame based on the determined content. In some examples, the processing component 2425 may refrain from processing a first set of beacon frames of the set of beacon frames that follow the first beacon frame based on identifying that a second set of beacon frames including at least the first beacon frame includes critical content for the station.

In some examples, the processing component 2425 may process one or more fields of the first beacon frame based at least in part the identified indication in the first field of the PPDU. In some examples, the processing component 2425 may process the beacon frame of the received PPDU based on the identified indication in the TIM frame of the MU PPDU. In some examples, the first field includes a service field for a data portion of the PPDU, and the indication includes a sequence number value within the service field.

The content component 2430 may determine the content of the first portion of the first beacon frame. In some examples, the first portion of the first beacon frame includes one or more critical elements of the first beacon frame, and the second portion of the beacon frame includes one or more non-critical elements of the first beacon frame.

The aggregation component 2435 may identify, in the delimiter field, an indication of a change to a content or a format, or both, of the beacon frame. In some examples, the aggregation component 2435 may process the one or more fields of the beacon frame based on the indication of the change. In some examples, the aggregation component 2435 may receive an A-MPDU in the PPDU from an AP. In some examples, the A-MPDU includes the beacon frame, or the discovery frame, or both, and the A-MPDU further includes the one or more non-beacon frames.

In some examples, the aggregation component 2435 may identify, based on the non-beacon frame being aggregated with the discovery frame, a change to a content or a format, or both, of an upcoming beacon frame. In some examples, the received PPDU includes an A-MPDU including the beacon frame. In some examples, the non-beacon frame includes a TIM frame for one or more stations associated with a BSS of the AP, and the discovery frame includes fast initial link setup (FILS) discovery frame that is for one or more stations unassociated with the BSS.

The multi-user component 2440 may receive, from an AP, a MU PPDU including a FILS discovery frame on a first RU of the MU PPDU and the beacon frame on a second RU of the MU PPDU.

In some examples, the multi-user component 2440 may identify, in a first field of the beacon frame, an indication of a change to a content or a format, or both, of one or more additional fields of the beacon frame. In some examples, the multi-user component 2440 may process the one or more additional fields of the beacon frame based on the identified indication. In some examples, the multi-user component 2440 may receive, before the received PPDU, an MU PPDU including a FILS discovery frame on a first RU of the MU PPDU and a TIM frame on a second RU of the MU PPDU from an AP.

In some examples, the multi-user component 2440 may receive, from an AP, an MU PPDU including a first beacon frame and a second beacon frame. In some examples, the first beacon frame is for one or more stations associated with a BSS of the AP, the second beacon frame is for one or more stations unassociated with the BSS, and the beacon frame is one of the first beacon frame or the second beacon frame. In some examples, the beacon frame is for one or more stations associated with a BSS of the AP, and the FILS discovery frame is for one or more stations unassociated with the BSS. In some examples, the first beacon frame of the second RU of the MU PPDU includes at least a TIM element.

Figure 25:
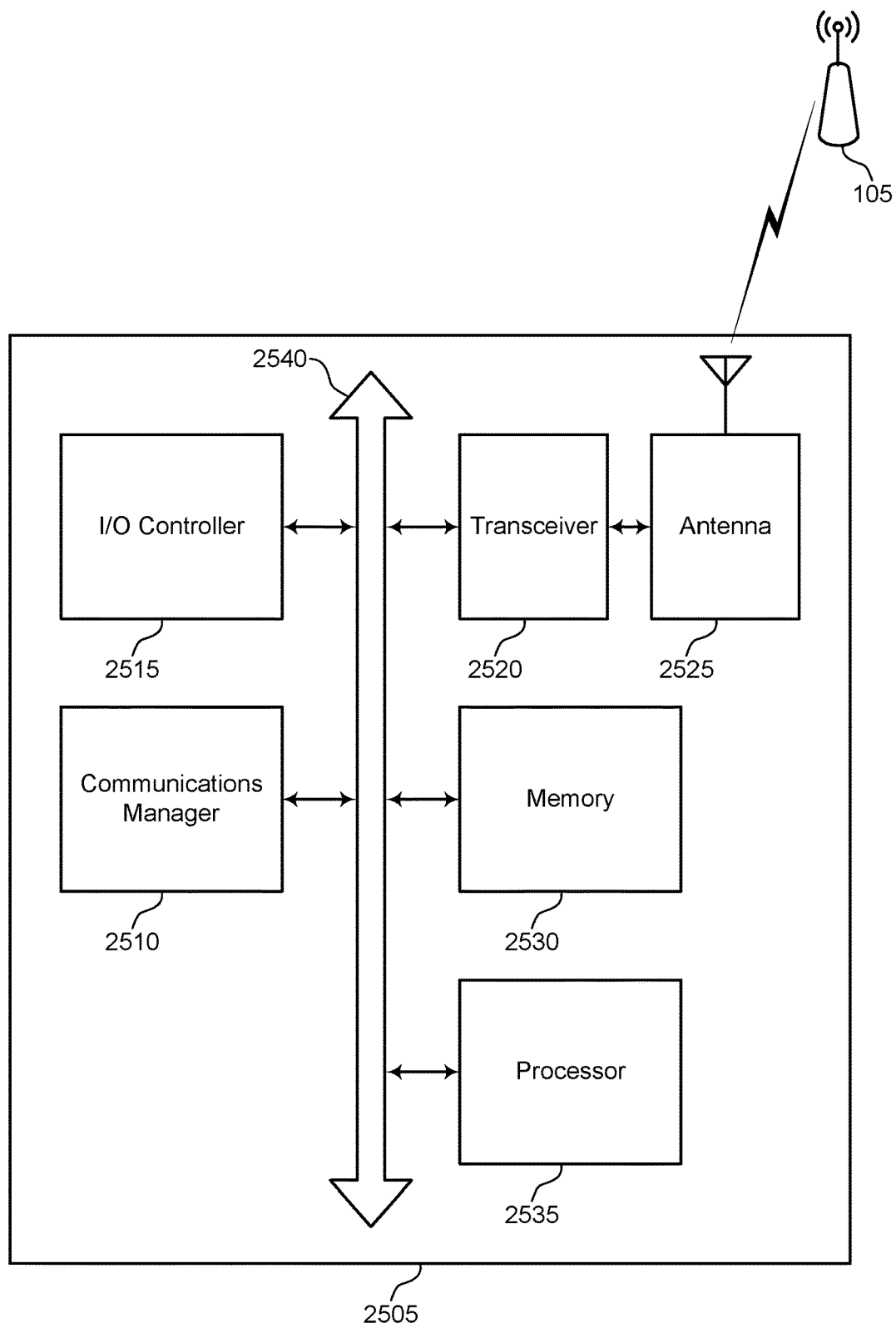
FIG. 25 shows a diagram of a system including a device that supports HE or EHT signaling in accordance with aspects of the present disclosure.

FIG. 25 shows a diagram of a system including a device 2505 that supports HE or EHT signaling in accordance with aspects of the present disclosure. The device 2505 may be an example of or include the components of device 2205, device 2305, or a STA as described herein. The device 2505 may include components for bi-directional voice and data communications including components for transmitting and receiving communications, including a communications manager 2510, an input/output (I/O) controller 2515, a transceiver 2520, an antenna 2525, memory 2530, and a processor 2535. These components may be in electronic communication via one or more buses (for example, bus 2540).

The communications manager 2510 may receive, from an AP, a PPDU, the PPDU including a first beacon frame, identify, in the PPDU, an indication of a change to a content or a format, or both, of the first beacon frame relative to a reference beacon frame, and determine the content or the format, or both, of the first beacon frame according to the indicated change. The communications manager 2510 may also receive, from an AP, a PPDU that includes a set of MPDUs, identify one or more first MPDUs of the set of MPDUs as non-beacon frames for the station, and a second MPDU of the set of MPDUs as a beacon frame for the station, or a discovery frame, or both, and determine updated capability information for the AP based on the beacon frame, or the discovery frame, or both.

I/O controller 2515 may manage input and output signals for device 2505. I/O controller 2515 may also manage peripherals not integrated into device 2505. In some examples, I/O controller 2515 may represent a physical connection or port to an external peripheral. In some examples, I/O controller 2515 may utilize an operating system such as iOS®, ANDROID®, MS-DOS®, MS-WINDOWS®, OS/2®, UNIX®, LINUX®, or another known operating system. In other cases, I/O controller 2515 may represent or interact with a modem, a keyboard, a mouse, a touchscreen, or a similar device. In some examples, I/O controller 2515 may be implemented as part of a processor. In some examples, a user may interact with device 2505 via I/O controller 2515 or via hardware components controlled by I/O controller 2515.

Transceiver 2520 may communicate bi-directionally, via one or more antennas, wired, or wireless links as described above. For example, the transceiver 2520 may represent a wireless transceiver and may communicate bi-directionally with another wireless transceiver. The transceiver 2520 may also include a modem to modulate the packets and provide the modulated packets to the antennas for transmission, and to demodulate packets received from the antennas.

In some examples, the wireless device may include a single antenna 2525. However, in some examples the device may have more than one antenna 2525, which may be capable of concurrently transmitting or receiving multiple wireless transmissions.

Memory 2530 may include RAM and ROM. The memory 2530 may store computer-readable, computer-executable software including instructions that, when executed, cause the processor to perform various functions described herein. In some examples, the memory 2530 may contain, among other things, a BIOS which may control basic hardware or software operation such as the interaction with peripheral components or devices.

Processor 2535 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, processor 2535 may be configured to operate a memory array using a memory controller. In other cases, a memory controller may be integrated into processor 2535. Processor 2535 may be configured to execute computer-readable instructions stored in a memory to perform various functions (for example, functions or tasks supporting high efficiency beacons).

Figure 26:
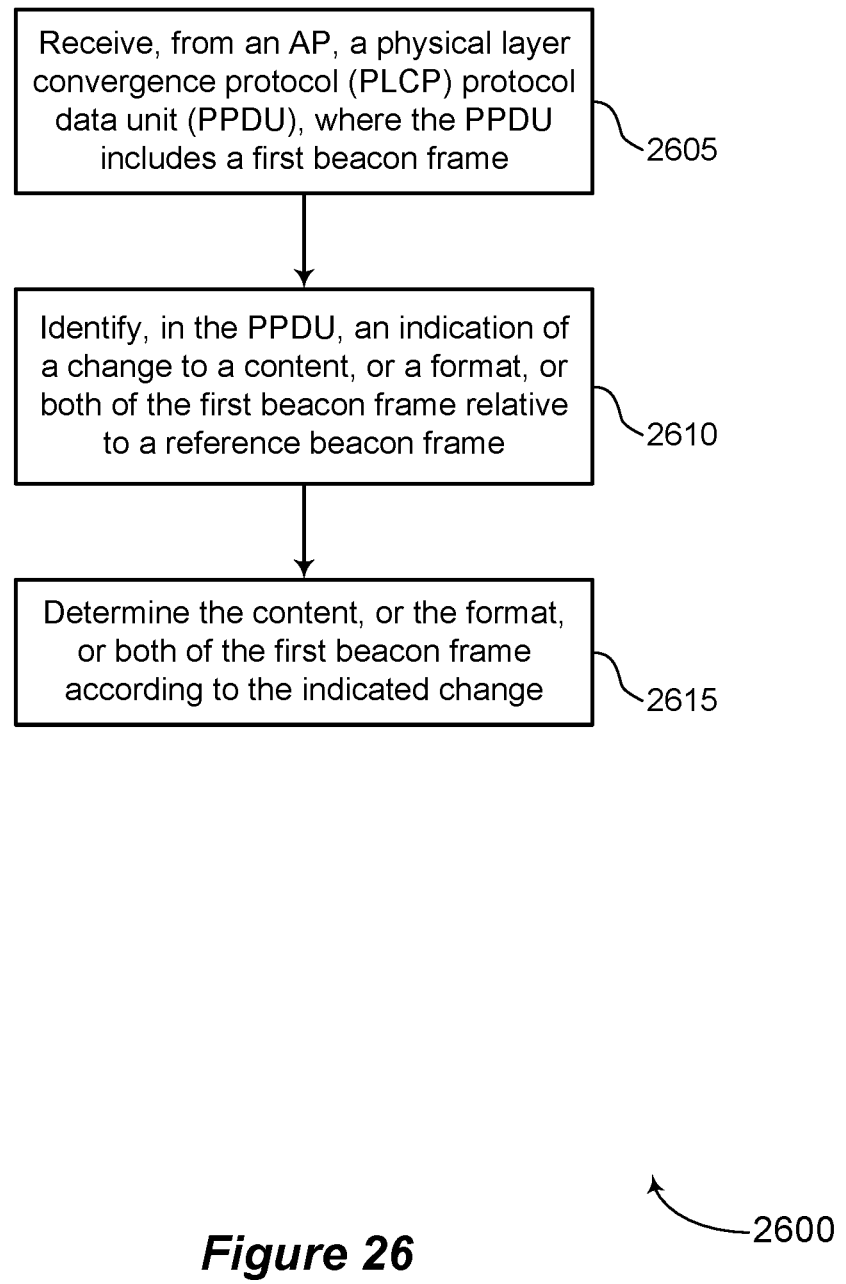
FIGS. 26-33 show flowcharts illustrating methods that support HE or EHT signaling in accordance with aspects of the present disclosure.

FIG. 26 shows a flowchart illustrating a method 2600 that supports HE or EHT signaling in accordance with aspects of the present disclosure. The operations of method 2600 may be implemented by a STA or its components as described herein. For example, the operations of method 2600 may be performed by a communications manager as described with reference to FIGS. 22-25. In some examples, a STA may execute a set of instructions to control the functional elements of the STA to perform the functions described below. Additionally or alternatively, a STA may perform aspects of the functions described below using special-purpose hardware.

At 2605, the STA may receive, from an AP, a PPDU. In some examples, the PPDU includes a first beacon frame. The operations of 2605 may be performed according to the methods described herein. In some examples, aspects of the operations of 2605 may be performed by a beacon component as described with reference to FIGS. 22-25.

At 2610, the STA may identify, in the PPDU, an indication of a change to a content or a format, or both, of the first beacon frame relative to a reference beacon frame. The operations of 2610 may be performed according to the methods described herein. In some examples, aspects of the operations of 2610 may be performed by an indication component as described with reference to FIGS. 22-25.

At 2615, the STA may determine the content or the format, or both, of the first beacon frame according to the indicated change. The operations of 2615 may be performed according to the methods described herein. In some examples, aspects of the operations of 2615 may be performed by a format component as described with reference to FIGS. 22-25.

Figure 27:
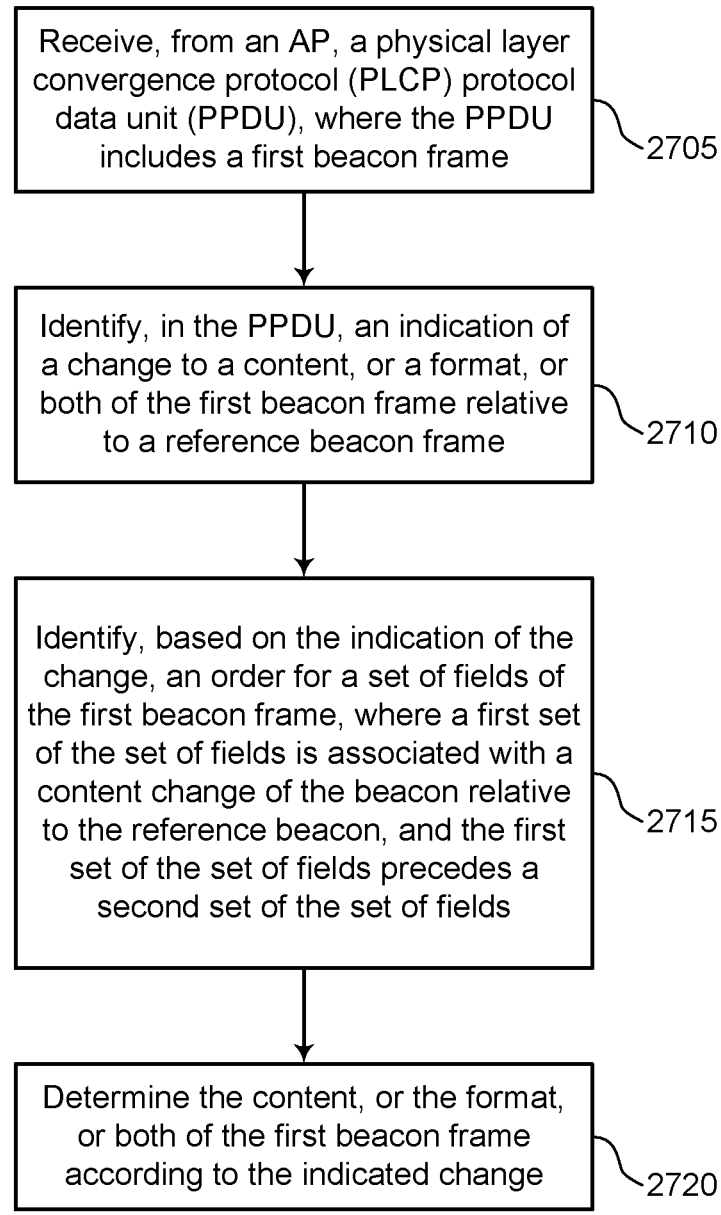

FIG. 27 shows a flowchart illustrating a method 2700 that supports HE or EHT signaling in accordance with aspects of the present disclosure. The operations of method 2700 may be implemented by a STA or its components as described herein. For example, the operations of method 2700 may be performed by a communications manager as described with reference to FIGS. 22-25. In some examples, a STA may execute a set of instructions to control the functional elements of the STA to perform the functions described below. Additionally or alternatively, a STA may perform aspects of the functions described below using special-purpose hardware.

At 2705, the STA may receive, from an AP, a PPDU. In some examples, the PPDU includes a first beacon frame. The operations of 2705 may be performed according to the methods described herein. In some examples, aspects of the operations of 2705 may be performed by a beacon component as described with reference to FIGS. 22-25.

At 2710, the STA may identify, in the PPDU, an indication of a change to a content or a format, or both, of the first beacon frame relative to a reference beacon frame. The operations of 2710 may be performed according to the methods described herein. In some examples, aspects of the operations of 2710 may be performed by an indication component as described with reference to FIGS. 22-25.

At 2715, the STA may identify, based on the indication of the change, an order for a set of fields of the first beacon frame. In some examples, a first set of the set of fields is associated with a content change of the beacon relative to the reference beacon, and the first set of the set of fields precedes a second set of the set of fields based at least in part on the format of the first beacon frame. The operations of 2715 may be performed according to the methods described herein. In some examples, aspects of the operations of 2715 may be performed by a format component as described with reference to FIGS. 22-25.

At 2720, the STA may determine the content or the format, or both, of the first beacon frame according to the indicated change. The operations of 2720 may be performed according to the methods described herein. In some examples, aspects of the operations of 2720 may be performed by a format component as described with reference to FIGS. 22-25.

Figure 28:
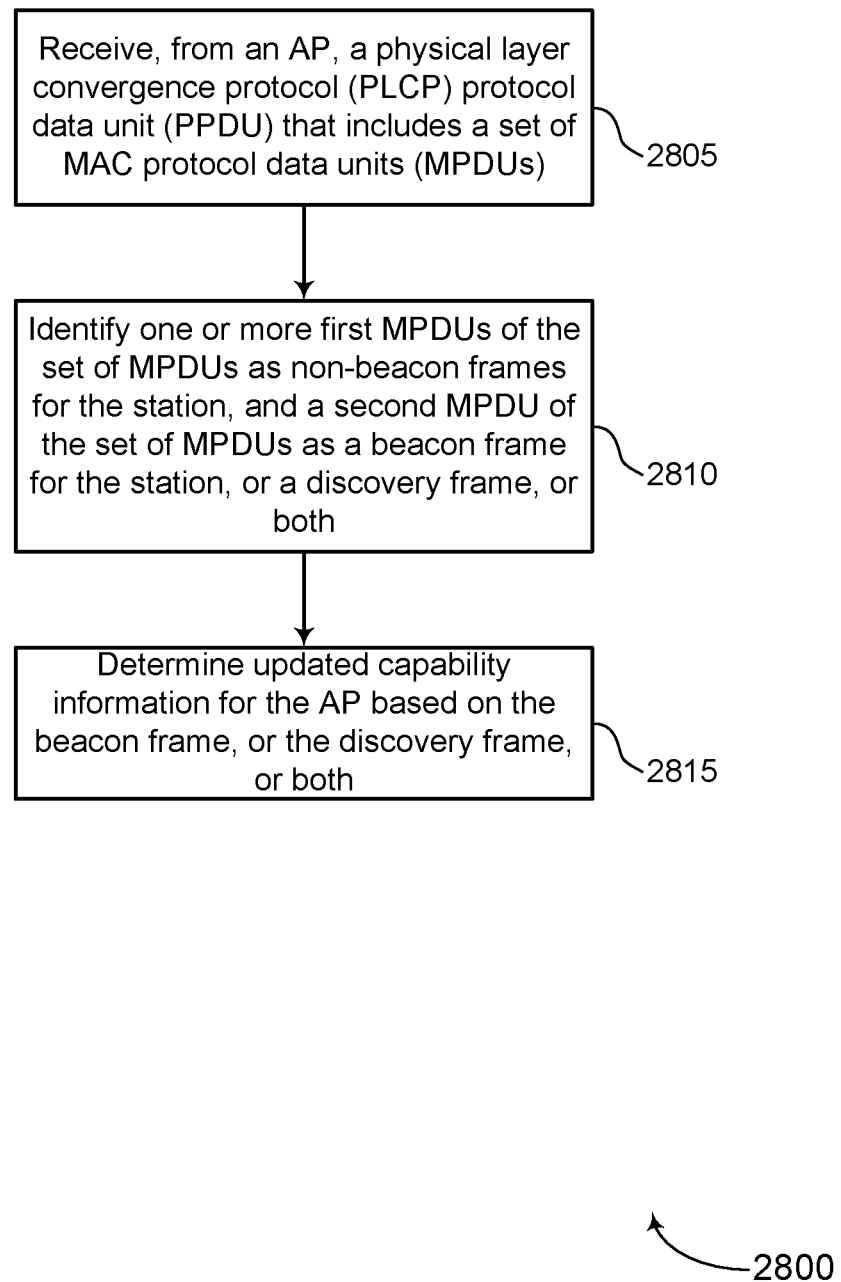

FIG. 28 shows a flowchart illustrating a method 2800 that supports HE or EHT signaling in accordance with aspects of the present disclosure. The operations of method 2800 may be implemented by a STA or its components as described herein. For example, the operations of method 2800 may be performed by a communications manager as described with reference to FIGS. 22-25. In some examples, a STA may execute a set of instructions to control the functional elements of the STA to perform the functions described below. Additionally or alternatively, a STA may perform aspects of the functions described below using special-purpose hardware.

At 2805, the STA may receive, from an AP, a PPDU that includes a set of MPDUs. The operations of 2805 may be performed according to the methods described herein. In some examples, aspects of the operations of 2805 may be performed by a beacon component as described with reference to FIGS. 22-25.

At 2810, the STA may identify one or more first MPDUs of the set of MPDUs as non-beacon frames for the station, and a second MPDU of the set of MPDUs as a beacon frame for the station, or a discovery frame, or both. The operations of 2810 may be performed according to the methods described herein. In some examples, aspects of the operations of 2810 may be performed by an indication component as described with reference to FIGS. 22-25.

At 2815, the STA may determine updated capability information for the AP based on the beacon frame, or the discovery frame, or both. The operations of 2815 may be performed according to the methods described herein. In some examples, aspects of the operations of 2815 may be performed by a format component as described with reference to FIGS. 22-25.

Figure 29:
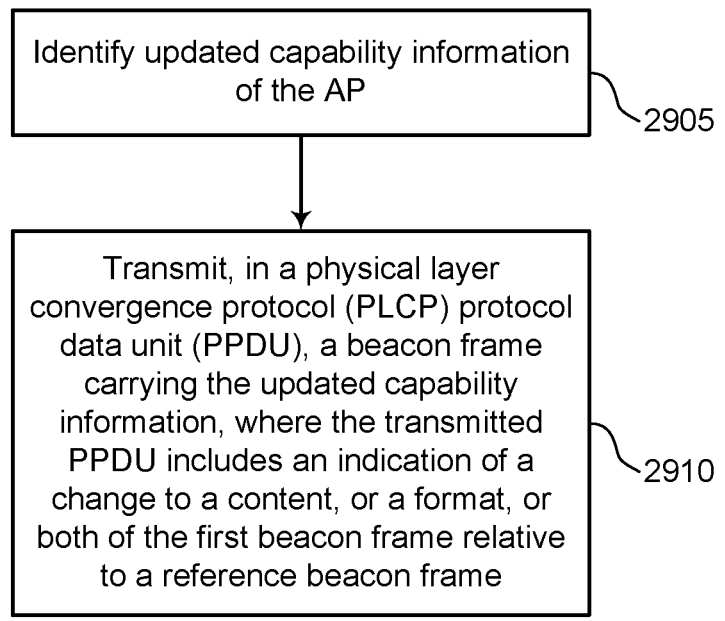

FIG. 29 shows a flowchart illustrating a method 2900 that supports HE or EHT signaling in accordance with aspects of the present disclosure. The operations of method 2900 may be implemented by an AP or its components as described herein. For example, the operations of method 2900 may be performed by a communications manager as described with reference to FIGS. 18-21. In some examples, an AP may execute a set of instructions to control the functional elements of the AP to perform the functions described below.

Additionally or alternatively, an AP may perform aspects of the functions described below using special-purpose hardware.

At 2905, the AP may identify updated capability information of the AP. The operations of 2905 may be performed according to the methods described herein. In some examples, aspects of the operations of 2905 may be performed by a capability component as described with reference to FIGS. 18-21.

At 2910, the AP may transmit, in a PPDU, a beacon frame carrying the updated capability information, the transmitted PPDU including an indication of a change to a content or a format, or both, of the first beacon frame relative to a reference beacon frame. The operations of 2910 may be performed according to the methods described herein. In some examples, aspects of the operations of 2910 may be performed by a beacon component as described with reference to FIGS. 18-21.

Figure 30:
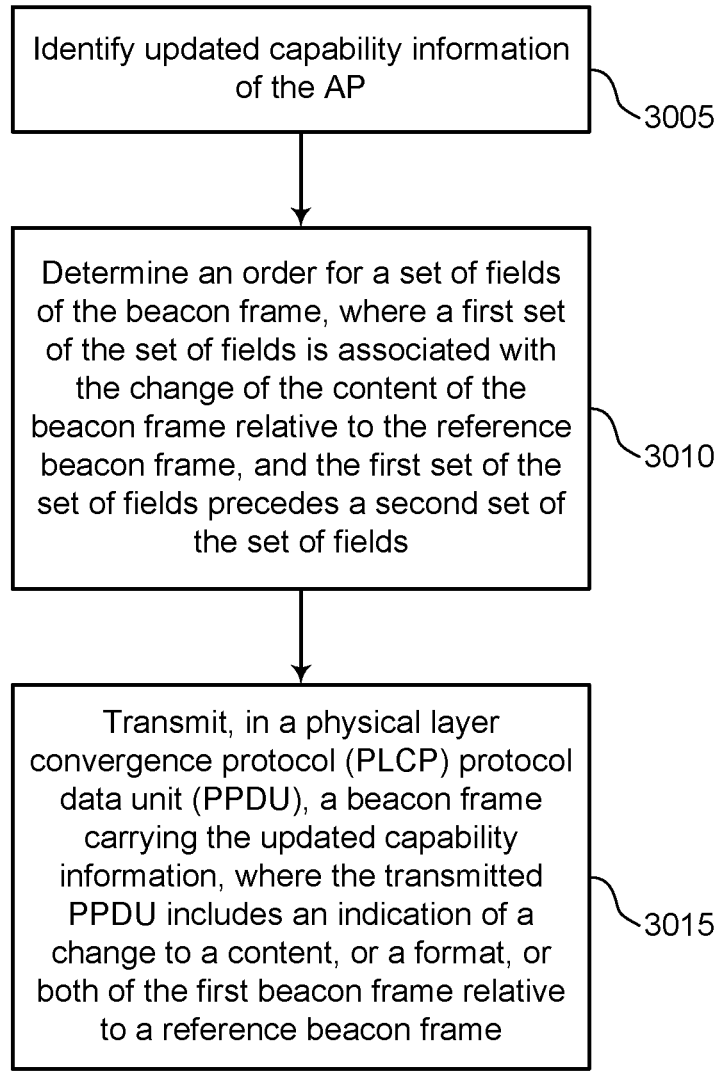

FIG. 30 shows a flowchart illustrating a method 3000 that supports HE or EHT signaling in accordance with aspects of the present disclosure. The operations of method 3000 may be implemented by an AP or its components as described herein. For example, the operations of method 3000 may be performed by a communications manager as described with reference to FIGS. 18-21. In some examples, an AP may execute a set of instructions to control the functional elements of the AP to perform the functions described below. Additionally or alternatively, an AP may perform aspects of the functions described below using special-purpose hardware.

At 3005, the AP may identify updated capability information of the AP. The operations of 3005 may be performed according to the methods described herein. In some examples, aspects of the operations of 3005 may be performed by a capability component as described with reference to FIGS. 18-21.

At 3010, the AP may determine an order for a set of fields of the beacon frame. In some examples, a first set of the set of fields is associated with the change of the content of the beacon frame relative to the reference beacon frame, and the first set of the set of fields precedes a second set of the set of fields based at least in part on the format of the first beacon frame. The operations of 3010 may be performed according to the methods described herein. In some examples, aspects of the operations of 3010 may be performed by a format component as described with reference to FIGS. 18-21.

At 3015, the AP may transmit, in a PPDU, a beacon frame carrying the updated capability information, the transmitted PPDU including an indication of a change to a content or a format, or both, of the first beacon frame relative to a reference beacon frame. The operations of 3015 may be performed according to the methods described herein. In some examples, aspects of the operations of 3015 may be performed by a beacon component as described with reference to FIGS. 18-21.

Figure 31:
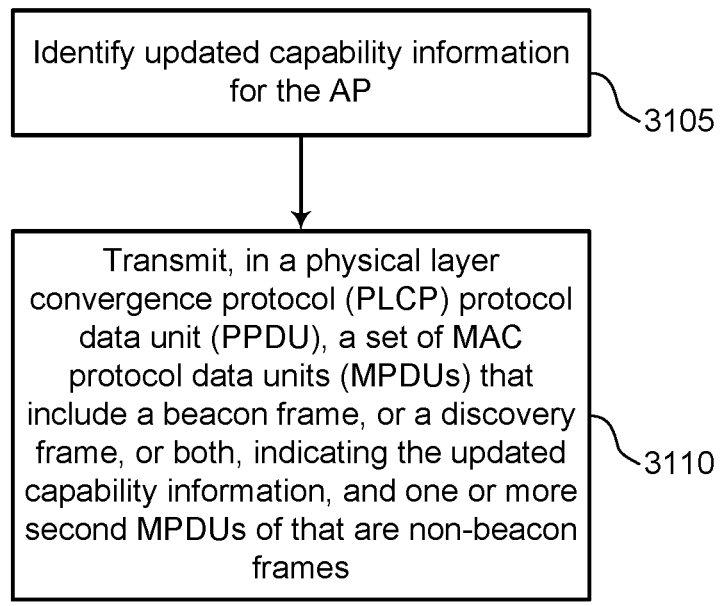

FIG. 31 shows a flowchart illustrating a method 3100 that supports HE or EHT signaling in accordance with aspects of the present disclosure. The operations of method 3100 may be implemented by an AP or its components as described herein. For example, the operations of method 3100 may be performed by a communications manager as described with reference to FIGS. 18-21. In some examples, an AP may execute a set of instructions to control the functional elements of the AP to perform the functions described below. Additionally or alternatively, an AP may perform aspects of the functions described below using special-purpose hardware.

At 3105, the AP may identify updated capability information for the AP. The operations of 3105 may be performed according to the methods described herein. In some examples, aspects of the operations of 3105 may be performed by a capability component as described with reference to FIGS. 18-21.

At 3110, the AP may transmit, in a PPDU, a set of MPDUs that include a beacon frame, or a discovery frame, or both, indicating the updated capability information, and one or more second MPDUs that are non-beacon frames. The operations of 3110 may be performed according to the methods described herein. In some examples, aspects of the operations of 3110 may be performed by a beacon component as described with reference to FIGS. 18-21.

Figure 32:
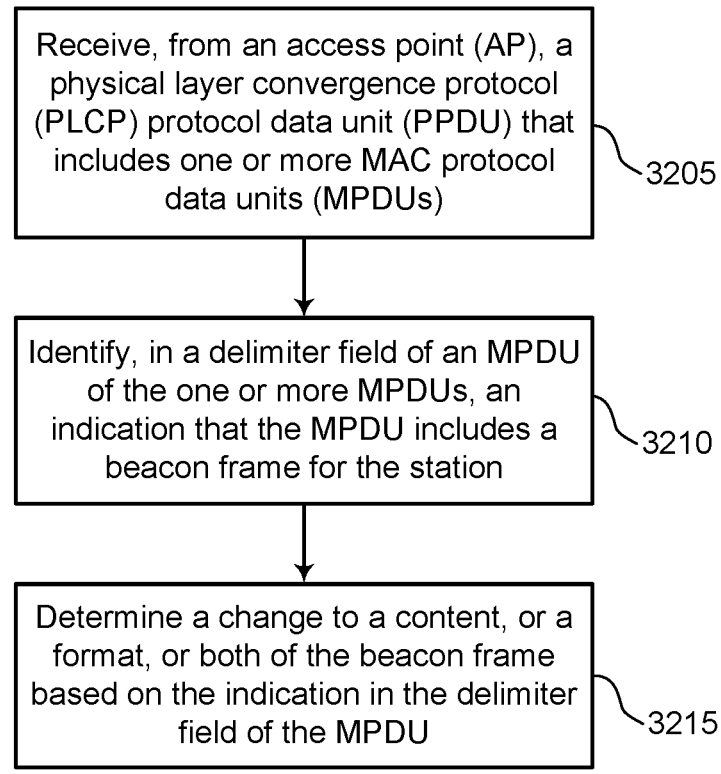

FIG. 32 shows a flowchart illustrating a method 3200 that supports HE or EHT signaling in accordance with aspects of the present disclosure. The operations of method 3200 may be implemented by a STA or its components as described herein. For example, the operations of method 3200 may be performed by a communications manager as described with reference to FIGS. 22-25. In some examples, a STA may execute a set of instructions to control the functional elements of the STA to perform the functions described below. Additionally or alternatively, a STA may perform aspects of the functions described below using special-purpose hardware.

At 3205, the STA may receive, from an AP, a PPDU that includes one or more MPDUs. The operations of 3205 may be performed according to the methods described herein. In some examples, aspects of the operations of 3205 may be performed by a beacon component as described with reference to FIGS. 22-25.

At 3210, the STA may identify, in a delimiter field of an MPDU of the one or more MPDUs, an indication that the MPDU includes a beacon frame for the station. The operations of 3210 may be performed according to the methods described herein. In some examples, aspects of the operations of 3210 may be performed by an indication component as described with reference to FIGS. 22-25.

At 3215, the STA may determine a change to a content or a format, or both, of the beacon frame based on the indication in the delimiter field of the MPDU. The operations of 3215 may be performed according to the methods described herein. In some examples, aspects of the operations of 3215 may be performed by a format component as described with reference to FIGS. 22-25.

Figure 33:
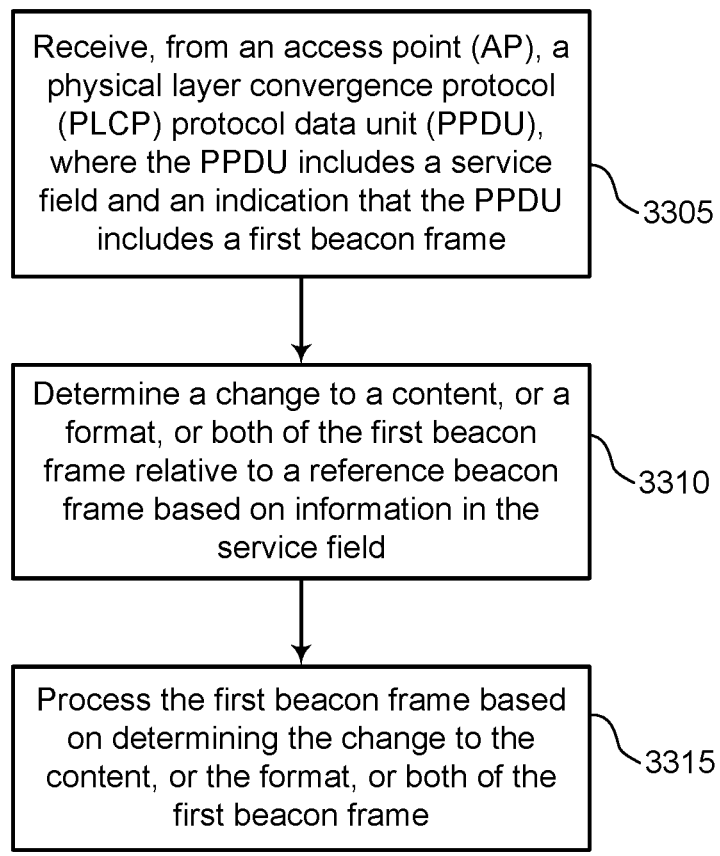

FIG. 33 shows a flowchart illustrating a method 3300 that supports HE or EHT signaling in accordance with aspects of the present disclosure. The operations of method 3300 may be implemented by a STA or its components as described herein. For example, the operations of method 3300 may be performed by a communications manager as described with reference to FIGS. 22-25. In some examples, a STA may execute a set of instructions to control the functional elements of the STA to perform the functions described below. Additionally or alternatively, a STA may perform aspects of the functions described below using special-purpose hardware.

At 3305, the STA may receive, from an AP, a PPDU, where the PPDU includes a service field and an indication that the PPDU includes a first beacon frame. The operations of 3305 may be performed according to the methods described herein. In some examples, aspects of the operations of 3305 may be performed by a beacon component as described with reference to FIGS. 22-25.

At 3310, the STA may determine a change to a content or a format, or both, of the first beacon frame relative to a reference beacon frame based on information in the service field. The operations of 3310 may be performed according to the methods described herein. In some examples, aspects of the operations of 3310 may be performed by an indication component as described with reference to FIGS. 22-25.

At 3315, the STA may process the first beacon frame based on determining the change to the content or the format, or both, of the first beacon frame. The operations of 3315 may be performed according to the methods described herein. In some examples, aspects of the operations of 3315 may be performed by a format component as described with reference to FIGS. 22-25.

It should be noted that the methods described herein describe possible implementations, and that the operations and the blocks or steps may be rearranged or otherwise modified and that other implementations are possible. Further, aspects from two or more of the methods may be combined.

As used herein, "element" as used in relation to a PDU or service data unit (SDU) structure may refer to a field, a subfield, or an information element of a respective PDU or SDU. In some examples, an information element may carry a field or subfield within the respective PDU or SDU.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), or other radio technologies. CDMA2000 covers IS-2000, IS-95, and IS-856 standards. IS-2000 Releases may be commonly referred to as CDMA2000 1x or 1x. IS-856 (TIA-856) is commonly referred to as CDMA2000 1xEV-DO or High Rate Packet Data (HRPD). UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, or other radio technologies. UTRA and E-UTRA are part of Universal Mobile Telecommunications System (UMTS). LTE, LTE-A, and LTE-A Pro are releases of UMTS that use E-UTRA. The techniques described herein may be used for the systems and radio technologies mentioned herein as well as other systems and radio technologies.

A macro cell generally covers a relatively large geographic area (for example, several kilometers in radius) and may allow unrestricted access by STAs with service subscriptions with the network provider. A small cell may be associated with a lower-powered AP or base station, as compared with a macro cell, and a small cell may operate in the same or different (for example, licensed or unlicensed) frequency bands as macro cells. Small cells may include pico cells, femto cells, and micro cells according to various examples. A pico cell, for example, may cover a small geographic area and may allow unrestricted access by STAs with service subscriptions with the network provider. A femto cell may also cover a small geographic area (for example, a home) and may provide restricted access by STAs having an association with the femto cell (for example, STAs in a closed subscriber group and STAs for users in the home, among other examples).

The wireless communications systems described herein may support synchronous or asynchronous operation. For synchronous operation, the APs may have similar frame timing, and transmissions from different APs may be approximately aligned in time. For asynchronous operation, the APs may have different frame timing, and transmissions from different APs may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a DSP, an ASIC, a FPGA or other PLD, discrete gate or transistor logic, discrete hardware components, or any combination thereof designed to perform the functions described herein. A general-purpose processor may be a microprocessor, or, any processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc. Disks usually reproduce data magnetically, while discs reproduce data optically with lasers. Combinations of the above are also included within the scope of computer-readable media.

As used herein, including in the claims, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c. Also, as used herein, the phrase "based on" shall not be construed as a reference to a closed set of conditions. For example, a block or step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some examples be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The description herein is provided to enable a person having ordinary skill in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a station, comprising:
   receiving, from an access point (AP), a physical layer convergence protocol (PLCP) protocol data unit (PPDU), wherein the PPDU includes a first beacon frame;
   identifying, in a field of the first beacon frame of the PPDU, an indication of a change to a content or a format, or both, of the first beacon frame relative to a reference beacon frame, wherein the content of the first beacon frame comprises content of one or more information elements of the first beacon frame, and wherein the indication of the change in the field comprises at least one of an increment to a sequence number value associated with the one or more information elements or a hash of a value carried by at least one of the one or more information elements; and
   determining the content or the format, or both, of the first beacon frame according to the indicated change.

2. The method of claim 1, wherein the field comprises an aggregated control field of a high efficiency (HE) or extremely high throughput (EHT) variant of a high throughput (HT) control field of the first beacon frame.

3. The method of claim 1, wherein identifying the indication of the change to the content or the format, or both, comprises
   identifying the indication in a first field of the PPDU that directly follows a preamble of the PPDU, and wherein the method further comprises:
      processing one or more fields of the first beacon frame based at least in part the identified indication in the first field of the PPDU.

4. The method of claim 3, wherein the first field comprises a service field for a data portion of the PPDU, and the indication comprises the sequence number value within the service field.

5. The method of claim 1, wherein:
   the first beacon frame is a beacon frame formatted for a first radio frequency spectrum band; and
   the reference beacon frame is a beacon frame formatted for a second radio frequency spectrum band.

6. The method of claim 1, wherein the received PPDU comprises an aggregate MPDU (A-MPDU) comprising the first beacon frame.

7. The method of claim 6, wherein the received PPDU further comprises at least one delimiter field, wherein identifying the change comprises identifying, in the at least one delimiter field, the indication of the change to the content or the format, or both, of the first beacon frame, and wherein the method further comprises:
   processing one or more fields of the first beacon frame based at least in part on the indication of the change.

8. An apparatus for wireless communication at a station, comprising:
   a processor,
   memory coupled with the processor; and
   instructions stored in the memory and executable by the processor to cause the apparatus to:
      receive, from an access point (AP), a physical layer convergence protocol (PLCP) protocol data unit (PPDU), wherein the PPDU includes a first beacon frame;
      identify, in a field of the first beacon frame of the PPDU, an indication of a change to a content or a format, or both, of the first beacon frame relative to a reference beacon frame, wherein the content of the first beacon frame comprises content of one or more information elements of the first beacon frame, and wherein the indication of the change in the field comprises at least one of an increment to a sequence number value associated with the one or more information elements or a hash of a value carried by at least one of the one or more information elements; and
      determine the content or the format, or both, of the first beacon frame according to the indicated change.

9. The apparatus of claim 8, wherein the instructions are executable by the processor to cause the apparatus to
   identify the indication in a first field of the PPDU that directly follows a preamble of the PPDU, and wherein the instructions are further executable by the processor to cause the apparatus to:
      process one or more fields of the first beacon frame based at least in part the identified indication in the first field of the PPDU.

10. The apparatus of claim 9, wherein the first field comprises a service field for a data portion of the PPDU, and the indication comprises the sequence number value within the service field.

11. The apparatus of claim 8, wherein the received PPDU comprises an aggregate MPDU (A-MPDU) comprising the first beacon frame.

12. The apparatus of claim 11, wherein the received PPDU further comprises at least one delimiter field, wherein the instructions to identify the change further are executable by the processor to cause the apparatus to
   identify, in the at least one delimiter field, the indication of the change to the content or the format, or both, of the first beacon frame, and wherein the instructions are further executable to cause the apparatus to:
      process one or more fields of the first beacon frame based at least in part on the indication of the change.

13. The apparatus of claim 8, wherein the field comprises an aggregated control field of a high efficiency (HE) or extremely high throughput (EHT) variant of a high throughput (HT) control field of the first beacon frame.

14. The apparatus of claim 8, wherein:
   the first beacon frame is a beacon frame formatted for a first radio frequency spectrum band; and
   the reference beacon frame is a beacon frame formatted for a second radio frequency spectrum band.

15. A method for wireless communication at a station, comprising:
   receiving, from an access point (AP), a physical layer convergence protocol (PLCP) protocol data unit (PPDU), wherein the PPDU includes a first beacon frame;
   identifying, in a first field of the PPDU that directly follows a preamble of the PPDU, an indication of a change to a content or a format, or both, of the first beacon frame relative to a reference beacon frame;
   determining the content or the format, or both, of the first beacon frame according to the indicated change; and
   processing one or more fields of the first beacon frame based at least in part the identified indication in the first field of the PPDU.

16. The method of claim 15, wherein the first field comprises a service field for a data portion of the PPDU, and the indication comprises a sequence number value within the service field.

17. The method of claim 15, wherein identifying the indication of the change to the content or the format, or both, comprises identifying, in the first field of the first beacon frame, the indication of the change to the content of the first beacon frame, wherein the content of the first beacon frame comprises content of one or more information elements of the first beacon frame.

18. The method of claim 15, wherein:
the first beacon frame is a beacon frame formatted for a first radio frequency spectrum band; and
the reference beacon frame is a beacon frame formatted for a second radio frequency spectrum band.

19. A method for wireless communication at a station, comprising:
receiving, from an access point (AP), a physical layer convergence protocol (PLCP) protocol data unit (PPDU), wherein the PPDU includes a first beacon frame;
identifying, in the PPDU, an indication of a change to a content or a format, or both, of the first beacon frame relative to a reference beacon frame, wherein the first beacon frame is a beacon frame formatted for a first radio frequency spectrum band and the reference beacon frame is a beacon frame formatted for a second radio frequency spectrum band; and
determining the content or the format, or both, of the first beacon frame according to the indicated change.

20. The method of claim 19, wherein identifying the indication of the change to the content or the format, or both, comprises identifying, in a field of the first beacon frame, the indication of the change to the content of the first beacon frame, wherein the content of the first beacon frame comprises content of one or more information elements of the first beacon frame.

21. A method for wireless communication at a station, comprising:
receiving, from an access point (AP), a physical layer convergence protocol (PLCP) protocol data unit (PPDU), wherein the PPDU includes a first beacon frame, wherein the received PPDU comprises an aggregate MPDU (A-MPDU) comprising the first beacon frame, and wherein the received PPDU further comprises at least one delimiter field;
identifying, in the at least one delimiter field, an indication of a change to a content or a format, or both, of the first beacon frame relative to a reference beacon frame;
determining the content or the format, or both, of the first beacon frame according to the indicated change; and
processing one or more fields of the first beacon frame based at least in part on the indication of the change.

22. The method of claim 21, wherein identifying the indication of the change to the content or the format, or both, comprises identifying, in the at least one delimiter field of the first beacon frame, the indication of the change to the content of the first beacon frame, wherein the content of the first beacon frame comprises content of one or more information elements of the first beacon frame.

23. An apparatus for wireless communication at a station, comprising:
a processor,
memory coupled with the processor; and
instructions stored in the memory and executable by the processor to cause the apparatus to:
receive, from an access point (AP), a physical layer convergence protocol (PLCP) protocol data unit (PPDU), wherein the PPDU includes a first beacon frame;
identify, in a first field of the PPDU that directly follows a preamble of the PPDU, an indication of a change to a content or a format, or both, of the first beacon frame relative to a reference beacon frame;
determine the content or the format, or both, of the first beacon frame according to the indicated change; and
process one or more fields of the first beacon frame based at least in part the identified indication in the first field of the PPDU.

24. The apparatus of claim 23, wherein the first field comprises a service field for a data portion of the PPDU, and the indication comprises a sequence number value within the service field.

25. The apparatus of claim 23, wherein the instructions to identify the indication of the change to the content or the format, or both, are executable by the processor to cause the apparatus to identify, in the first field of the first beacon frame, the indication of the change to the content of the first beacon frame, wherein the content of the first beacon frame comprises content of one or more information elements of the first beacon frame.

26. The apparatus of claim 23, wherein:
the first beacon frame is a beacon frame formatted for a first radio frequency spectrum band; and
the reference beacon frame is a beacon frame formatted for a second radio frequency spectrum band.

27. An apparatus for wireless communication at a station, comprising:
a processor,
memory coupled with the processor; and
instructions stored in the memory and executable by the processor to cause the apparatus to:
receive, from an access point (AP), a physical layer convergence protocol (PLCP) protocol data unit (PPDU), wherein the PPDU includes a first beacon frame;
identify, in the PPDU, an indication of a change to a content or a format, or both, of the first beacon frame relative to a reference beacon frame, wherein the first beacon frame is a beacon frame formatted for a first radio frequency spectrum band and the reference beacon frame is a beacon frame formatted for a second radio frequency spectrum band; and
determine the content or the format, or both, of the first beacon frame according to the indicated change.

28. The apparatus of claim 27, wherein the instructions to identify the indication of the change to the content or the format, or both, are executable by the processor to cause the apparatus to identify, in a field of the first beacon frame, the indication of the change to the content of the first beacon frame, wherein the content of the first beacon frame comprises content of one or more information elements of the first beacon frame.

29. An apparatus for wireless communication at a station, comprising:
a processor,
memory coupled with the processor; and
instructions stored in the memory and executable by the processor to cause the apparatus to:
receive, from an access point (AP), a physical layer convergence protocol (PLCP) protocol data unit (PPDU), wherein the PPDU includes a first beacon frame, wherein the received PPDU comprises an aggregate MPDU (A-MPDU) comprising the first beacon frame, and wherein the received PPDU further comprises at least one delimiter field;

identify, in the at least one delimiter field, an indication of a change to a content or a format, or both, of the first beacon frame relative to a reference beacon frame;

determine the content or the format, or both, of the first beacon frame according to the indicated change; and process one or more fields of the first beacon frame based at least in part on the indication of the change.

30. The apparatus of claim 29, wherein the instructions to identify the indication of the change to the content or the format, or both, are executable by the processor to cause the apparatus to identify, in the at least one delimiter field of the first beacon frame, the indication of the change to the content of the first beacon frame, wherein the content of the first beacon frame comprises content of one or more information elements of the first beacon frame.

* * * * *